United States Patent [19]

Domoto et al.

[11] Patent Number: 5,404,398
[45] Date of Patent: Apr. 4, 1995

[54] TELEPHONE EXCHANGE SYSTEM

[75] Inventors: Yoshihisa Domoto, Sukagawa; Yasuo Wada, Fukushima, both of Japan

[73] Assignee: Hitachi Telecom Technologies, Ltd., Koriyama, Japan

[21] Appl. No.: 115,012

[22] Filed: Sep. 1, 1993

[30] Foreign Application Priority Data

Mar. 1, 1991 [WO] WIPO ............... PCT/JP91/00304

[51] Int. Cl.⁶ ............................................. H04M 3/00
[52] U.S. Cl. ................................. 379/220; 379/207; 379/225; 379/269; 379/271; 379/231
[58] Field of Search ............... 379/207, 220, 225, 269, 379/271, 272, 273, 231, 232

[56] References Cited

U.S. PATENT DOCUMENTS

| | | | |
|---|---|---|---|
| 4,107,477 | 8/1978 | Morrison | 379/428 |
| 4,136,264 | 1/1979 | Yoshizaki | 379/225 |
| 4,442,321 | 4/1984 | Stehman | 179/18 |
| 4,455,455 | 6/1984 | Little | 379/207 |
| 4,488,004 | 12/1984 | Bogart | 379/225 |
| 4,661,974 | 4/1987 | Bales | 379/225 |
| 4,891,834 | 1/1990 | Sezaki | 379/67 |
| 5,031,211 | 7/1991 | Nagai | 379/225 |
| 5,185,741 | 2/1993 | Iguchi | 379/225 |
| 5,249,223 | 9/1993 | Vanacore | 379/266 |

OTHER PUBLICATIONS

"PBXKAN: A Microprocessor-Based System for Modernization of Telephone Switching Stations", J. J. Matta et al. *Symposium Record*, SBT/IEEE International Telecommunications Symposium Rio De Janeiro, Brazil, Sep. 3–6, 1990.

"Switch–Based Virtual Private Line Service for the Financial Services Industry", S. L. Cocklin et al., *Communications Connecting the Future*, Globecom 1990 IEEE Global Telecommunications Conference & Exhibition, Dec. 2–5, 1990.

"Sopho 52500, The High–Range Communication Switch", M. B. Geelhoed et al., *61 Philips Telecommunication Review*, vol. 43, No. 2, Jun. 1985.

*Primary Examiner*—James L. Dwyer
*Assistant Examiner*—Michael N. Lau
*Attorney, Agent, or Firm*—Foley & Lardner

[57] ABSTRACT

A telephone exchange system useful for a bank or brokerage house speech system or the like, which can accommodate a large number of lines (or trunks) and permit improvement of the reliability and call connection processing capacity. The system comprises exchange sub-systems A (EX-A) and B (EX-B) capable of independently executing an exchange operation and each accommodating a terminal. The terminal, on the other hand, has a speech channel switch for connecting a speech channel including a handset to either exchange sub-system A (EX-A) or B (EX-B). When a process of connecting a call is brought about in the terminal, that terminal selects one of the exchange subsystems and controls the speech channel switch for connecting the call to the selected exchange sub-system.

17 Claims, 43 Drawing Sheets

TELEPHONE EXCHANGE SYSTEM

BACKGROUND OF THE INVENTION

The benefit is hereby claimed of the right to an earlier effective filing date based on PCT/JP91/00304 as provided for in 35 USC § 120.

1. Field of the Invention

This invention relates to a telephone exchange system, which accommodates a large number of office and private line trunks with respect to the number of accommodated terminals.

2. Description of the Prior Art

FIG. 61 shows a prior art telephone exchange system.

The telephone exchange system shown in FIG. 61 includes a speech channel switch (SW) 611. To the speech channel switch 611 are connected line circuits (LIN) 613 which accommodate and control connection of telephone terminals 612 such as telephone sets and also trunks (TRK) 614 which accommodate and control connection of office and private lines.

A central controller (CC) 615 controls the entire telephone exchange system and also controls calls between two telephone terminals 612 and also between a telephone terminal 617 and an office or private line trunk. A memory (MM) 616 stores programs, office data and various tables used by the central controller 615 for the control of the telephone exchange system, and it is connected to the central controller 615 via a control system bus 617. The speech channel switch 611 is connected to the control system bus 617. Further, although not shown, the central controller 615 is logically connected to the extensions 613 and trunks 614. Thus, the speech channel switch 611, extensions 613 and trunks 614 are operable under control of the central controller 615.

One of the purposes of the usual telephone exchange system is to accommodate trunks matched in number to the number of calls. Therefore, in the above structure, the number n of the accommodated terminals 612 and the number m of the accommodated office and private lines (i.e., number of the trunks 614) are usually related as n>m.

However, in a telephone exchange system adopted by financial organizations such as banks and brokerage houses (also called a dealing speech system) for communication between a dealer and a customer to effect transactions (hereinafter referred to as dealings) of foreign exchanges and bonds, trunks are accommodated independently of the number of calls but in number corresponding to the number of the customers. This is so in that when a transaction occurs, a dealer has to instantly select and communicate with particular customers among a large number of customers.

Therefore, in a telephone exchange system used for dealing, the relationship between the number n of the accommodated telephone terminals 612 and number m of the accommodated trunks 614 in FIG. 61 is n<m.

Such a large number of trunks may be accommodated in a large scale telephone exchange system (private branch exchange). In this case, however, there is a problem of high probability that all communications in the telephone exchange system are interrupted at some time by some trouble. Moreover, in a large scale telephone exchange system, the load on the central controller is large, and this requires a long time for connecting a call. These problems are most significant for a dealing business, in which prompt and accurate communication between the dealer and customer is necessary.

SUMMARY OF THE INVENTION

An object of the invention is to provide a telephone exchange system, which can accommodate a large number of trunks and permits improvement of the reliability and call connection processing capacity.

According to the invention, the telephone exchange system is constituted by a plurality of exchange subsystems and a plurality of terminals belonging to all or some of these exchange sub-systems, wherein each terminal is connected to a plurality of exchange sub-systems. The plurality of exchange sub-systems operate independently for outgoing and incoming call processings with respect to the terminals belonging to them. Meanwhile, when a terminal connects a call or recognizes the occurrence of a call connection processing, it selects exchange subsystems among a plurality of exchange sub-systems, to which it belongs, in a predetermined selection order or selects a desired exchange sub-system, and effects call connection processing with respect to the selected exchange sub-system.

It is thus possible to accommodate a large number of trunks in proportion to the number of the accommodating exchange sub-systems, and also reduce the load on the exchange system with the call control partly in charge of the terminal side, thus improving the reliability of the system such that, for instance, with a telephone exchange system including N exchange sub-systems the trouble percentage of the entire exchange system is reduced to 1/N, as well as improving the call connection processing capacity.

An explanation of symbols in these figures is given below.

1A, 1B ... speech channel switch, 2A, 2B ... prior art telephone terminal, 3A, 3B ... line circuit, 4A, 4B trunk, 5A, 5B ... central controller, 6A, 6B ... memory, 7A, 7B ... control system bus, 8 ... terminal, 9A, 9B ... exclusive line circuit

DESCRIPTION OF THE PREFERRED EMBODIMENTS

The invention will now be described in detail with reference to the accompanying drawings.

Figure 1:
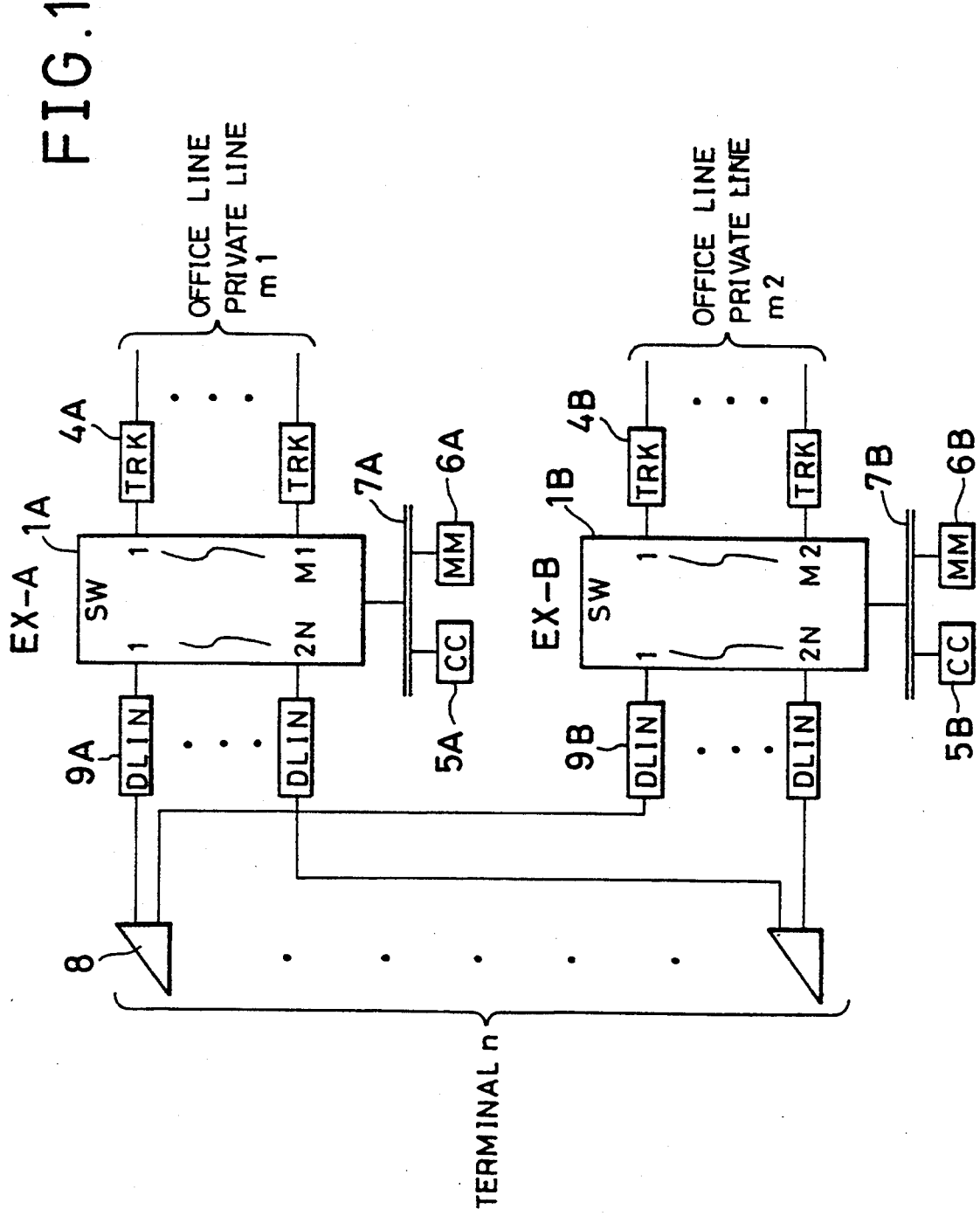
FIGS. 1 to 3 are views showing examples of construction of the telephone exchange system according to the invention.

FIG. 1 is a view showing an example of the structure of the telephone exchange system according to the invention.

Referring to FIG. 1, there is shown a telephone exchange system, which comprises two exchange sub-systems A (EX-A) and B (EX-B). These exchange sub-systems (EX-A and EX-B) include respective speech channel switches (SW) 1A and 1B. To the speech channel switches 1A and 1B are connected trunks (TRK) 4A and 4B which accommodate and control the connection of office lines or private lines.

Terminals 8 are used mainly for the dealing speech telephone terminals noted above and have a function of instantly selecting particular customers among a large number of customers. These terminals 8 are connected to exclusive line circuits (DLIN) 9A and 9B which are connected to the speech channel switches 1A and 1B. The exclusive line circuits 9A and 9B execute transmission and reception of call control messages to be described later with respect to the terminals 8.

Central controllers (CC) 5A and 5B control the entire exchange sub-systems A (EX-A) and B (EX-B) and execute call control between terminals 8 and also between terminal 8 and an office or private line. Memories (MM) 6A and 6B store programs, office data and various tables to be used by the central controllers 5A and 5B for controlling the exchange sub-systems (EX-A and EX-B). They are connected by control system buses 7A and 7B to the central controllers 5A and 5B. The speech channel switches 1A and 1B are respectively connected to the control system buses 7A and 7B. Further, although not shown, the central controllers 1A and 1B are logically connected to the exclusive line circuits 9A and 9B and trunks 4A and 4B. Thus, the speech channel switches 1A and 1B, exclusive line circuits 9A and 9B and trunks 4A and 4B are operable under control of the central controllers 5A and 5B.

Further, the central controllers 5A and 5B are operable entirely independently, that is, the exchange sub-systems A (EX-A) and B (EX-B) are operable independently.

Thus, in the telephone exchange system of the structure shown in FIG. 1, a plurality of terminals 8 are each connected to the two exchange sub-sustems (EX-A and EX-B) via the exclusive line circuits 9A and 9B, and each terminal 8 thus can access all (i.e., m1) office and private lines accommodated by the exchange sub-system A (EX-A) and all (i.e., m2) office and private lines accommodated by exchange sub-system B (EX-B), that is, office and private lines corresponding in number to the sum of m1 and m2.

Figure 2:
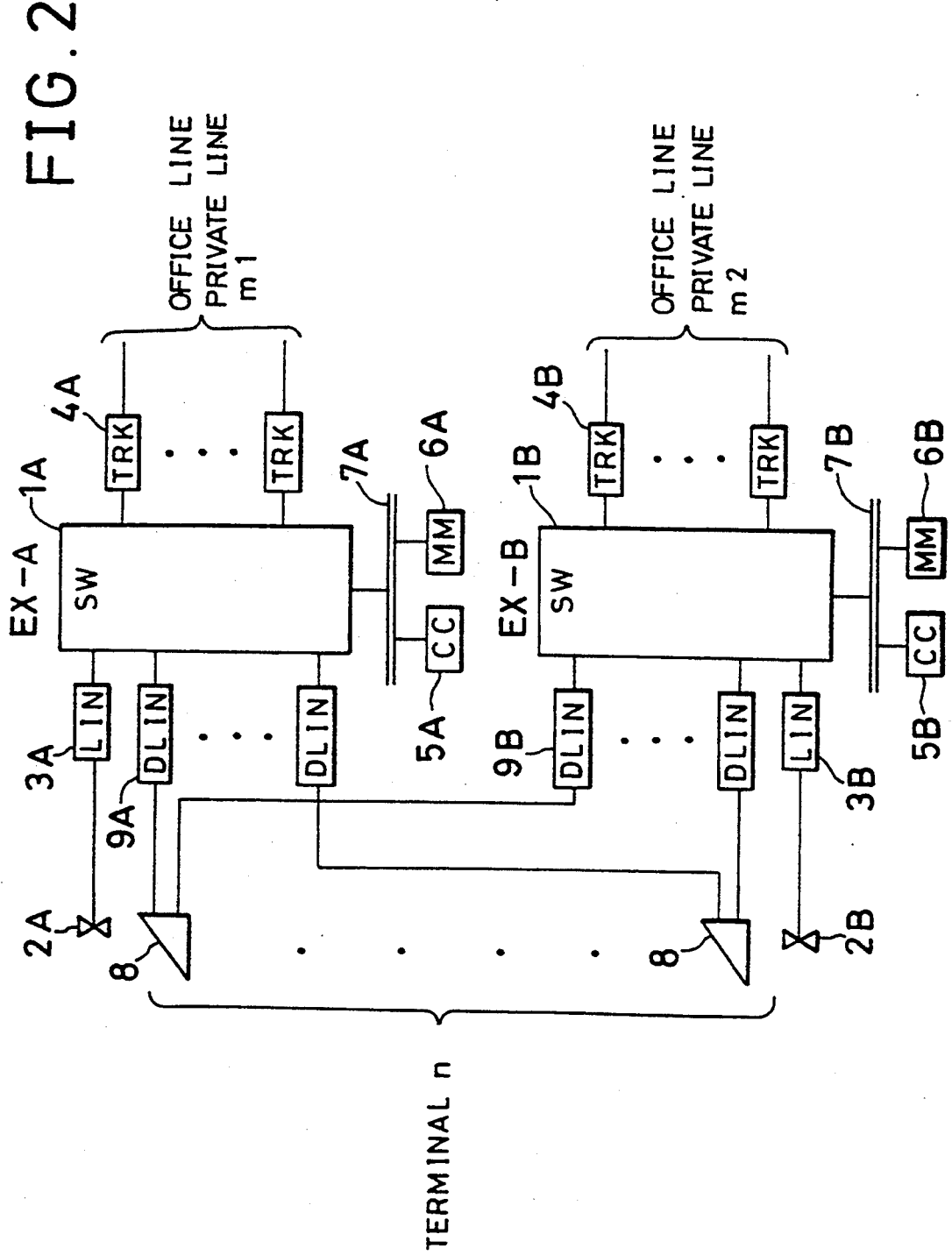

FIG. 2 is a view showing a different structure example. In this example, heretofore used ordinary telephone terminals 2A and 2B are added to the telephone exchange system of the structure shown in FIG. 1, and thus the telephone terminals 2A and 2B and dealing speech terminals 8 coexist. The dealing speech system can accommodate, in addition to the terminals 8 which are operable by dealers, the conventional telephone terminals 2A and 2B which are used for calls backing up dealing business, and permit mutual communication between these terminals. The connection of telephone terminals 2A and 2B are by line circuits (LIN) 3A and 3B connected to the speech channel switches 1A and 1B. This control is conventional, and its detailed description as not given.

Figure 3:
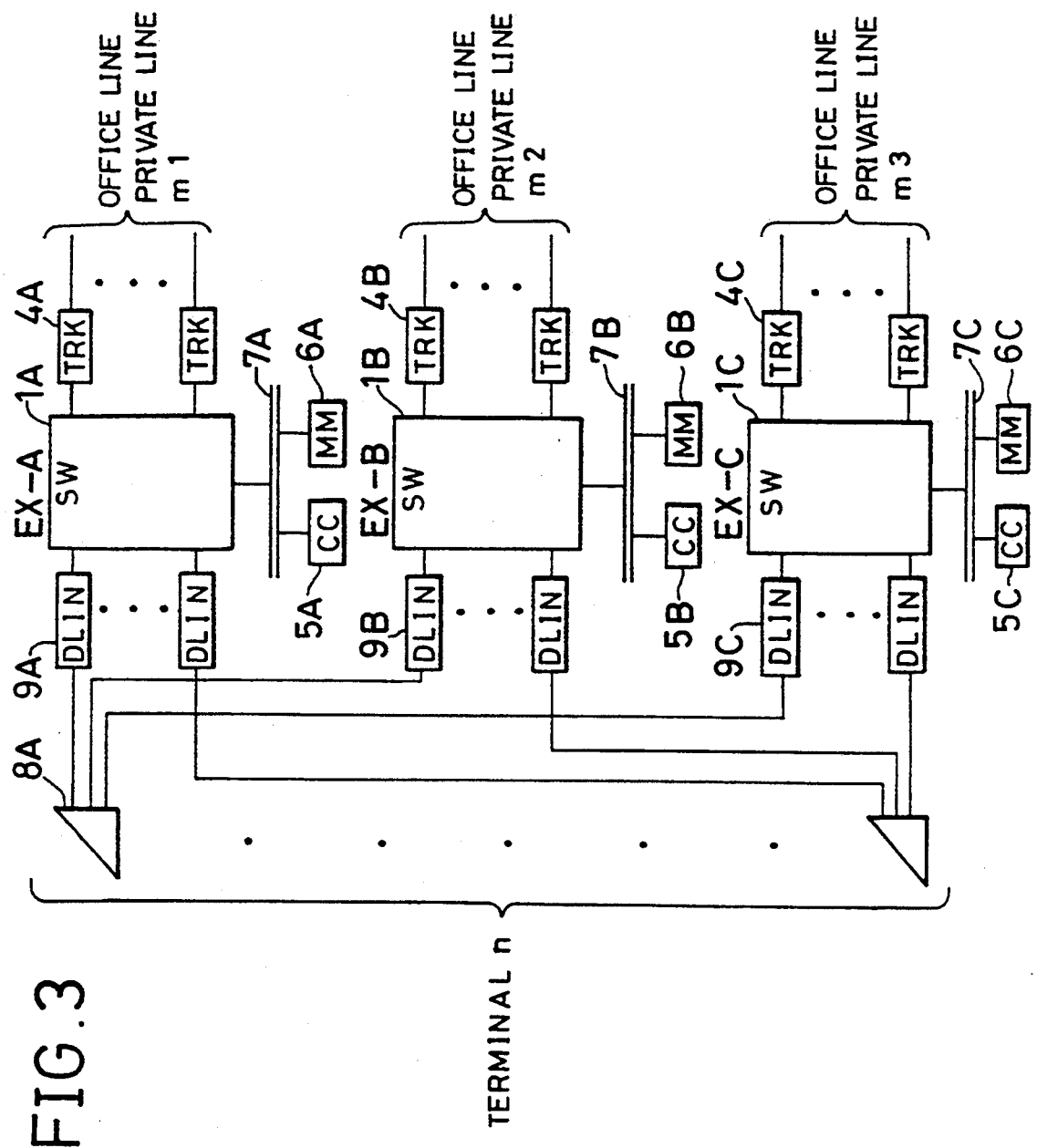

FIG. 3 shows a further structure example of the telephone exchange system, which comprises three exchange sub-systems A (EX-A), B (EX-B) and C (EX-C). This shows that a large capacity system can be constructed by increasing the number of exchange sub-systems in accordance with the necessary number of office and private lines.

While structure examples of the telephone exchange system according to the invention are shown in FIGS. 1 to 3, it is very important in these structures from a system viewpoint that the operators of the terminals 8 should never intentionally operate the exchange which accommodate lines corresponding to customers and conventional telephone terminals. In other words, from the perspective of each of the terminals, the plurality of exchange sub-systems should appear to function as a single exchange system. This problem stems from the fact that each exchange sub-system is operable independently in order to maintain the processing capacity of the exchange system.

According to the invention, the terminal, which can be considered to be a contact with the control of each exchange sub-system, is provided with means for selecting the exchange sub-systems and is also imparted with part of the call control processing function which is to be intrinsically provided in the exchange system, thus attaining an apparent single exchange system, which is actually constituted by a plurality of exchange sub-systems.

The description of the embodiments described below assumes the telephone exchange system structure as shown in FIG. 1.

While the structure of the exchange system is as described above, the exclusive line circuits (DLIN) (9A and 9B, FIG. 1) provided for execution of the transmission and reception of information (i.e., call control messages) with respect to the terminals will now be described in greater detail.

The exclusive line circuit (DLIN) is a hardware device for permitting connnection between a terminal and an exchange system via a digital interface (i.e., ISDN basic rate interface having two B channels and a D channel) as an example of a means for enhancing the effectiveness of the invention.

DLIN will now be described in detail with reference to FIG. 6.

Figure 6:
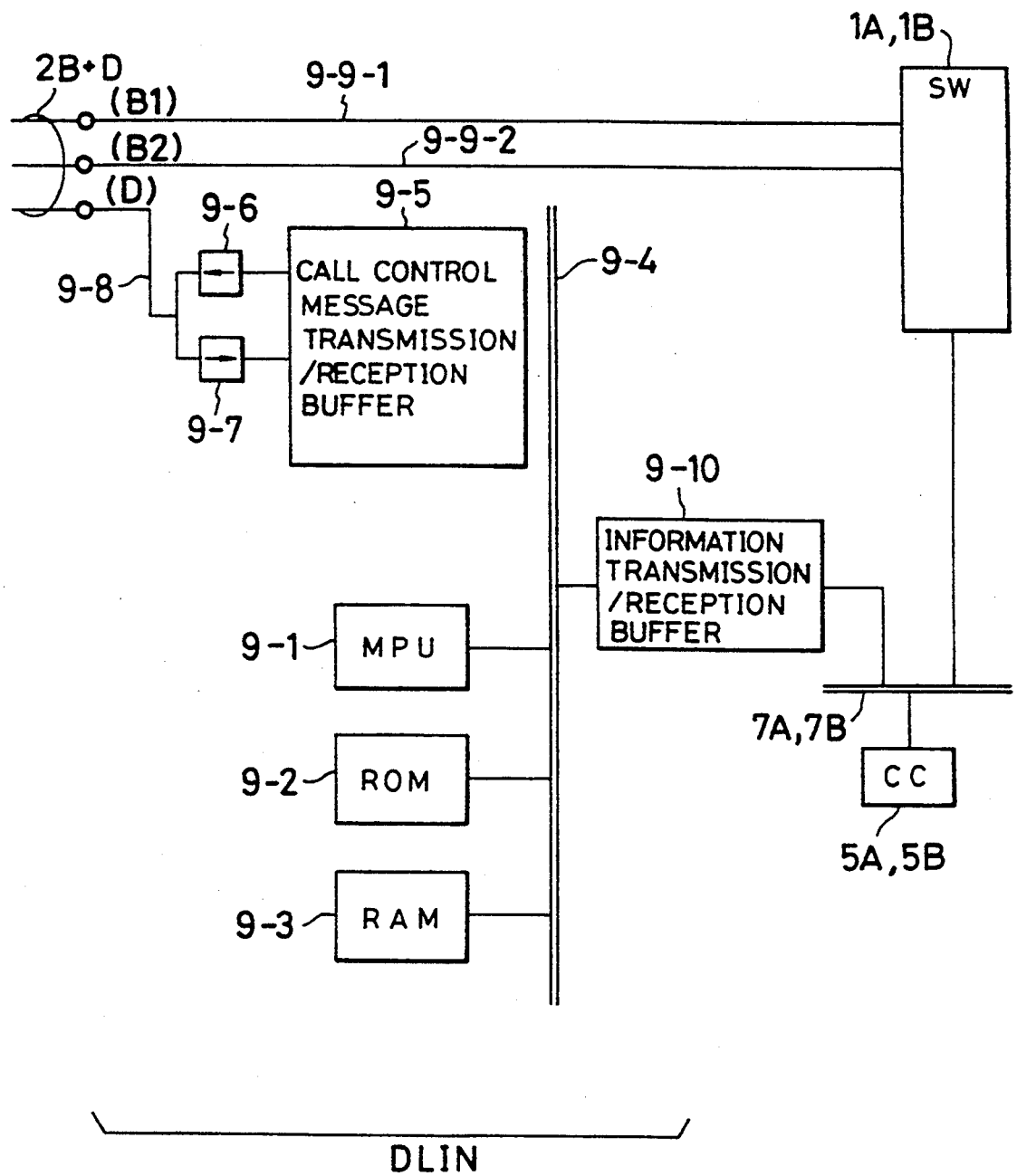
FIG. 6 is a block diagram showing an exclusive line circuit of the exchange system according to the invention.

Referring to FIG. 6, the exclusive line circuit (DLIN) includes a processor (MPU) 9-1 for controlling the entire exclusive line circuit. The processor executes transmission and reception of control information with respect to the central controllers 5A and 5B controlling the entire exclusive line circuit, and also executes transmission and reception of call control messages with respect to the terminals 8. The control procedure or method of processing that is followed by the processor 9-1 is preliminarily programmed in a permanent memory (ROM) 9-2, and the processing is executed according to the program while storing transient information or like data in a temporary memory (RAM) 9-3. Further, a call control message transmission/reception buffer 9-5 is provided for the transmission and reception of call control messages with respect to the terminals 8. To this call control message transmission/reception buffer 9-5 are connected a transmission circuit 9-6 and a reception circuit 9-7. The transmission circuit 9-6 effects transmission of call control messages to the terminals 8 via a signal channel (D channel) 9-8 of the ISDN basic rate interface as an interface for connection to the terminals 8. The reception circuit 9-7 effects reception of call control message from the terminals 8. Further, an information transmission/reception buffer 9-10 is provided, which executes transmission and reception of control information with respect to the central controllers 1A and 1B of the exchange system. The information transmission/reception buffer 9-10 is connected to tile control system buses 7A and 7B of the exchange system. The processor 9-1, permanent memory 9-2, temporary memory 9-3, call control message transmission/reception buffer 9-5 and information transmission/reception buffer 9-10 are connected to the control bus 9-4.

With this construction, the transmision and reception of control information between the processor 9-1 and central controllers 5A and 5B are executed via the control bus 9-4 and information transmission/reception buffer 9-10, while the transmission and reception of call control messages between the processor 9-1 and terminal 8 are executed via the control bus 9-4 and call control message transmission/reception buffer 9-5.

The two speech channels, i.e., B1 and B2 channels 9-9-1 and 9-9-2, are logically connected without any modification or any agency to the speech channel switches 1A and 1B of the exchange system. The B1 and B2 channels 9-9-1 and 9-9-2 and D channel 9-8 are actually time-division multiplexed for digital communication. In this description, however, space division is assumed for the sake of simplicity. Hence, circuits for time-division multiplexing and de-multiplexing the B1 and B2 channels 9-9-1 and 9-9-2 and D channel 9-8 are not shown in FIG. 6.

Now, the hardware structure of the terminal used mainly as a dealing speech telephone terminal will be described.

Figure 4:
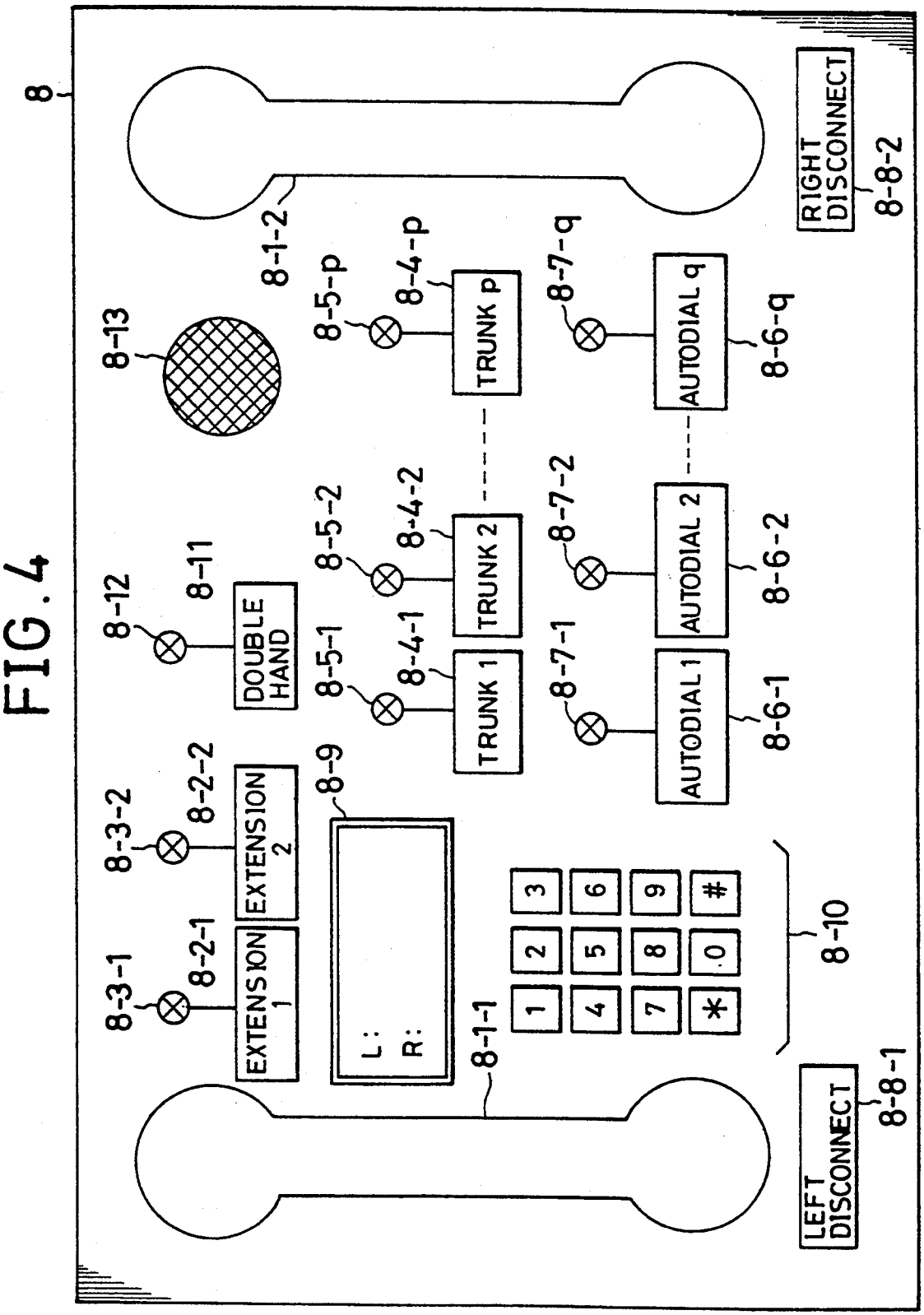
FIG. 4 is a view showing the board configuration of the terminal according to the invention.

FIG. 4 is a view showing the front board of the terminal 8. The instant embodiment will be described in conjunction with a case where two speech handsets 8-1-1 and 8-1-2 are provided.

Referring to FIG. 4, the front board has, in addition to the left and right handsets 8-1-1 and 8-1-2, buttons "Extension 1" 8-2-1 and "Extension 2" 8-2-2, as outgoing call and answering means which correspond to imaginary extension circuits (i.e., extension memories) and for communication with the other terminals and conventional telephone terminals, lamps 8-3-1 and 8-3-2 as displaying means corresponding to these buttons "Extension 1" 8-2-1 and "Extension 2" 8-2-2, buttons "Trunk 1" 8-4-1 to "Trunk p" 8-4-$p$ for placing outgoing calls and answering incoming calls on the office and private lines, Lamps 8-5-1 to 8-5-$p$ corresponding to these buttons "Trunk 1" 8-4-1 to "Trunk p" 8-4-$p$, buttons "Autodial 1" 8-6-1 to "Autodial q" 8-6-$q$ for automatically calling opposite parties, lamps 8-7-1 to 8-7-$q$ corresponding to these buttons "Autodial 1" 8-6-1 to "Autodial q" 8-6-$q$, a dial key set 8-10 for dialing, a numeral display 8-9 for displaying numerals or the like, a button "Left Disconnect" 8-8-1 for disconnecting the left handset 8-11, a button "Right Disconnect" 8-8-2 for disconnecting the right handset 8-1-2, a button "Double Hand" 8-11 for setting the use of the left and right handsets, i.e., for setting a single handset or two handsets (double hands) for use, a lamp 8-12 corresponding to the button "Doublehand" 8-11, and an incoming call ringer 8-13 for audibly indicating incoming calls.

Figure 5:
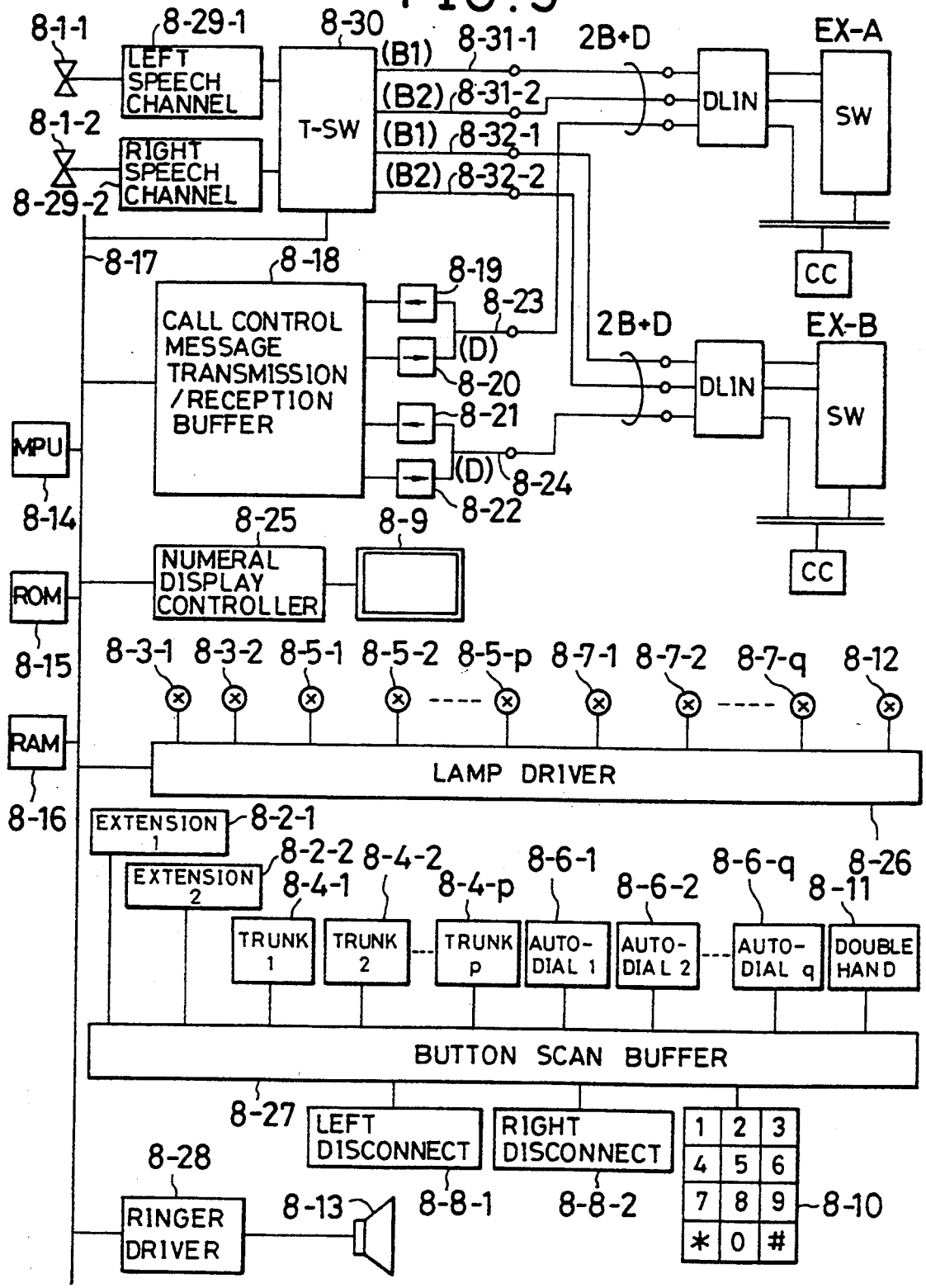
FIG. 5 is a block diagram showing a hardware structure of the terminal according to the invention.

FIG. 5 is a block diagram showing the hardware structure of the terminal 8, i.e., the structure of the front board shown in FIG. 4.

Referring to FIG. 5, the terminal 8 includes a call control processor (MPU) 8-14 for controlling the entire terminal and connected to a control bus 8-17. The call control processor 8-14 executes control according to a program stored in a permanent memory (ROM) 8-15 connected to the control bus 8-17. A temporary memory (RAM) 8-16 is connected to the control bus 8-17 and stores various variable data, for instance tables which are different with different offices or transient information produced during execution of control by the control processor 8-14. Thus, the call control processor 8-14, like the other processor systems, accesses the permanent memory 8-15 and temporary memory 8-16 via the control bus 8-17 to execute control.

To the control bus 8-17 are connected a call control message transmission/reception buffer 8-18, a numeral display controller 8-25, a lamp driver 8-26, a button scan buffer 8-27, a ringer driver 8-28 and a speech channel switch (T-SW) 8-30. The call control message transmission/reception buffer 8-18, numeral controller 8-25, lamp driver 8-26, button scan buffer 8-27, ringer driver 8-28 and speech channel switch (T-SW) 8-30 are all operable under control of the call control processor 8-14.

The call control message transmission/reception buffer 8-18 executes transmission and reception of call control messages with respect to the exchange sub-systems (EX-A and EX-B). To this buffer are connected a reception circuit 8-19, which receives call control messages from the exchange sub-system A (EX-A) via the D channel 8-23 of the ISDN basic rate interface, a transmission circuit 8-20, which transmits call control messages to the exchange subsystem A (EX-A) via the D channel 8-23, a reception circuit 8-21, which receives call control messages from the exchange sub-system B (EX-B) via the D channel 8-24, and a transmission circuit 8-22, which transmits call control messages to the exchange sub-system B (EX-B) via the D channel 8-24.

A numeral display 8-9 is connected to the numeral display controller 8-25 for displaying given numerals on the numeral display 8-9 under control of the call control processor 8-14.

The lamp driver 8-26 controls the lamps 8-3-1 and 8-3-2, lamps 8-5-1 to 8-5-$p$, lamps 8-7-1 to 8-7-$q$ and lamp 8-12, these lamps being connected to the lamp driver 8-26, to cause display of the status of the buttons corresponding to these lamps.

The button scan buffer 8-27 scans and detects the on-off state of the buttons "Extension 1" 8-2-1 and "Extension 2" 8-2-2, buttons "Trunk 1" 8-4-1 to "Trunk P" 8-4-p, buttons "Autodial 1" 8-6-1 to "Autodial q" 8-6-q, button "Doublehand" 8-11, button "Left Disconnect" 8-8-1, button "Right Disconnect" 8-8-2 and dial key set 8-10, these buttons and keys being connected to it.

The ringer driver 8-28, to which the call incoming ringer 8-13 is connected, effects control for audibly indicating incoming calls.

To the speech channel switch 8-30 are connected a left speech circuit 8-29-1 for connecting the left handset 8-11 and a right speech circuit 8-29-2 for connecting the right handset 8-1-2. This switch accommodates B1 and B2 channels 8-31-1 and 8-31-2 of the ISDN basic rate interface connected to the exchange sub-system A (EX-A) and B1 and B2 channels 8-32-1 and 8-32-2 of the ISDN basic rate interface connected to the exchange sub-system B (EX-B). The four individual speech channels can be connected to either of the left and right speech circuits 8-29-1 and 8-59-2 corresponding to the respective left and right handsets 8-1-1 and 8-1-2 with switching control of the speech channel switch 8-30 by the call control processor 8-14.

As noted before, the B1 and B2 channels 8-31-1 and 8-31-2, D channel 8-23, B1 and B2 channels 8-32-1 and 8-32-2 and D channel 8-24 are actually time-division multiplexed for digital communication, but here space division is assumed for the sake of simplicity. Hence, circuits for time-division multiplexing and de-multiplexing the B1, B2 and D channels are not shown in FIG. 5.

Further, with the system structure of the present embodiment of the system, i.e., where a terminal having two handsets is connected to two exchanges, it is desirable that control be effected such that the left handset is connected via the B1 channel of the individual exchange sub-systems and the right handset is connected via the B2 channel of the individual exchange sub-systems. Such control requires only the sole B1 channel with a terminal having a single handset while it requires three channels, i.e., B1 to B3 channels, with a terminal having three handsets.

Further, terminals with more than three exchange sub-systems can be readily and flexibly accommodated with by increasing the pairs of B1 and B2 channels on the terminal side.

Prior to the description of call control operation which will be given later, tables and temporary memories which are used for execution of the call control will now be described, and call control messages which are transmitted and received between the exchange and the terminal will be described below.

Tables and temporary memories of the terminal 8 are stored in temporary memory 8-16 shown in FIG. 5.

The tables are registered preliminarily in accordance with operational conditions of the terminal 8. They are backed up by battery or the like so that their contents will never vanish due to a power stoppage or similar type of problem, and therefore they correspond to commonly termed office data. Obviously, their contents can be renewed whenever the operational conditions of the telephone exchange system are changed. The tables which are used in this embodiment are shown in FIGS. 7 to 13.

The temporary memory is one which stores information changing instantaneously during execution of call control. The temporary memories which are used in this embodiment are shown in FIGS. 14 to 20. First, the tables will be described.

Figure 7:
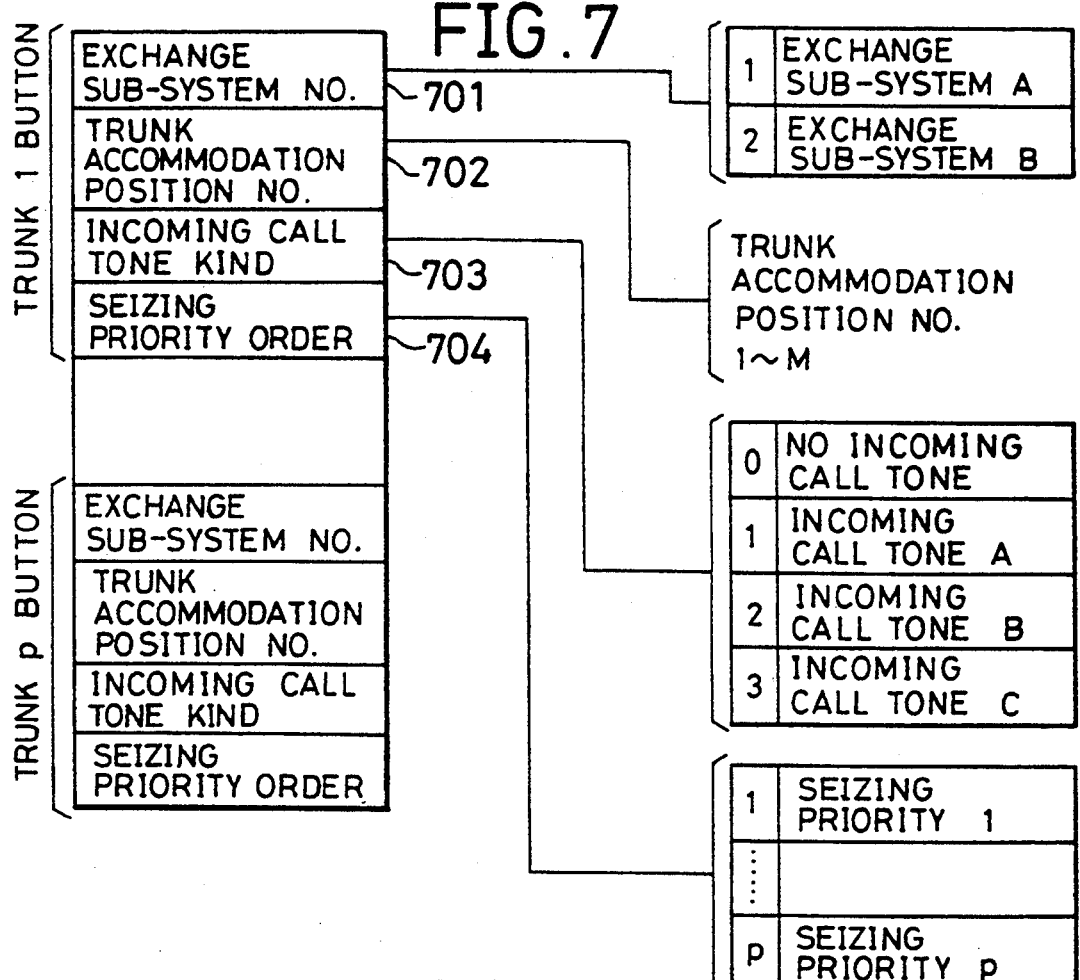
FIGS. 7 to 13 are views showing tables provided in the terminal.

FIG. 7 shows a trunk button table. Referring to FIG. 7, the trunk button table is provided in correspondence to the buttons "Trunk 1" 8-4-1 to "Trunk p" 8-4-p on the front board of the terminal 8 shown in FIG. 4. The registered contents of the table are information (exchange sub-system No.) 701 indicative of the pertinent exchange sub-system for connection, information (trunk accommodation position No. or trunk No.) 702 indicative of the trunk accommodation position, information (incoming call tone kind) 703 indicative of the kind of the incoming call tone when an incoming call is placed and information 704 (seizing priority order) indicative of the seizing priority order. In this table, a desired number of, i.e., p, trunks among the m1 trunks accommodated in the exchange sub-system A (EX-A) and m2 trunks accommodated in the exchange sub-system B (EX-B) can be registered.

Figure 8:
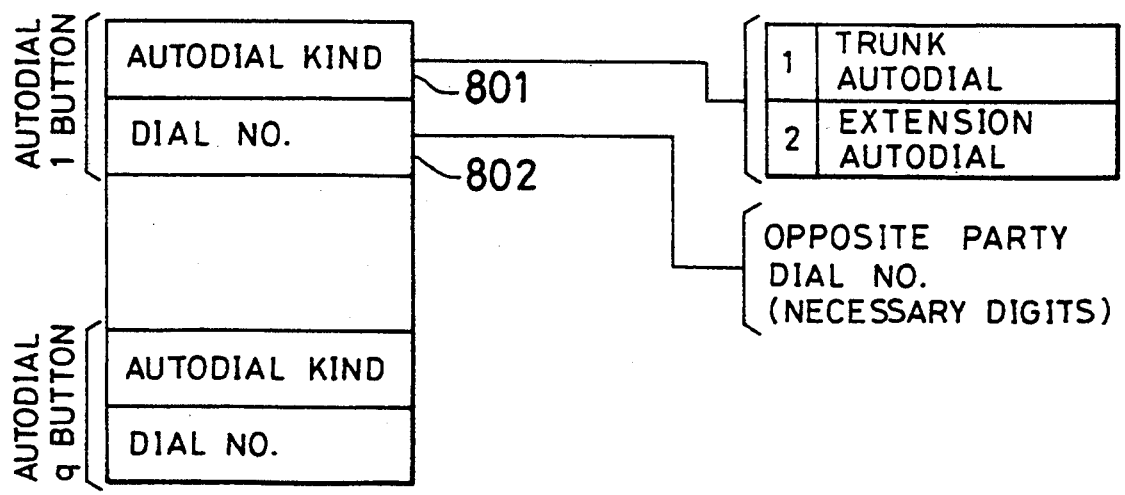

FIG. 8 is a view showing an autodial button table.

The autodial button table shown in FIG. 8 is provided in correspondence to the buttons "Autodial 1" 8-6-1 to "Autodial q" 8-6-q on the front board shown in FIG. 8. The registered contents of the table are information (autodial kind) 801 indicative of whether an outgoing call is placed on a trunk or on an extension line and information (dial No.) 802 indicative of the dial of a source.

Figure 9:
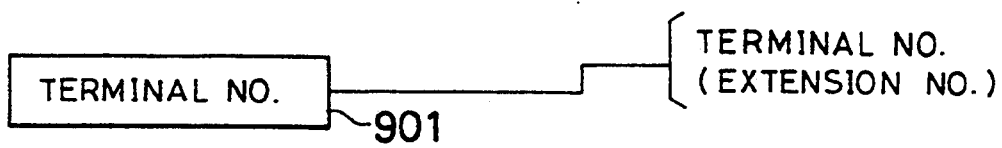

FIG. 9 shows a terminal No. table. The registered content of this table is the own terminal No. 901. It is used upon reception of status information sent out from the exchange and indicative of a terminal status change for judging whether the status information is produced with the own terminal status change or with a status change of a different terminal.

Figure 10:

FIG. 10 shows a handset mode table. The registered content of this handset mode table is information (handset mode) as to whether the operator of the terminal is a right hander or a left hander. Usually, a right handed operator grasps the handset with the left hand and operates buttons and keys with the right hand, while a left handed operator uses the hands conversely. Thus, this table is used to determine the priority order of the left and right handsets.

Figure 11:
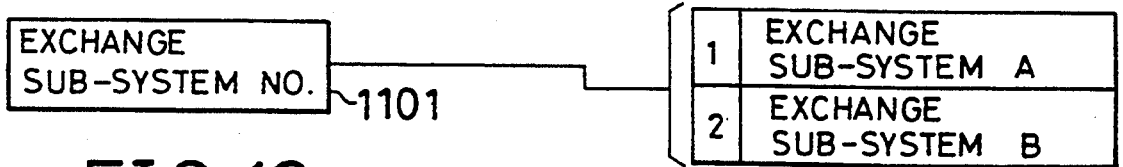

FIG. 11 shows an originating call exchange sub-system No. table. The registered content of this originating call exchange sub-system No. Table is information (exchange sub-system No.) 1101 used when placing an originating call corresponding to the button "Extension 1" 8-2-1 or "Extension 2" 8-2-2 on the front board of the terminal 8 shown in FIG. 4 and indicative of whether the originating call is to the exchange sub-system A (EX-A) or B (EX-B). When placing an originating call for a dealing speech terminal 8, it is obvious which exchange sub-system the originating call is to be placed for. However, where conventional telephone terminals (2A, 2B) are accommodated separately of the exchange sub-systems A and B as shown in FIG. 2, it is necessary to identify the dialed terminal No. (i.e., extension No.). However, detailed description in this connection is not given in this embodiment.

Figure 12:
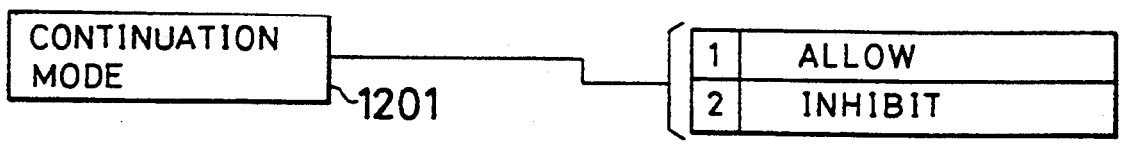

FIG. 12 shows a left hand continuation mode table. The registered content is information (continuation mode) 1201 indicative of whether or not to allow, for instance, an operation of disconnecting the line corresponding to the button "Trunk 1" 8-4-1 and connecting the line corresponding to the button "Trunk 2" 8-4-2 in response to the depression of the button "Trunk 2" 8-4-2 when the left handset is busy with the line corresponding to the button "Trunk 1" 8-4-1.

Figure 13:

FIG. 13 is a right hand continuation mode table. In this right hand continuation mode table, like the left hand continuation mode table shown in FIG. 12, a continuation mode 1301 is registered. Control in this connection will be described in detail in connection with handset selection control described later.

Now, the temporary memories will be described.

Figure 14:
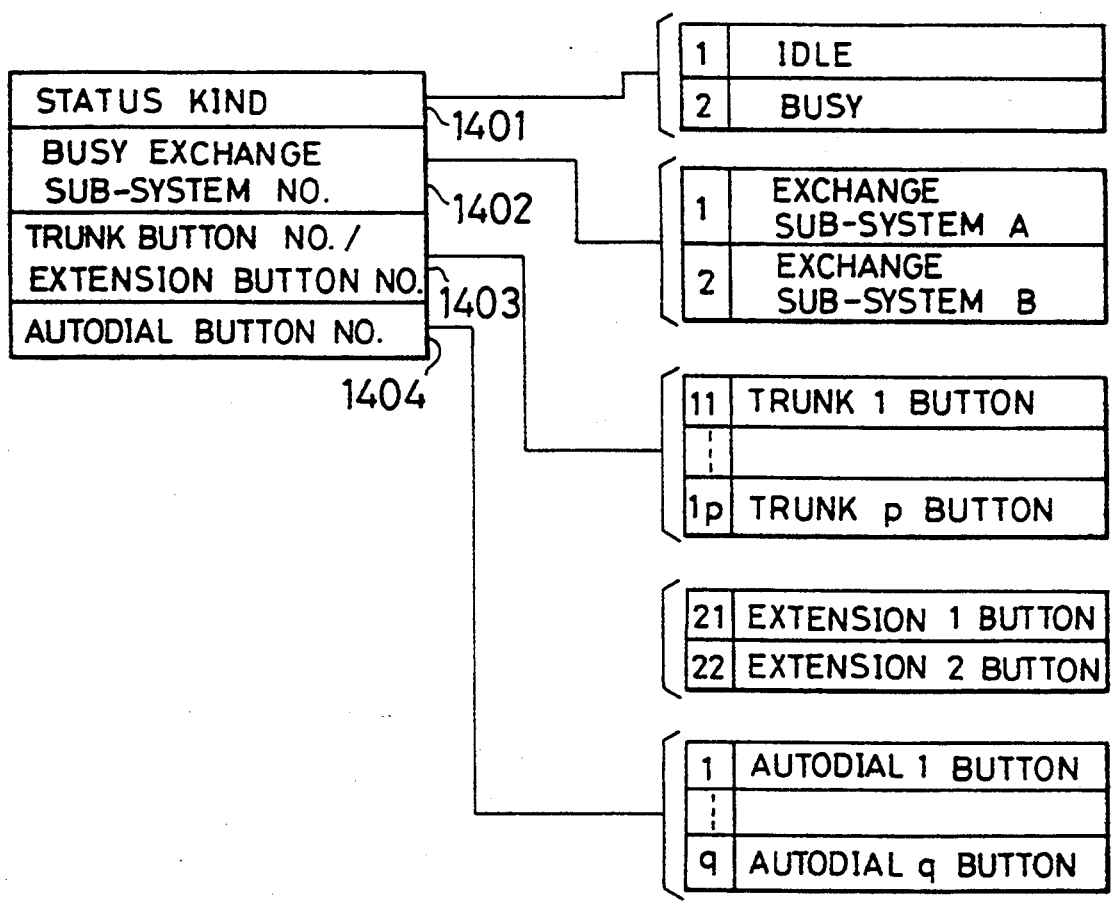
FIGS. 14 to 20 are views showing temporary memories provided in the terminal.

FIG. 14 shows a left (L) handset memory. Referring to FIG. 14, the left (L) handset memory holds information (status kind) 1401 indicative of the status of the left speech channel 8-29-1, information (busy exchange sub-system No.) 1402 indicative of the busy exchange sub-system No., information (trunk button No. or extension button No.) 1403 indicative of the button corresponding to a busy trunk or the button corresponding to a busy extension and information (autodial dial button No.) 1404 indicative of the autodial button corresponding to an autodial outgoing call.

Mainly, when a disconnection operation is executed, call control is provided according to these pieces of information.

Figure 15:
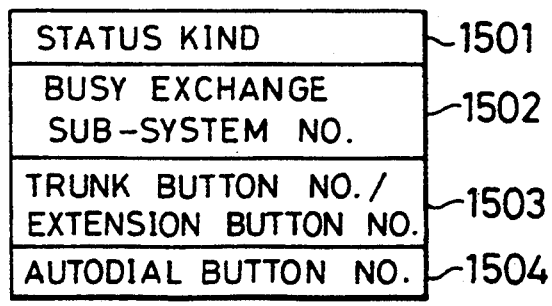

FIG. 15 shows a right (R) handset memory. Referring to FIG. 15, the right (R) handset memory, like the left (L) handset memory shown in FIG. 14, holds information (status kind) 1501 indicative of the status of the right speech channel 8-29-2, information (busy exchange subsystem No.) 1502 indicative of the busy exchange subsystem, information (trunk button No. or extension button No.) 1503 indicative of the button corresponding to a busy trunk or the button corresponding to a busy extension, and information (autodial button No.) 1504 indicative of the autodial button corresponding to an autodial outgoing =sail.

Figure 16:
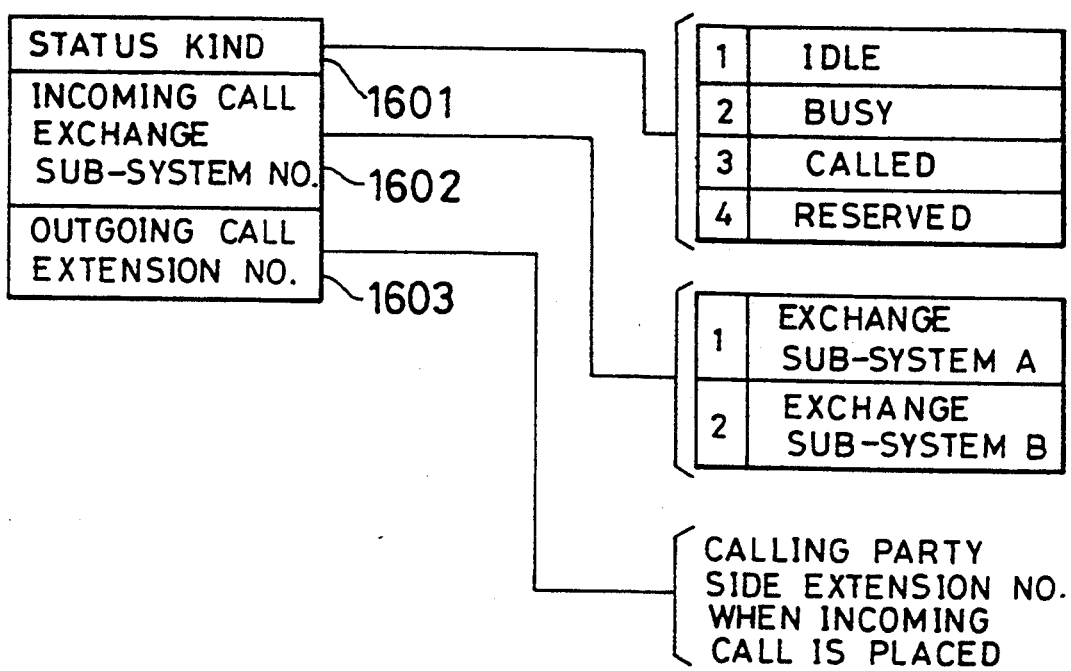

FIG. 16 shows an extension call control memory (or extension memory 1) for call control of the extension corresponding to the button "Extension 1" 8-2-1. Referring to FIG. 16, the extension memory 1 holds information (status kind)1601 indicative of the connection status of the button "Extension 1" 8-2-1, information (incoming call exchange sub-system No.)1602 indicative of the exchange sub-system receiving an extension incoming call, and information (calling party extension No.) 1603 indicative of the extension No. of a calling party. The extension No. is used for displaying the extension No. of the opposite party on the numeral display 8-9 in extension incoming call control.

Figure 17:
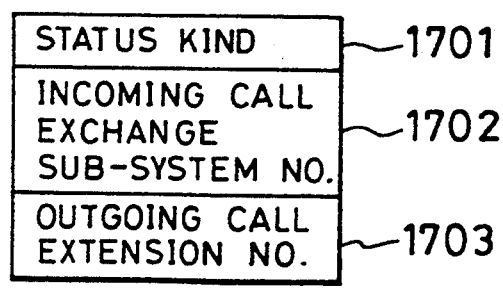

FIG. 17 shows an extension call control memory (i.e., extension memory 2) for call control of the extension corresponding to the button "Extension 2" 8-2-2. Referring to FIG. 17, the extension memory 2, like the extension memory 1, holds information (status kind) 1701 indicative of the connection status of the button "Extension 2" 8-2-2, information (incoming call exchange sub-system) 1702 indicative of the exchange sub-system receiving an extension incoming call, and information (calling party extension No.) 1703 indicative of the extension No. of a calling party.

Desirably, the extension memories 1 and 2 are free from any restriction of connection between the left and right handsets and exchange sub-systems A and B. This is so because the left handset 8-1-1 is capable of four different connections, i.e., connection between the button "Extension 1" and exchange sub-system A (EX-A), connection between the button "Extension 1" and exchange sub-system B (EX-B), connection between the button "Extension 2" and exchange sub-system A (EX-A) and connection between the button "Extension 2" and exchange sub-system B (EX-B), and likewise the right handset 8-1-2 is capable of four different connections. In a telephone exchange system which comprises a plurality of mutually independently operable exchange sub-systems, this is an important feature in order that the plurality of exchange sub-systems apparently function as a single exchange system as seen by an operator engaged in an extension outgoing or incoming call.

Figure 18:
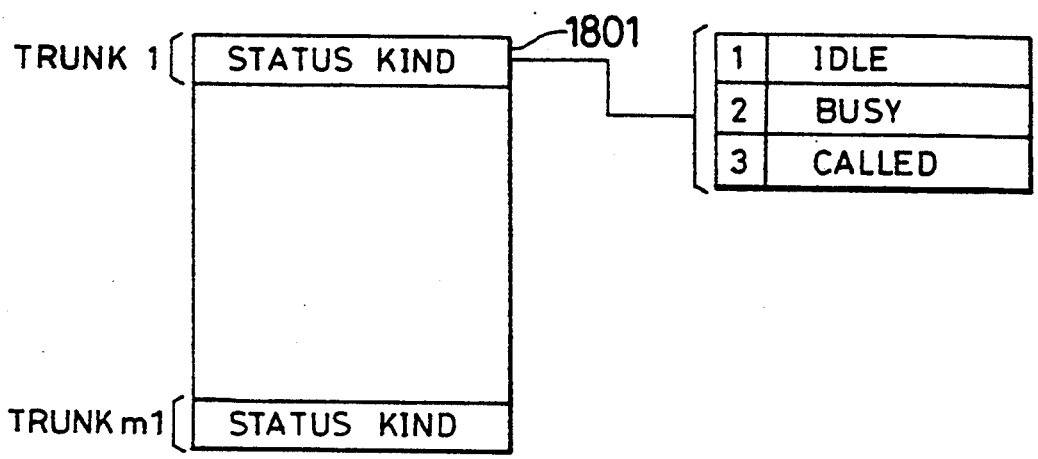
Figure 19:
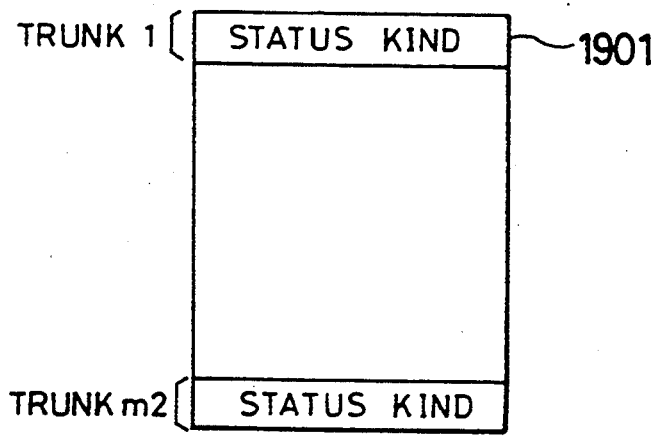

FIG. 18 shows an exchange sub-system A accommodated trunk memory. This exchange sub-system A accommodated trunk memory holds information (status kind) 1801 indicative of the status of all the trunks (i.e., m1 trunks) accommodated in the exchange system A (EX-A). FIG. 19 shows an exchange sub-system B accommodated trunk memory. This exchange sub-system B accommodated trunk memory holds information (status kind) 1901 indicative of the status of all trunks (i.e., m2 trunks) accommodated in the exchange sub-system B (EX-B). With the exchange sub-system A and B accommodated trunk memories in the terminal 8, the terminal 8 can recognize the status of trunks accommodated in the exchange sub-systems (i.e., sum m1+m2 trunks), and call control of trunk outgoing and incoming calls is partially taken in charge of by the terminal 8.

Figure 20:
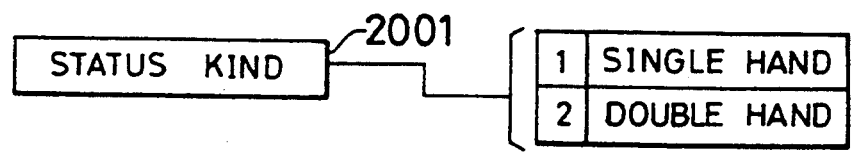

FIG. 20 shows a doublehand button memory. The content of this doublehand button memory is varied in an interlocked relation to the operation of the button "Doublehand" 8-11, and the table holds information (status kind) 2001 indicative of whether the terminal status is a single or double hand status.

The tables and temporary memories in the exchange sub-systems (EX-A and EX-B) are stored in the memories 6A and 6B in FIG. 2.

Among the tables and temporary memories in the exchange sub-systems, there are various office data, subscriber data, various call control memories as well as such data as maintenance data and charging data. Here, only tables and temporary memories concerning the present invention will be described.

The tables will first be described.

Figure 21:
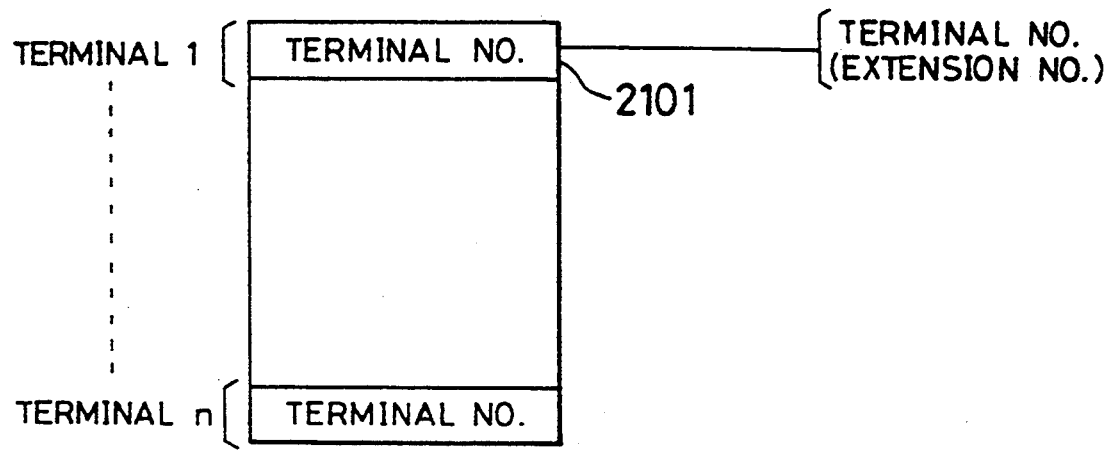
FIG. 21 is a view showing a table provided in the exchange.

FIG. 21 shows a terminal No. table. This terminal No. table is provided for each terminal, and stored in the table is information (terminal No.) 2101 necessary for notifying the terminal, when an extension outgoing or incoming call is placed or when a terminal status change occurs, the status change of which has been accepted. This terminal No. table is provided with entirely the same configuration in all the exchange sub-systems (i.e., exchange sub-systems A and B).

The temporary memories will now be described.

FIGS. 22 to 25 show temporary memories used in this embodiment.

Figure 22:
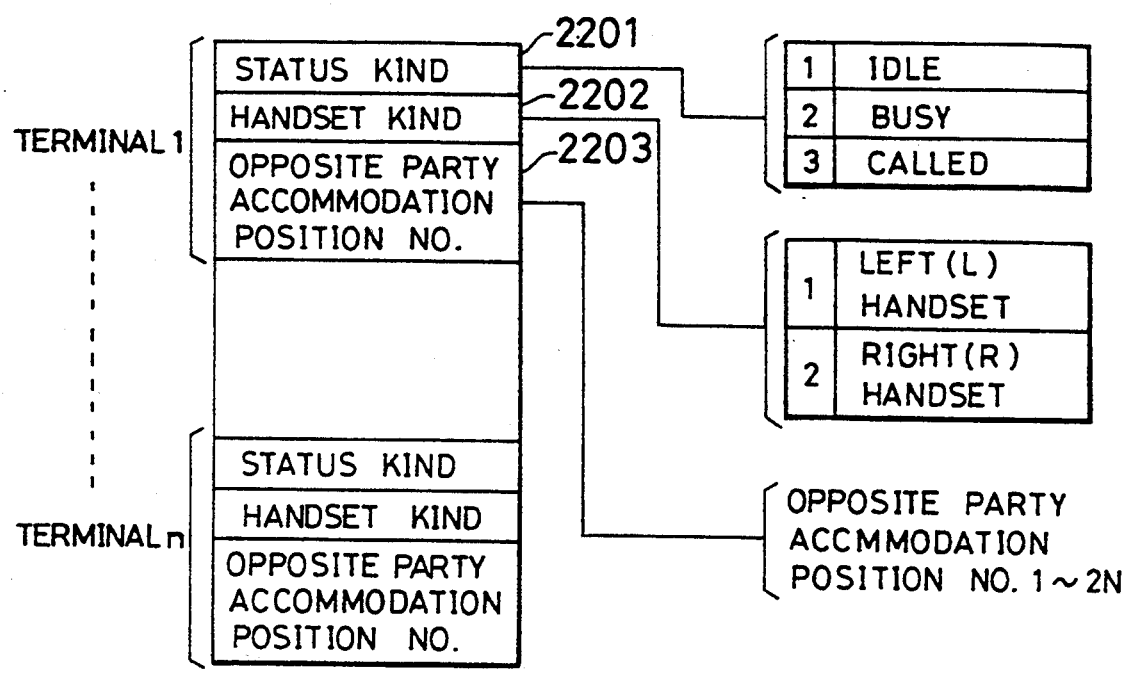
FIGS. 22 to 25 are views showing temporary memories provided in the exchange.

FIG. 22 shows the extension memory 1. This extension memory 1 is provided in correspondence to the button "Extension 1" 8-2-1 in each terminal 8, and it holds information (status kind) 2201 indicative of the status of the "Extension 1", information (handset kind) 2202 indicative of the kind of a busy handset (i.e., B1 or B2 channel on the exchange sub-system side), and information (opposite party accommodation position No.) 2203 indicative of the position of accommodation of the opposite party terminal when an extension is busy.

Figure 23:
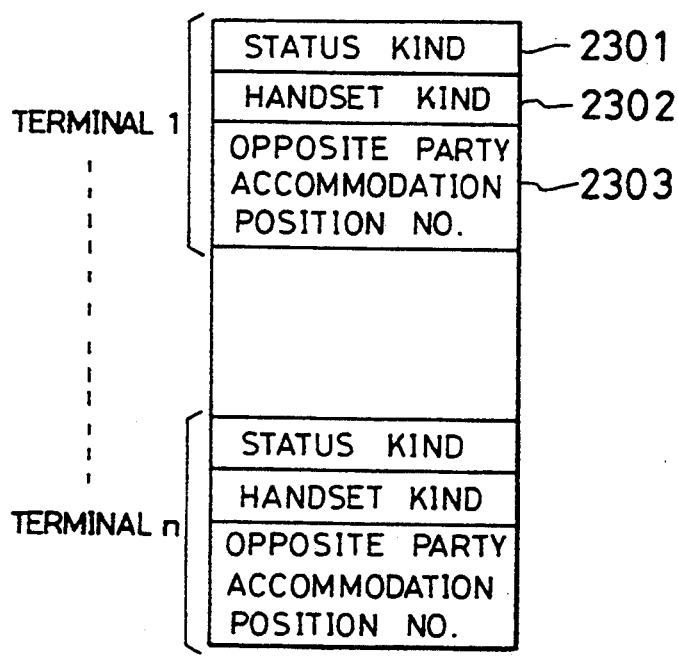
Figure 24:
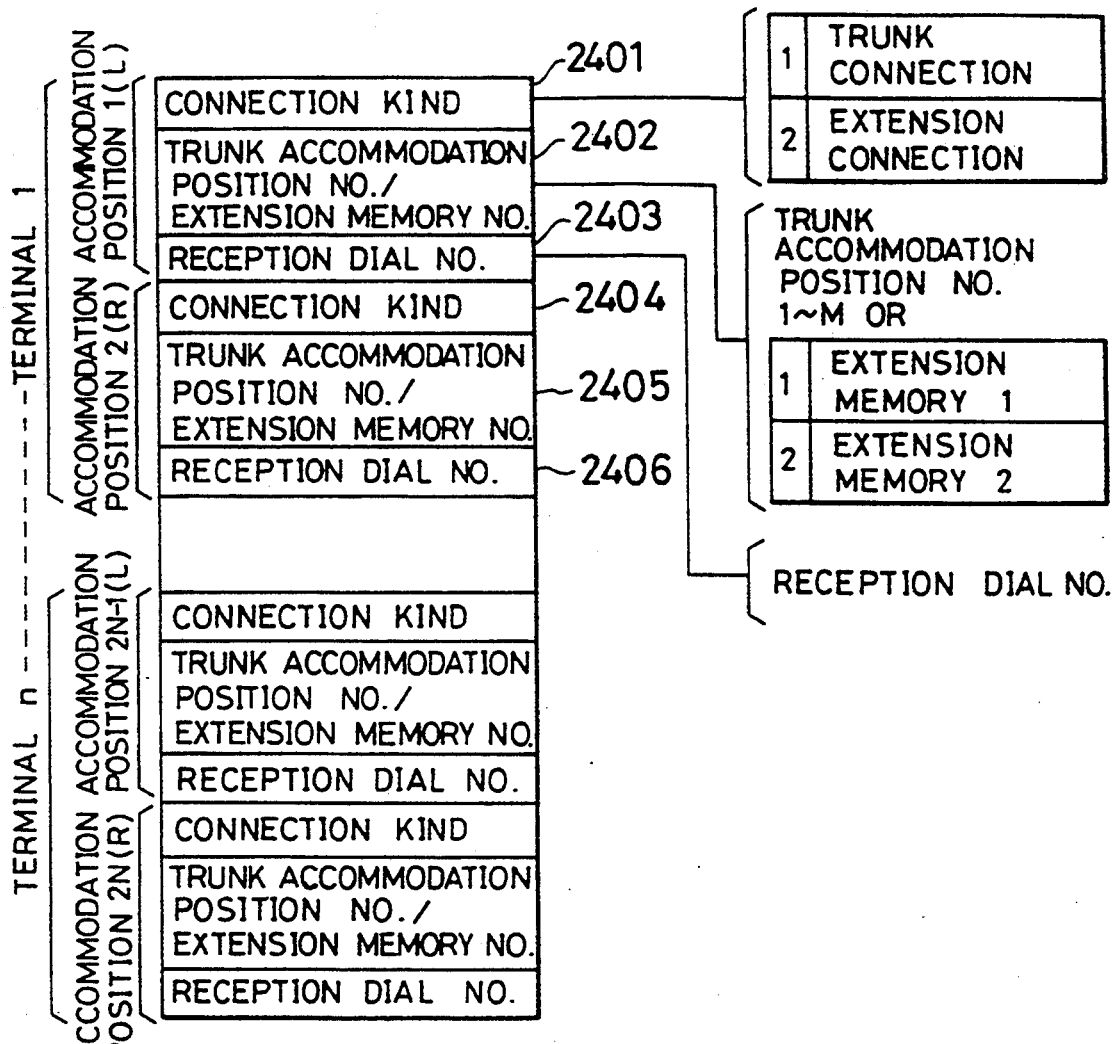

FIG. 23 shows the extension memory 2. This extension memory 2, like the extension memory 1, is provided in correspondence to the button "Extension 2" 8-2-2- in each terminal 8, and it holds information (status kind) 2301 indicative of the status of the "Extension 2", information (handset kind) 2302 indicative of the kind of a busy handset, and information (opposite party accommodation No.) 2303 indicative of the position of accommodation of the opposite party terminal when an extension is busy. FIG. 24 shows a terminal memory. This terminal memory is provided for each of the two speech channels, i.e., B1 and B2 channels (L) and (R) of each terminal, and it holds information (connection line kind) 2401 indicative of whether the opposite party line is a trunk or an extension, information (trunk accommodation position No./extension memmory No.) 2402 indicative of the position of accommodation of a connected trunk or an extension memory, and information (received dial No.) 2403 indicative of the dial No. provided by a terminal.

Figure 25:
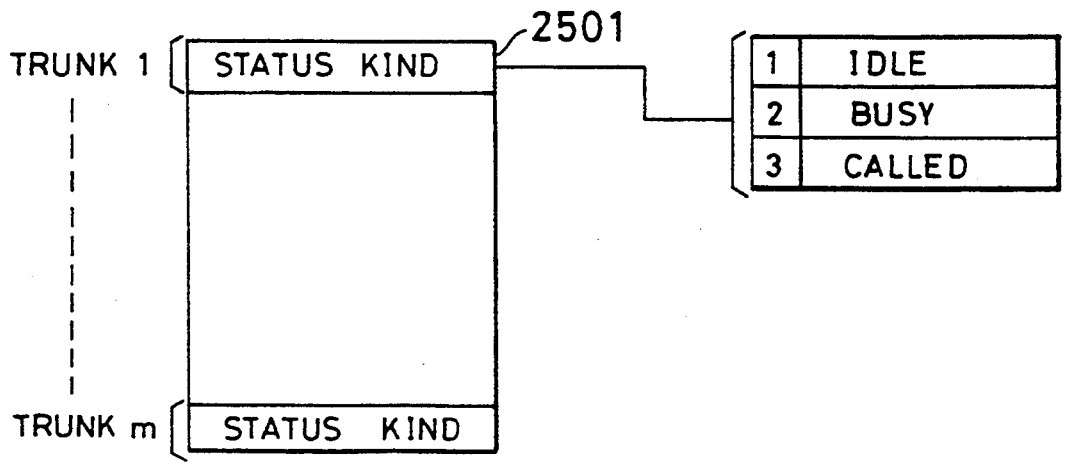

FIG. 25 shows a trunk memory. This trunk memory holds information (status kind) 2501 indicative of the status of the trunks accommodated in the individual exchange sub-systems.

The information held in this trunk memory can be normally transmitted as a call control message to all the terminals and copied in the trunk memories in the terminal 8 shown in FIGS. 18 and 19.

The protocol of communication between the exchange and terminal in this embodiment conforms to the ISDN basic rate interface recommended by the CCITT. However, the layer 3, i.e., the contents of the call control messages, is of a configuration to be described later.

The individual call control messages to be described later are transmitted on the D channel.

FIGS. 26 to 31 show call control messages transmitted from a terminal to an exchange.

Each call control message is provided at the start with an identifier for identifying information on the reception side.

Figure 26:
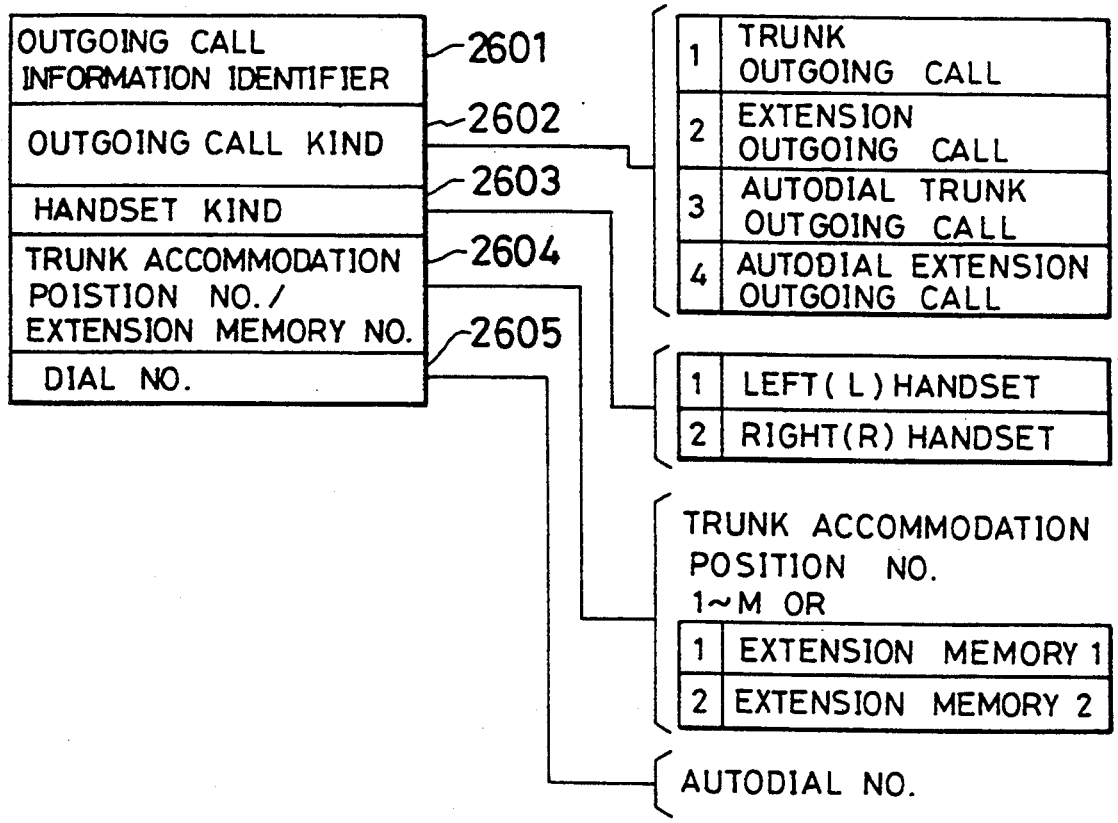
FIGS. 26 to 31 are views showing call control messages from the terminal to the exchange.

FIG. 26 shows a call control message (or outgoing call information) which is transmitted when an outgoing call is provided by the terminal. The identifier is an outgoing call information identifier 2601. This outgoing call information contains information (outgoing call kind) 2602 indicative of the kind of outgoing call such as a trunk outgoing call, extension outgoing call, autodial trunk outgoing call and autodial extension outgoiong call, information (handset kind) 2603 indicative of the left or right handset placing an outgoing call, information (trunk accommodation position No./extension memory No.) 2604 indicative of the position of accommodation of a call party side trunk or an extension memory used for an extension outgoing call, and information (dial No.) 2605 indicative of the dial No. when an autodial outgoing call is placed.

Figure 27:
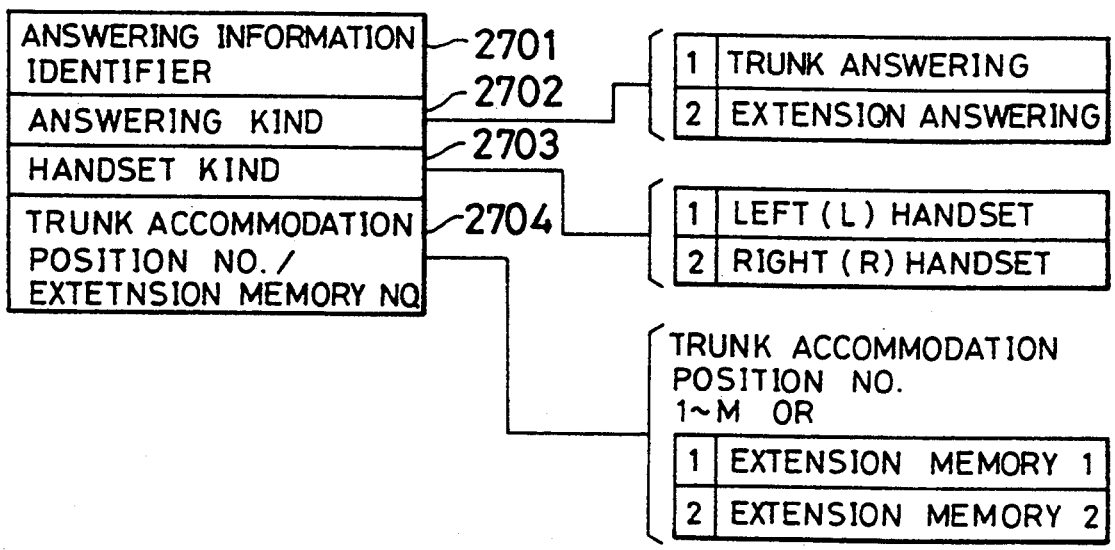

FIG. 27 shows a call control message (answering information) which is transmitted when the terminal answers an incoming call. The identifier is an answering information identifier 2701. The answering information contains information (answering kind) 2702 indicative of whether the answering is a trunk answering or an extension answering, information (handset kind) 2703 indicative of whether the answering handset, is the left or right handset and information (trunk accommodation position No./extension memory No.) 2704 indicative of the position of accommodation of the answering trunk or extension memory used for answering.

Figure 28:
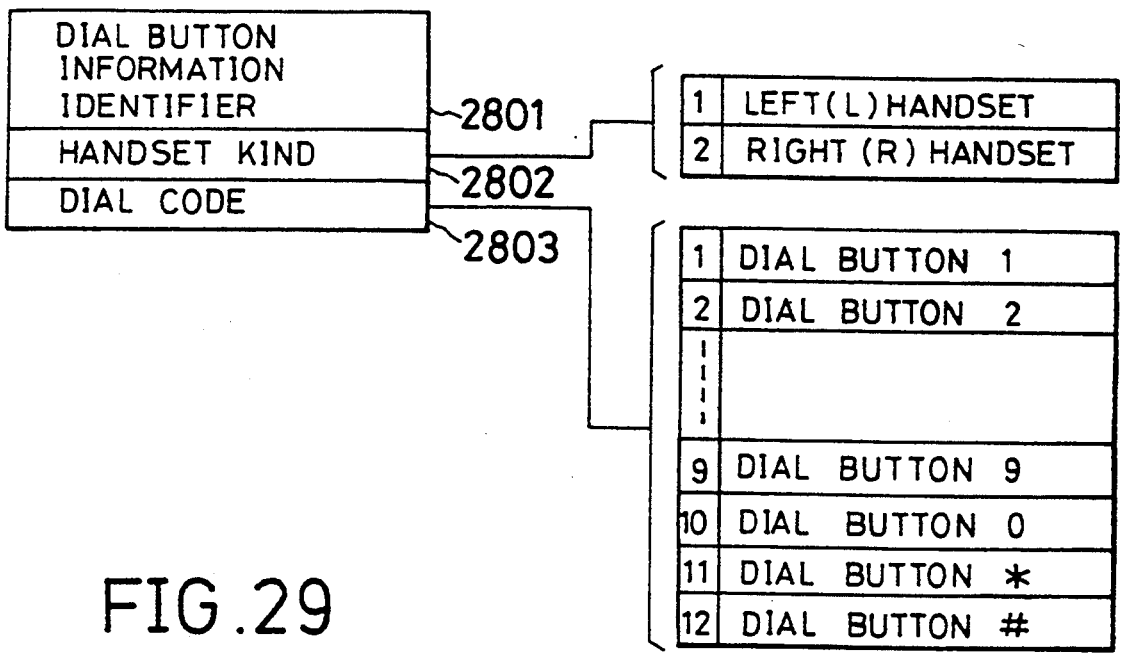

FIG. 28 shows a call control message (or dial button information) which is transmitted when the dial button is depressed. The identifier is dial button information identifier 2801. This dial button information contains information (handset kind) 2802 indicative of whether the handset of the left or right handset and information (dial code) 2803 indicative of the kind of the dial keys "1" to "0", "*" and "#".

Figure 29:
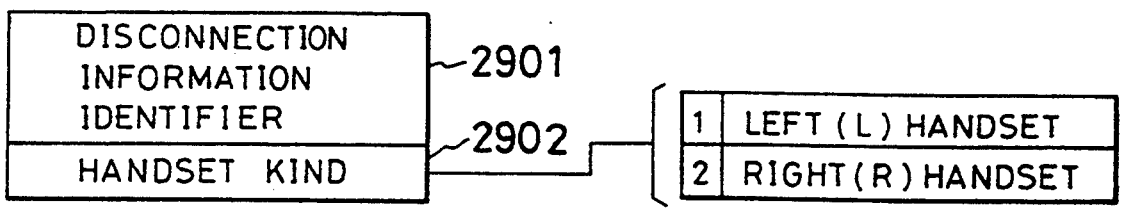

FIG. 29 shows a call control message (or disconnect information) which is transmitted when a busy line is disconnected. The identifier is a disconnection information identifier 2901. This disconnect information contains information (handset kind) 2902 indicative of whether the depressed button is the button "Left Disconnect" 8-8-1 for disconnecting the left handset or the button "Right Disconnect" 8-8-2 for disconnecting the right handset.

Figure 30:
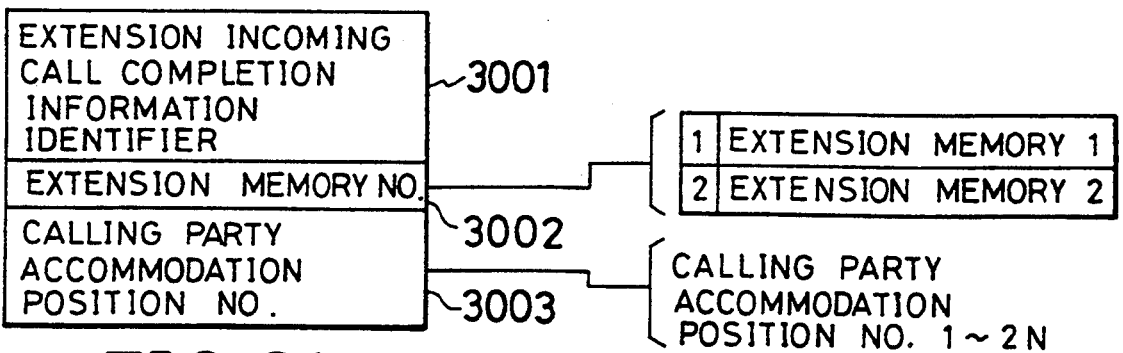

FIG. 30 shows a call control message (or extension incoming call completion information) which is transmitted if an incoming call is possible with respect to extension incoming call information (FIG. 33) of a call control message received from the exchange (to be described later in detail). The identifier is an extension incoming call completion information identifier 3001, This extension incoming call completion information contains information (extension memory No.) 3002 indicative of the extension memory corresponding to the completed incoming call and information (calling party accommodation position No.) 3003 indicative of the position of accommodation of the calling party notified by extension incoming call information (FIG. 33) from the exchange.

Figure 31:
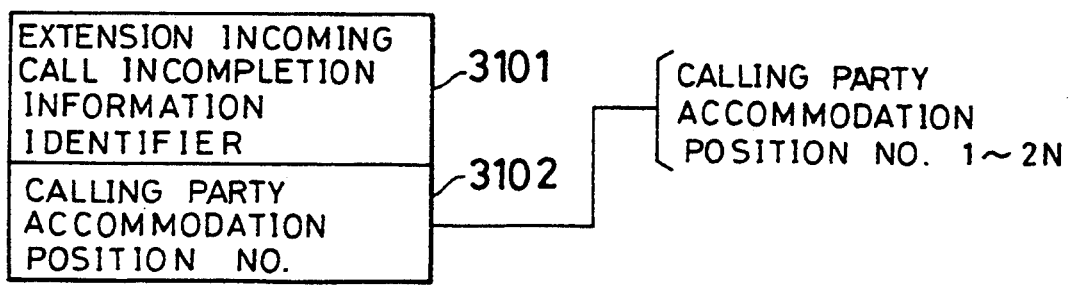

FIG. 31 shows a call control message (or extension incoming call incompletion information) which is transmitted if an incoming call is impossible with respect to the extension incoming carl information (FIG. 33) of a call control message received from the exchange, The identifier is an extension incoming call incompletion information identifier 3101, This extension incoming call incompletion information contains information (calling party accommodation position No,) 3102 indicative of the position of accommodation the calling party notified by the extension incoming call information (FIG. 33) from the exchange.

Figure 32:
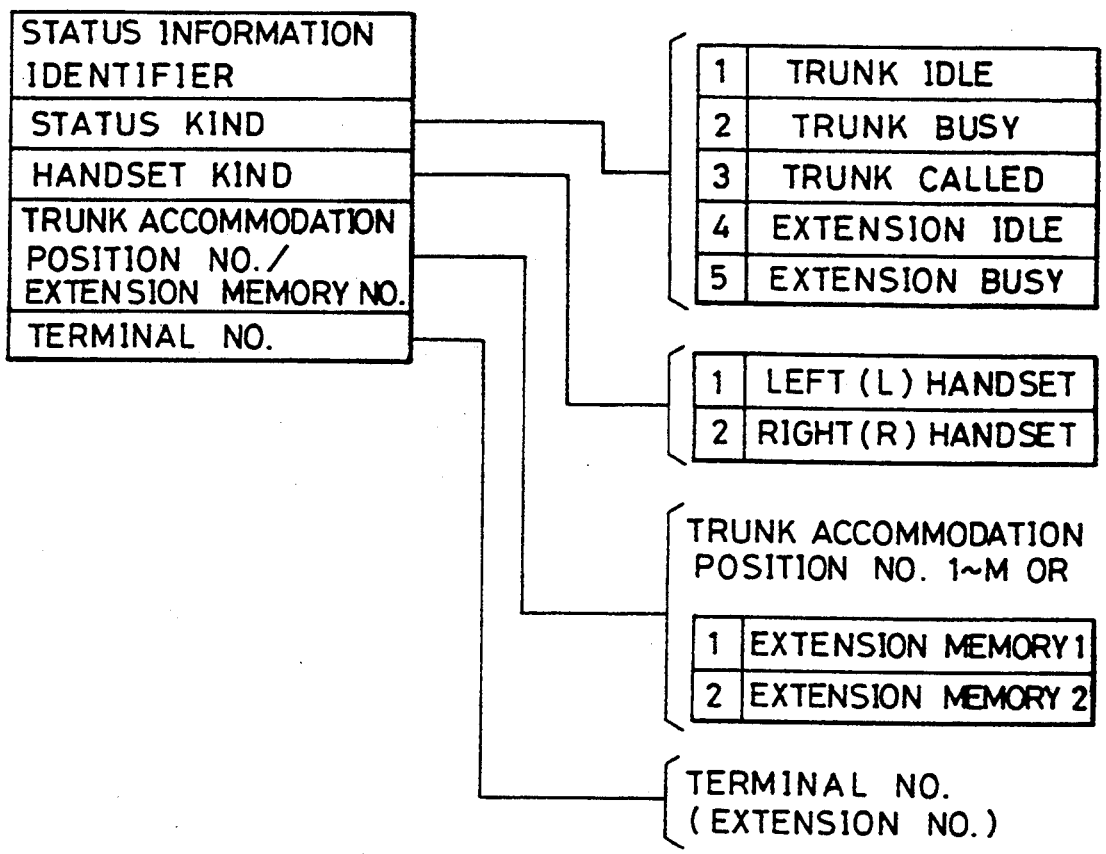
FIGS. 32 to 33 are views showing call control messages from the exchange to terminals.
Figure 33:
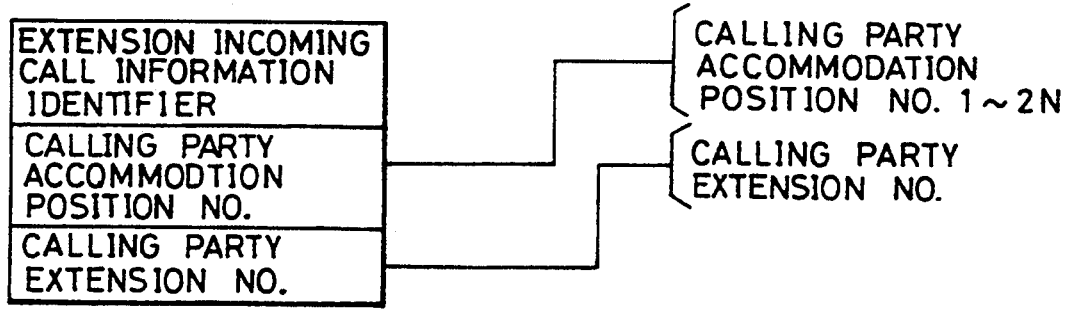

FIGS. 32 and 33 show call control messages transmitted from the exchange to the terminals.

FIG. 32 shows a call control message (or status information) for notifying the terminals of every status change occurring on the exchange side. The identifier is a status information identifier 3201. This status information contains information (status kind) 3202 indicative of the contents of a change in the status such as a trunk is idle, a trunk is busy, an incoming call on a trunk, an extension is idle, an extension is busy and so forth, information (handset kind) 3203 indicative of whether the the handset is the left or right handset, information (trunk accommodation position No./extension memory No.) 3204 indicative of the position of accommodation a trunk having undergone a status change or an extension memory having undergone a status change, and information (terminal No.) 3205 for notifying, when outgoing calls and answers to incoming calls are provided from a plurality of terminals, of the terminals accepting the outgoing calls and answering the incoming calls.

The extension incoming calls among the status changes occurring in the exchange require a call control different from that of the other status changes, and thus form independent call control messages.

FIG. 33 shows a call control message (or extension incoming call information) to be transmitted when there is an extension incoming call. The identifier is an extension incoming call information identifier 3301. This extension incoming call information contains information (calling party accommodation position No.) 3302 indicative of the position of accommodation of the extension outgoing call side and information (calling party extension No.) 3303 indicative of the extension No. of the outgoing call side terminal.

The exchange transmits the extension incoming call information to the terminals and receives either extension incoming call completion information (FIG. 30) or extension incoming call incompletion information (FIG. 31) as answering information from the terminals before excuting the call control. The terminal has a right of call control determination (as to whether connection or restriction is to be executed) at this time. Thus, even when extension incoming calls occur simultaneously in a plurality of exchange sub-systems with respect to the same terminal, call control can be executed without possibility of inconsistency.

Now, a procedure of selection of the left or right handset when there occurs an outgoing call or an answering to an incoming call in a terminal will be described.

The dealing speech terminals in this embodiment, unlike the conventional telephone terminals, do not have any hook switch. This is so since generally a handset placed on a work area of a desk rather than on a the terminal front board in a fixed position thereof permits prompter action and thus is suited for a dealing business or the like which requires prompt action.

Thus, an outgoing call is produced when either of the buttons "Trunk 1" 8-4-1 to "Trunk p" 8-4-p, buttons "Extension 1" 8-2-1 to "Extension 2" 8-2-2 and buttons "Autodial 1" 8-6-1 and "Autodial q" 8-6-q is depressed, and a disconnection of either left or right handset is produced when either button "Left Disconnect" 8-8-1 or button "Right Disconnect" 8-8-2 is depressed.

Here, it is necessary to provide a rule in advance as to which of the left and right handsets is to be connected when an outgoing call or an answering to an incoming call is produced.

Figure 34:
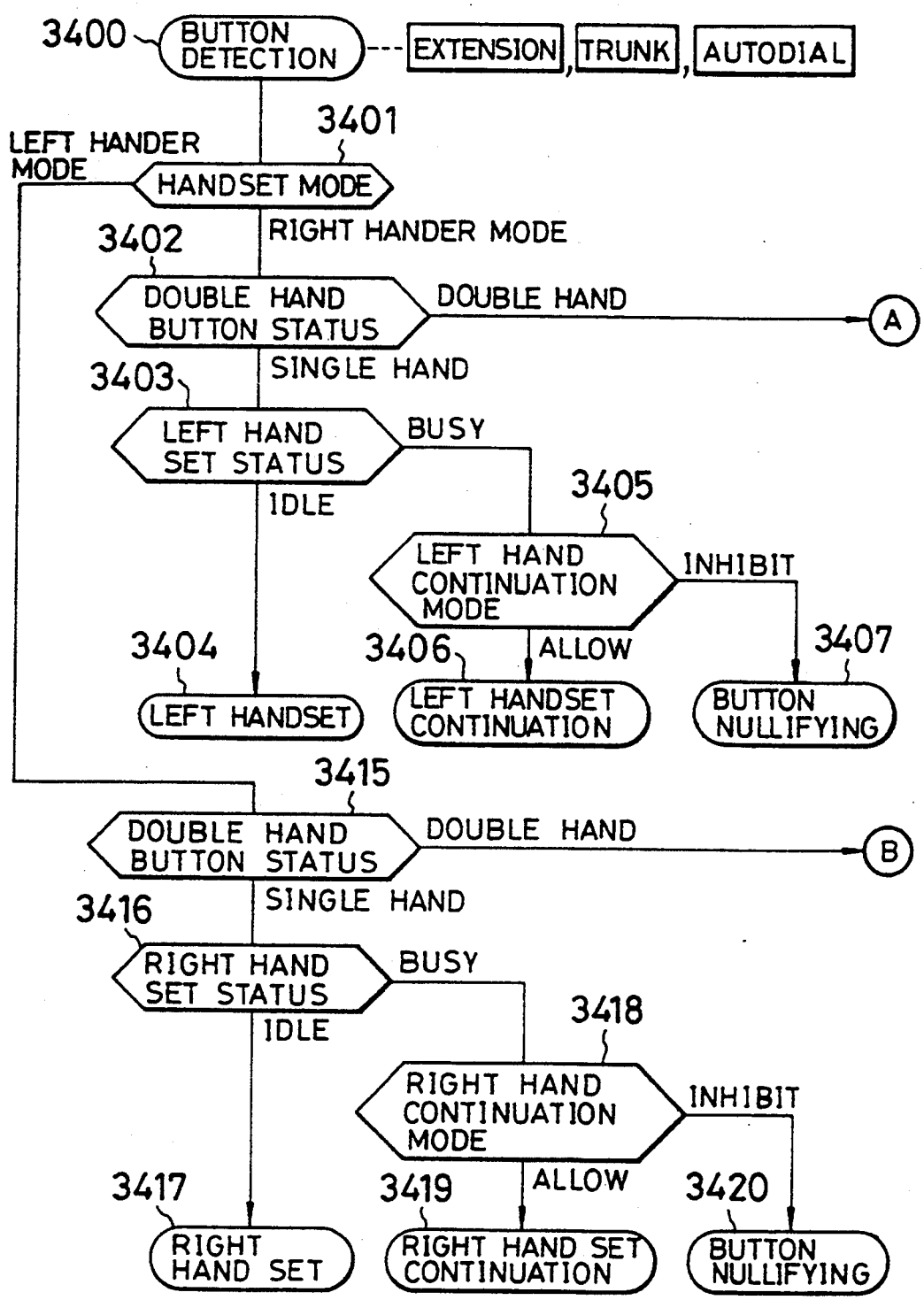
FIGS. 34 and 35 are flow charts illustrating a handset selection procedure.
Figure 35:
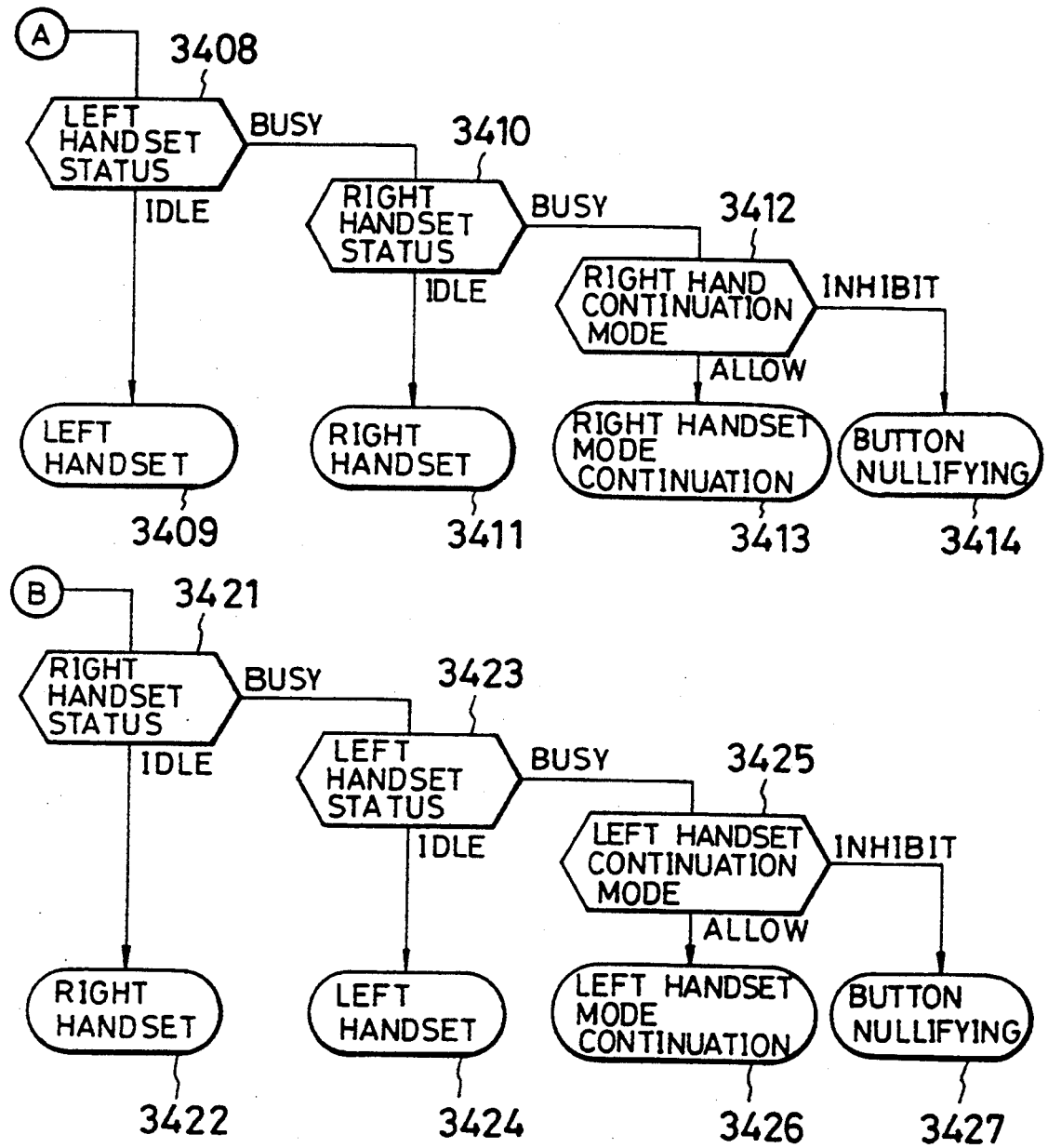

FIGS. 34 and 35 show a flow chart for explaining the method of handset selection in this embodiment.

This flow chart is programmed in the permanent memory 8-15 in the terminal.

Hereinunder, the selection method will be described with reference to FIGS. 34 and 35.

When the operator of a terminal depresses either of the buttons "Trunk 1" 8-4-1 to "Trunk p" 8-4-p, buttons "Extension 1" 8-2-1 to "Extension 2" 8-2-2 and buttons "Autodial 1" 8-6-1 to "Autodial q" 8-6-q, the call control processor 8-14 in the terminal detects the depression (step 3400) and determines whether the operator is a right or left hander with reference to the handset mode table shown in FIG. 10 (step 3401). If the operator is a right hander, the steps 3402 through 3414 are executed progressively. If the operator is a left hander, the steps 3415 to 3427 are executed progressively. Since the control flow in case of the right hander and that in case of the left hander are symmetrical, only the case of the right hander will be described.

Subsequently, the call control processor 8-14 checks whether the present mode is the single or double hand mode with reference to the double hand button memory shown in FIG. 20 (step 3402). If the mode is found to be the single hand mode, only the left handset 8-1-1 can be used. In this case, the processor checks whether the status is "idle" or "busy" with reference to the left (L) handset memory shown in FIG. 14 (step 3403). If the status is "idle", the processor determines to select the left handset (step 3404). If the status is "busy", the processor checks whether "continuous" as allowed with reference to the left hand continuous mode table shown in FIG. 12 (step 3405). If it is found as a result of the check that "continuous" is allowed, the processor executes automatic disconnection of the busy line of call and places a new left handset outgoing call or answers an incoming call (step 3406). If "continuous" is inhibited, the processor nullifies the depressed button (step 3407).

If it is found as a result of the check in the step 3402 that the present mode is the double hand mode., the processor checks whether the status is "idle" or "busy" with reference to the left (L) handset memory shown in FIG. 14 (step 3408). If the status is found to be "idle", the processor determines to select the left handset (step 3409). If the status is "busy", the processor checks the status is idle" or "busy" with reference to the right (R) handset memory shown in FIG. 15 (step 3410). If it is found as a result of the check that the status is "idle", the processor determines to select the right handset (step 3411). If the status is "busy", the processor checks whether continuous" is allowed with reference to the right hand continuous mode table shown in FIG. 13 (step 3412). If it is found as a result of the check that "continuous" is allowed, the processor causes automatic disconnection of the busy right handset and produces a new right handset outgoing call or answers an incoming call (step 3413). If "continuous" is inhibited, the processor nullifies the depressed button (step 3414).

While the processure of selection of the left or right handset has been described above, the following detailed description of call control is based on the assumption of this procedure.

FIGS. 36 to 41 are views showing call control sequences.

FIGS. 42 to 50 are flow charts for explaining the call control in the terminal, and FIGS. 51 to 60 are flow charts for explaining the call control in the exchange.

In the following descripton of the embodiment, trunk outgoing call (FIG. 36), trunk incoming call (FIG. 37), extension outgoing call (FIG. 38), extension incoming call (FIG. 39), autodial trunk outgoing call (FIG. 40) and autodial extension outgoing call (FIG. 41) will be described with reference to the flow charts of FIGS. 42 to 50 and FIGS. 51 to 60, respectively.

Figure 36:
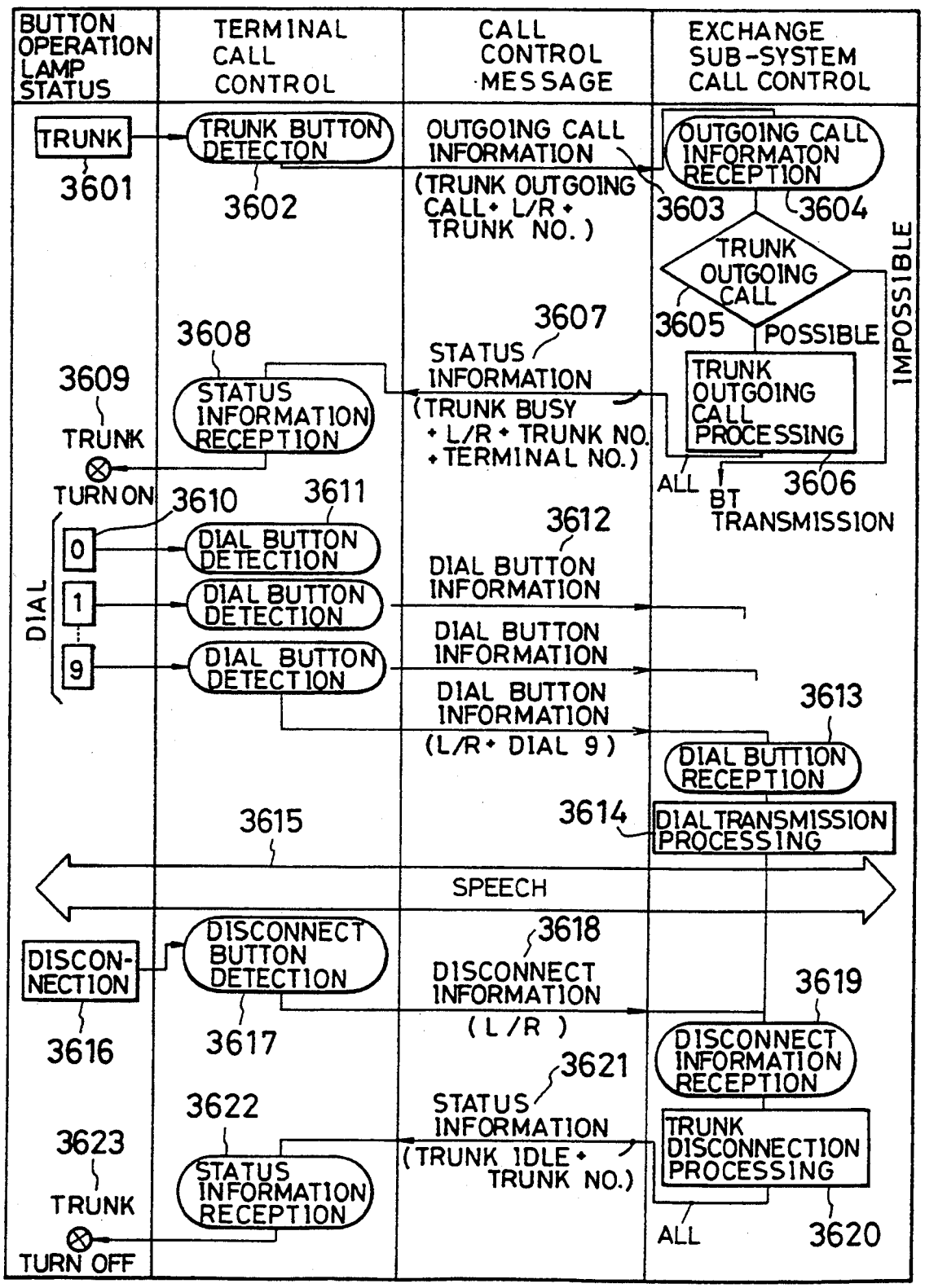
FIG. 36 is a view showing a call control sequence when an outgoing call is placed on a trunk.
Figure 42:
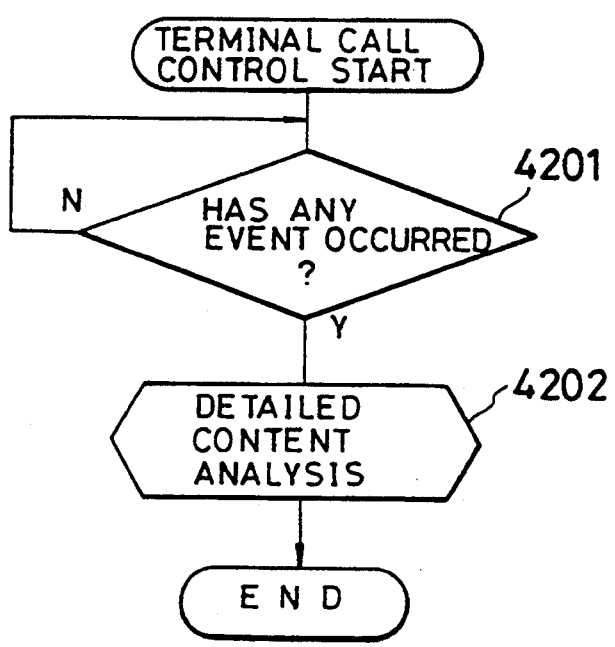
FIGS. 42 to 50 are flow charts showing terminal call control.

Referring to FIG. 36, when the operator of a terminal depresses either of the buttons "Trunk 1" 8-4-1 to "Trunk p" 8-4-p (3601, FIG. 36), the call processor 8-14 of the terminal recognizes occurrence of some event from FIG. 42 (step 4201) and analyzes the content (step 4202). If the processor detects as a result that either one of the buttons "Trunk 1" 8-4-1 to "Trunk p" 8-4-p is depressed (3602, FIG. 36), the processor executes a trunk button detection processing as shown in FIG. 43.

Figure 43:
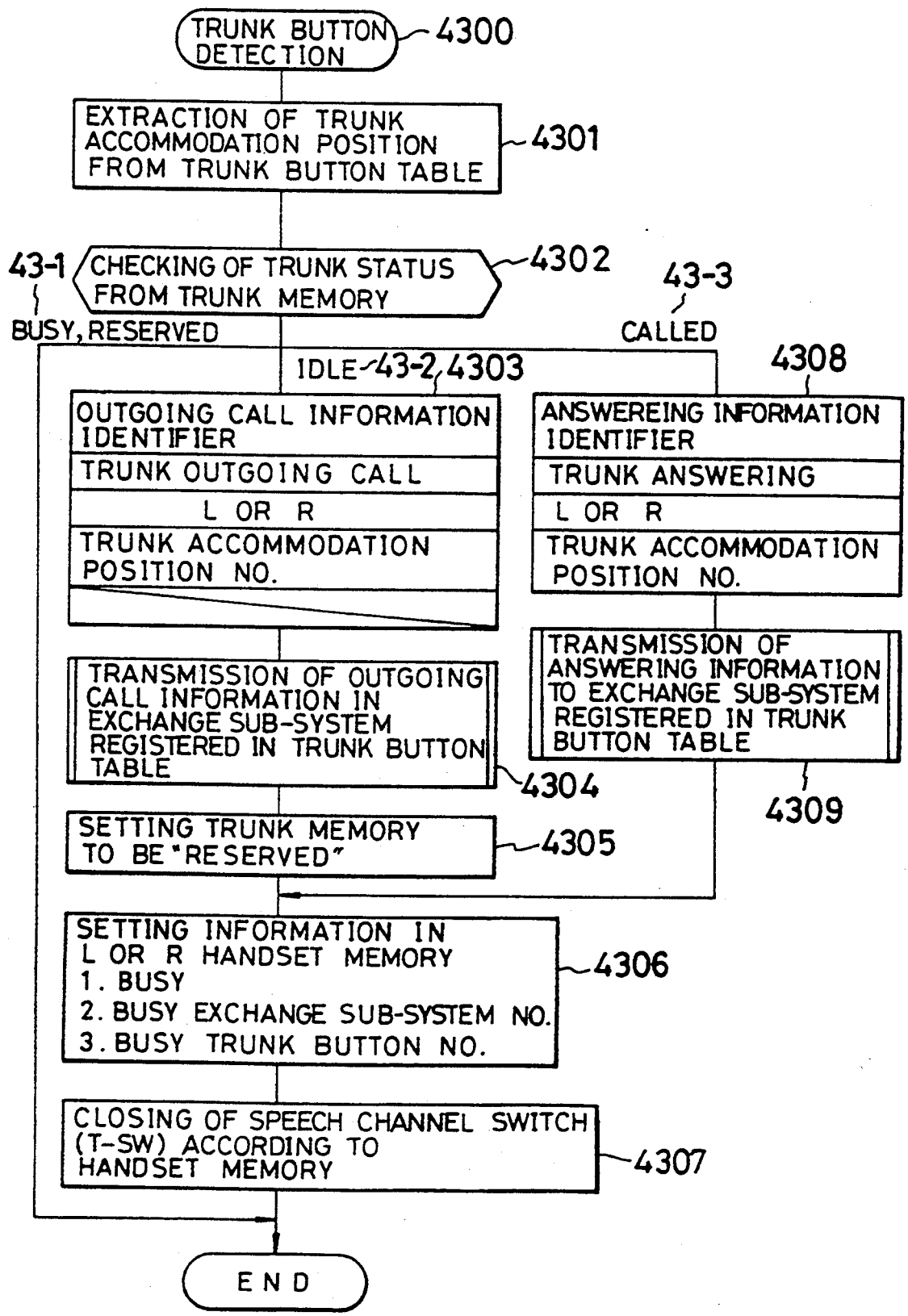

Referring to FIG. 43, the processor first extracts the trunk accommodation position No. 702 and exchange subsystem No. 701 corresponding to the depressed button with reference to the trunk button table shown in FIG. 7 (step 4301) or checks the status of the pertinent trunk from the trunk memory shown in FIG. 18 or 19 (step 4302). If it is found as a result of the check that the status is "idle", the processor executes a trunk outgoing call processing via an idle route (43-2).

First, the processor edits outgoing call information (FIG. 26) including the trunk accommodation position No. and selected handset information and indicating a trunk outgoing call in the. procedure shown in FIGS. 34 and 35 (step 4303), and sends out the outgoing call information (3603, FIG. 36) to the exchange sub-system extracted from the trunk button table shown in FIG. 7 (step 4304). Then the processor sets the corresponding trunk region of the trunk memory shown in FIG. 18 or 19 to be "reserved" (step 4305), and sets the busy status, busy exchange subsystem No. and trunk button No. of the depressed one of the buttons "Trunk 1" 8-4-1 to "Trunk p" 8-4-p (step 4306) in the left handset memory shown in FIG. 14 or right handset memory shown in FIG. 15. Further, it controls the speech channel switch 8-30 on the basis of the handset memory shown in FIG. 14 or 15 to close the speech channel (step 4307).

Figure 51:
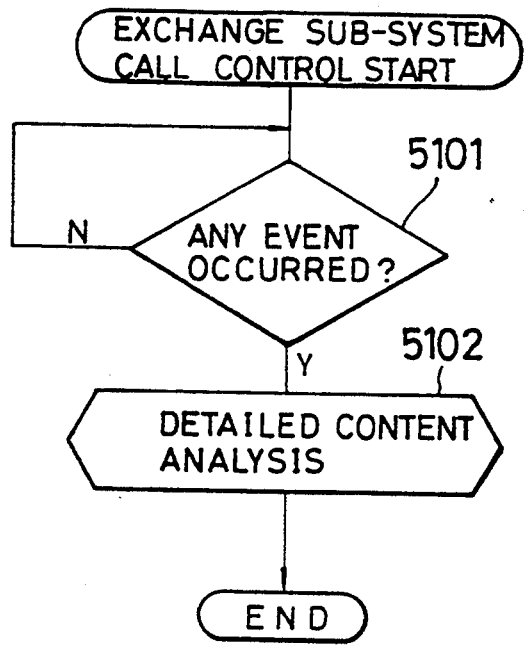
FIGS. 51 to 60 are flow charts showing exchange call control.

The exchange, on the other hand, detects occurrence of some event in the processing shown in FIG. 51 (step 5101) and analyzes the content (step 5102). If it recognizes reception of outgoing call information (3603, FIG. 36) from a terminal (3604, FIG. 36), it executes an outgoing call information reception processing shown in FIGS. 54 and 55.

First, the exchange checks the kind of outgoing call contained in the outgoing call information (3603, FIG. 36) (step 5401). By confirming the call to be a trunk outgoing call, it executes a trunk outgoing call processing via the trunk outgoing call route (54-1).

First, the exchange checks the status of the pertinent trunk from the trunk memory shown in FIG. 25 (step 5402). Since no outgoing call can be placed in a status other than the idle status, it sends out a busy tone (BT tone) to the terminal accommodation position corresponding to the handset of the terminal having transmitted the outgoing call information. If the trunk is idle, it edits status information (3607, FIG. 36) containing the handset kind, trunk accommodation position No. and outgoing call terminal No. and indicating that a trunk is busy (step 5403) and sends out the status information (3607, FIG. 36) to all the terminals (step 5404). (In FIG. 36, symbol ALL signifies sending to all the terminals) Then the exchange sets the corresponding region of the trunk memory shown in FIG. 25 to be busy" (step 5405), and its sets that the trunk is busy together with the trunk accommodation position No. in the pertaining handset region of the terminal memory shown in FIG. 24 (step 5406). Subsequently, it controls the speech channel switch 1A or 1B to close a speech channel between the terminal accommodation position corresponding to the handset and trunk accommodation position (step 5407) and sends out an outgoing call order to the trunk to start the line (step 5408).

With the call control so far, the operator of the terminal can hear the dial tone (DT tone) from the line with the handset.

Figure 49:
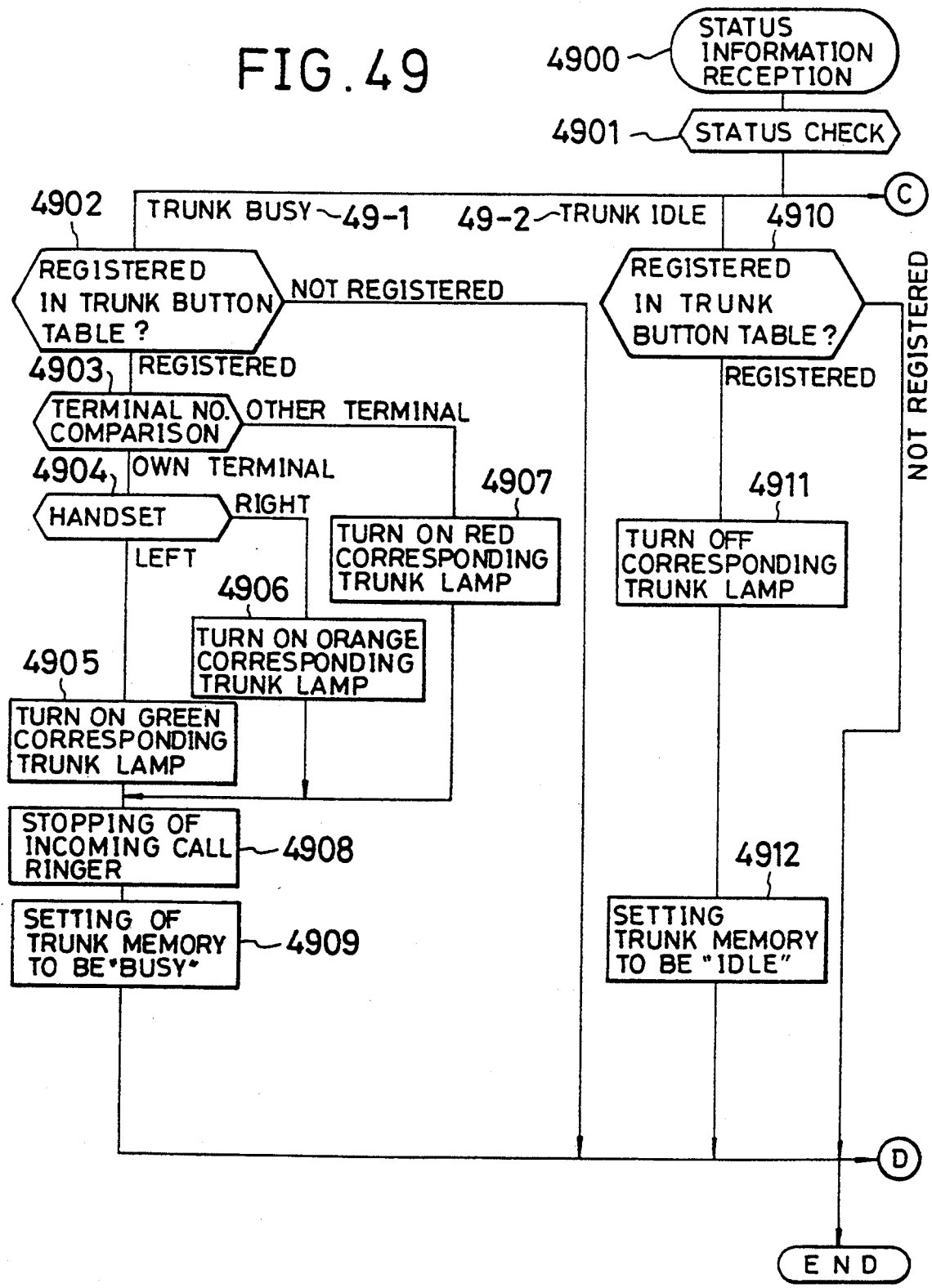
Figure 50:
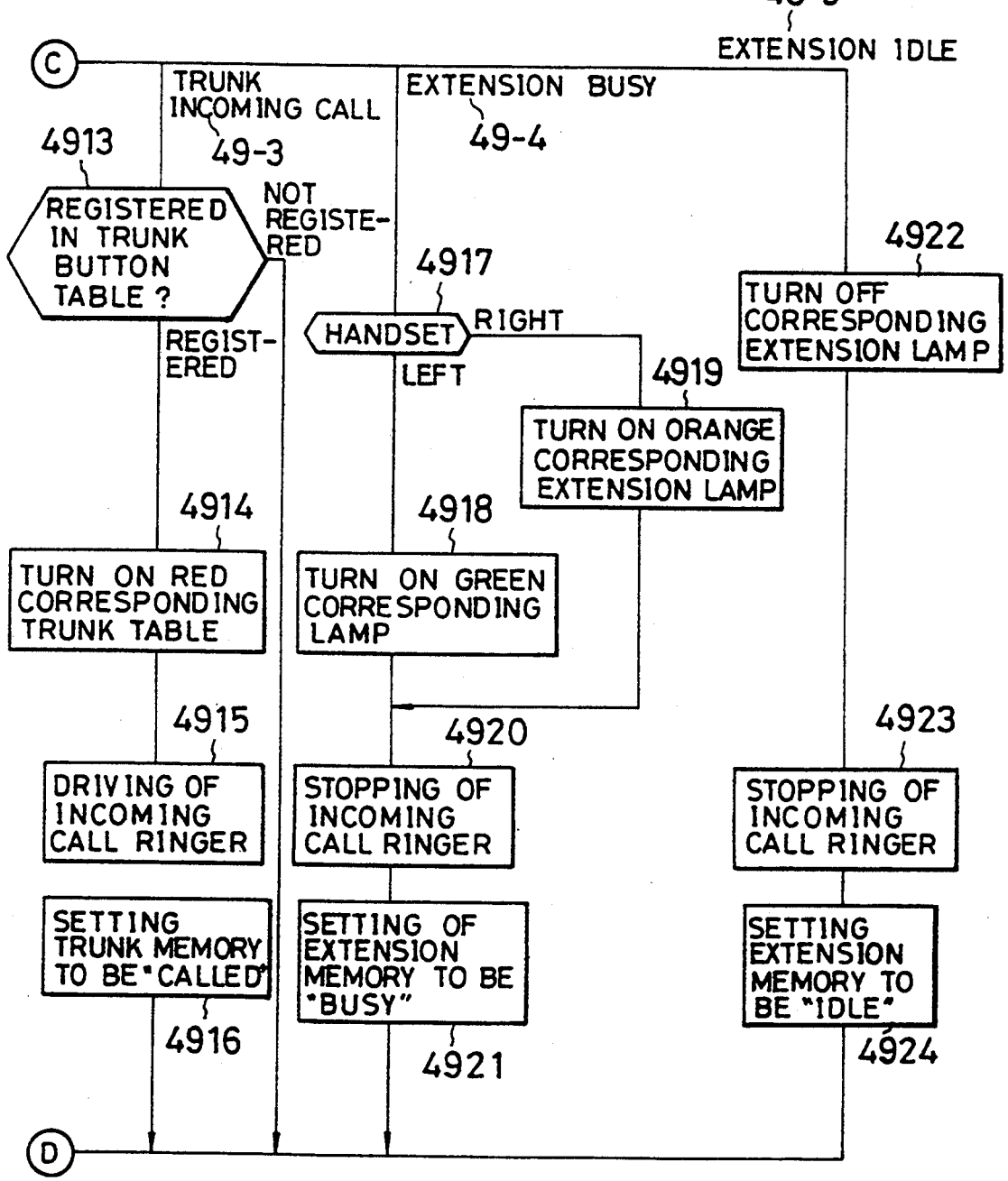

Further, all the terminals having recognized the reception of the status information (3607, FIG. 36) through the processing shown in FIG. 42 execute the status information reception processing shown in FIGS. 49 and 50.

First, the terminal checks the status kind contained in the received status information (3607, FIG. 36) (step 4901) and executes a trunk busy processing of a trunk busy route (49-1). The terminal checks whether the trunk is registered in the trunk button table shown in FIG. 7 (step 4902). If the trunk is not registered, this status information is ignored. If the trunk is registered, the terminal compares the terminal No. contained in the status information with the own terminal No. shown in FIG. 9 (step 4903). If the two data are identical, the terminal recognizes that the status information has been provided as a result of occurrence of an outgoing call from its own terminal. Thus, it checks the handset kind contained in the status information (step 4904). If the handset is the left one, it turns on green the pertinent one of the lamps 8-5-1 to 8-5-p corresponding to the buttons "Trunk 1" 8-4-1 "Trunk p" 8-4-p shown in FIG. 4 (step 4905). If the handset is the right one, it turns on orange the lamp (step 4906). Thus, the dealer can recognize at a glance either left or right handset and button that are busy.

If a terminal No. of a terminal other than its own is contained in the status information, the terminal turns on red the pertinent one of the lamps 8-5-1 to 8-5-p corresponding to the buttons "Trunk 1" 8-4-1 to "Trunk p" 8-5-](step 4907) to indicate that a terminal other than its own is being used.

The instant route is followed when answering an incoming call as will be described later. Thus, the terminal executes a processing of stopping the incoming call ringer (step 4908). In case if the incoming call ringer is being driven while there is a button corresponding to an incoming call, the driving of the ringer is continued. Finally, the terminal sets "busy" in the pertinent region of the trunk memory shown in FIG. 18 or 19 and ends the processing.

Figure 46:
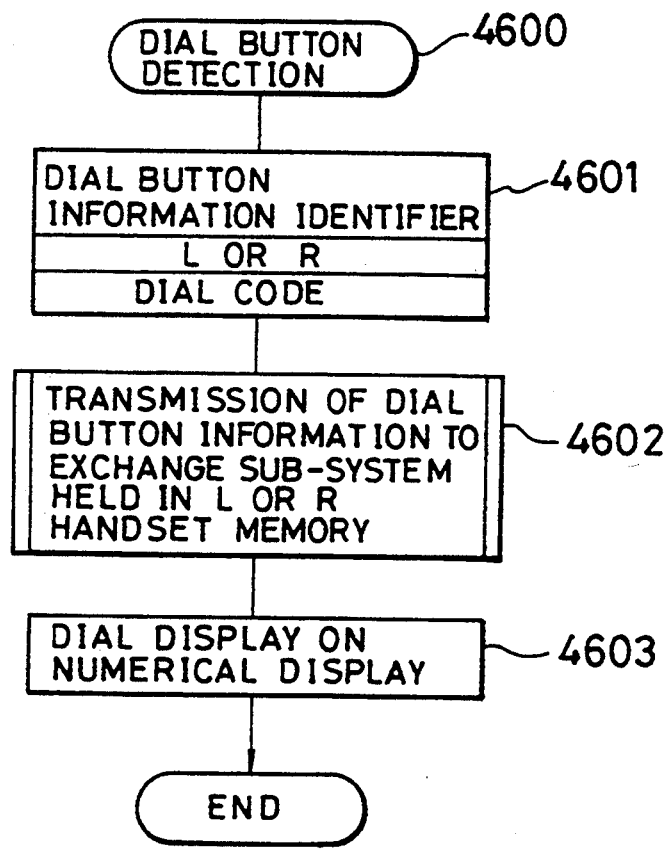
Figure 47:
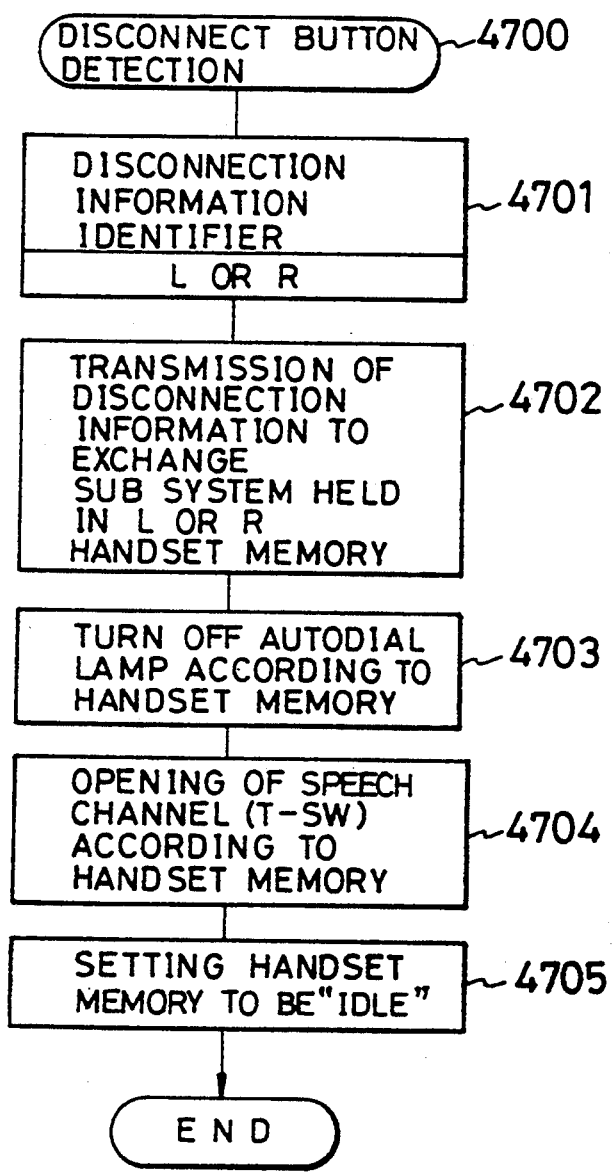

Now, the operator dials necessary digits with the dial key set 8-10 shown in FIG. 4 while hearing the DT tone (3610, FIG. 36). As a result, the call control processor 8-14 of the terminal recognizes this through the processing shown in FIG. 42 (3611, FIG. 36) and executes a dial key detection processing as shown in FIG. 46. In this dial key detection processing, the processor edits dial key information containing the handset kind and dial No. (step 4601) and sends out this dial key information (3612, FIG. 36) to the exchange sub-system which is held in the handset memory (FIG. 14 or 15) determined in accordance with the handset selection procedure shown in FIGS. 34 and 35 (step 4602). Further, the call control processor 8-14 transmits the dialed No. information to the numeral display controller 8-25 for successive display on the numeral display 8-9 (step 4603).

Figure 59:
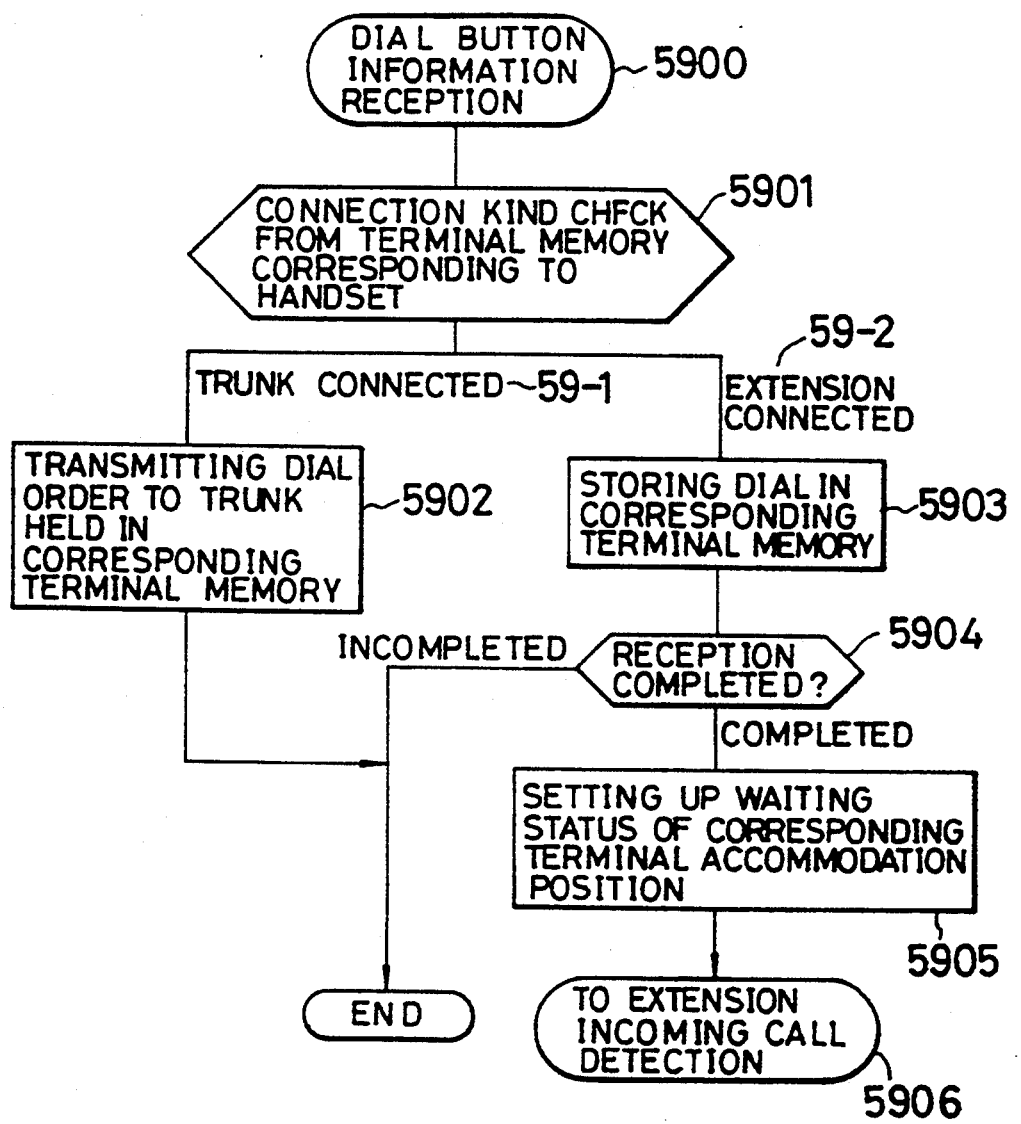

On the other hand, when the exchange recognizes the reception of the dial key information (3612, FIG. 36) (3613, FIG. 36), it executes a dial key information reception processing shown in FIG. 59.

First, it determines the kind of connection with reference to the handset-corresponding terminal memory shown in FIG. 24 (step 5901). Here, the kind of connection is the connection of a trunk, and therefore the exchange executes a processing while a trunk is connected through the trunk-in-connection route (59-1) and sends out a dial order to the trunk which is held in the terminal memory shown in FIG. 24 (step 5902). Subsequently, it ends the transmission of the dial in digits required for the trunk (3614, FIG. 36). Then, when the opposite party subscriber answers, the busy status is set up (3615, FIG. 36).

When the operator desires to disconnect the busy line, the operator depresses the pertinent disconnect button of the handset which is desired to be disconnected, that is, either button "Left Disconnect" 8-8-1 or "Right Disconnect" 8-8-2 shown in FIG. 4 (3616, FIG. 36). As a result, the call control processor 8-14 detects this through FIG. 42 (3617, FIG. 36) and executes a disconnect button detection processing shown in FIG. 47.

First, the processor edits disconnect information (3618, FIG. 36) containing the handset kind (step 4701) and sends out the information to the exchange sub-system held in the handset memory shown in FIG. 14 or 15 (step 4702). Then, it opens the speech channel leading to the exchange sub-system having transmitted the disconnect information through control of the speech channel swatch 8-30 (step 4704). Then it sets the pertinent region in the handset memory to be "idle" (step 4705) and ends the processing.

Figure 60:
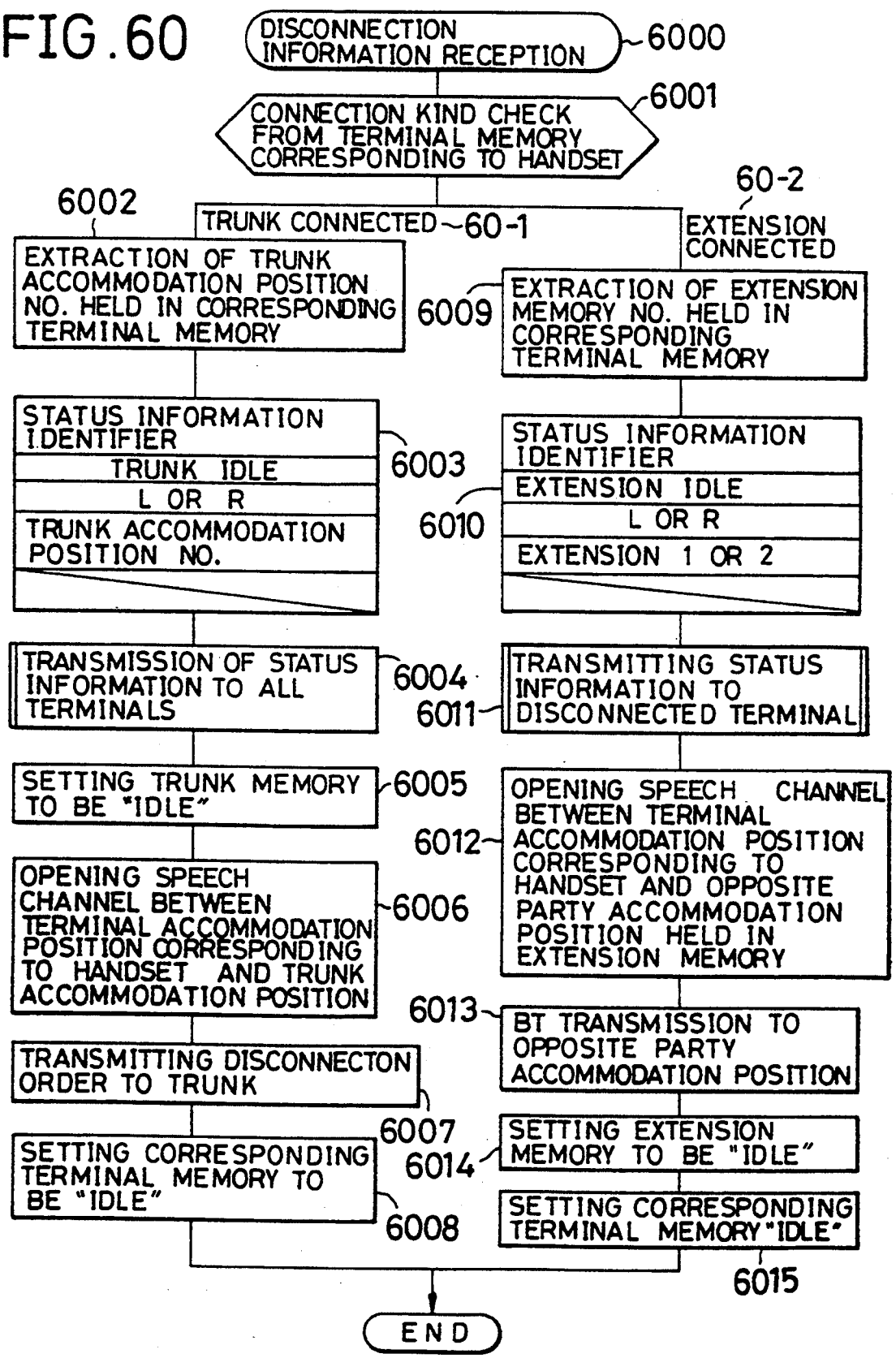
Figure 61:
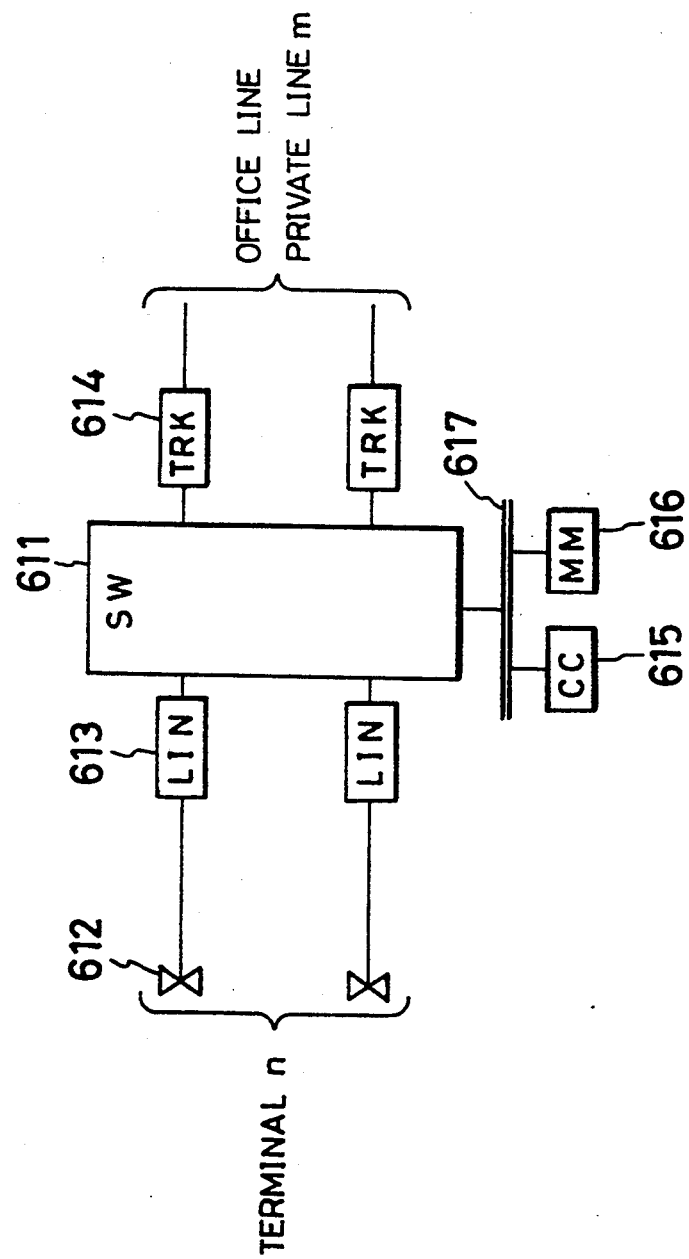
FIG. 61 is a view showing a structure example of the prior art telephone exchange system.

When the exchange recognizes the reception of the disconnect information (3618, FIG. 36) according to FIG 51 (3619, FIG. 36), it executes a disconnect information reception processing shown in FIG. 60. First, the exchange determines the kind of connection to the corresponding handset with reference to the terminal memory shown in FIG. 24 (step 6001). Since the kind of connection here is the connection to a trunk, it selects a trunk-in-connection route (60-1) and executes a trunk-in-connection processing.

First, the exchange extracts the trunk accommodation position No. held in the terminal memory shown in FIG. 24 (step 6002), then edits status information (3621, FIG. 36) containing the trunk accommodation position No. and indicating that the trunk has become idle and sends out the status information (3621, FIG. 36) to all the terminals (step 6004). Then, it sets the pertinent region of the trunk memory shown in FIG. 25 to be idle (step 6005) and opens the speech channel between the terminal accommodation position corresponding to the handset and trunk accommodation position through control of the speech channel switch 1A or 1B (step 3006). Then, it sends out a disconnect order to the trunk (step 6007) and opens the line (3620, FIG. 36). Also, it sets the pertinent region of the terminal memory shown in FIG. 24 to be "idle" (step 6008) and ends the processing.

Further, each of the terminals detecting the reception of the status information (3621, FIG. 36) from the exchange according to FIG. 42, executes the status information reception processing shown in FIG. 49 and 50.

First, the terminal determines the status kind contained in the received status information (step 4901). In this instance, it selects a trunk idle route (49-2) and executes a trunk idle processing.

In this trunk idle processing, it checks whether the trunk corresponding to the trunk button table shown in FIG. 7 is registered (step 4910). If no such trunk is registered, the information is ignored. If the trunk is registered, the corresponding trunk lamp among the lamps 8-5-1 to 8-5-p shown in FIG. 4 is turned off (step 4911), then sets the pertinent region in the trunk memory shown in FIG. 18 or 19 to be "idle" (step 4912) and ends the processing.

As has been shown, a sequence of call control is executed for a trunk outgoing call.

Figure 37:
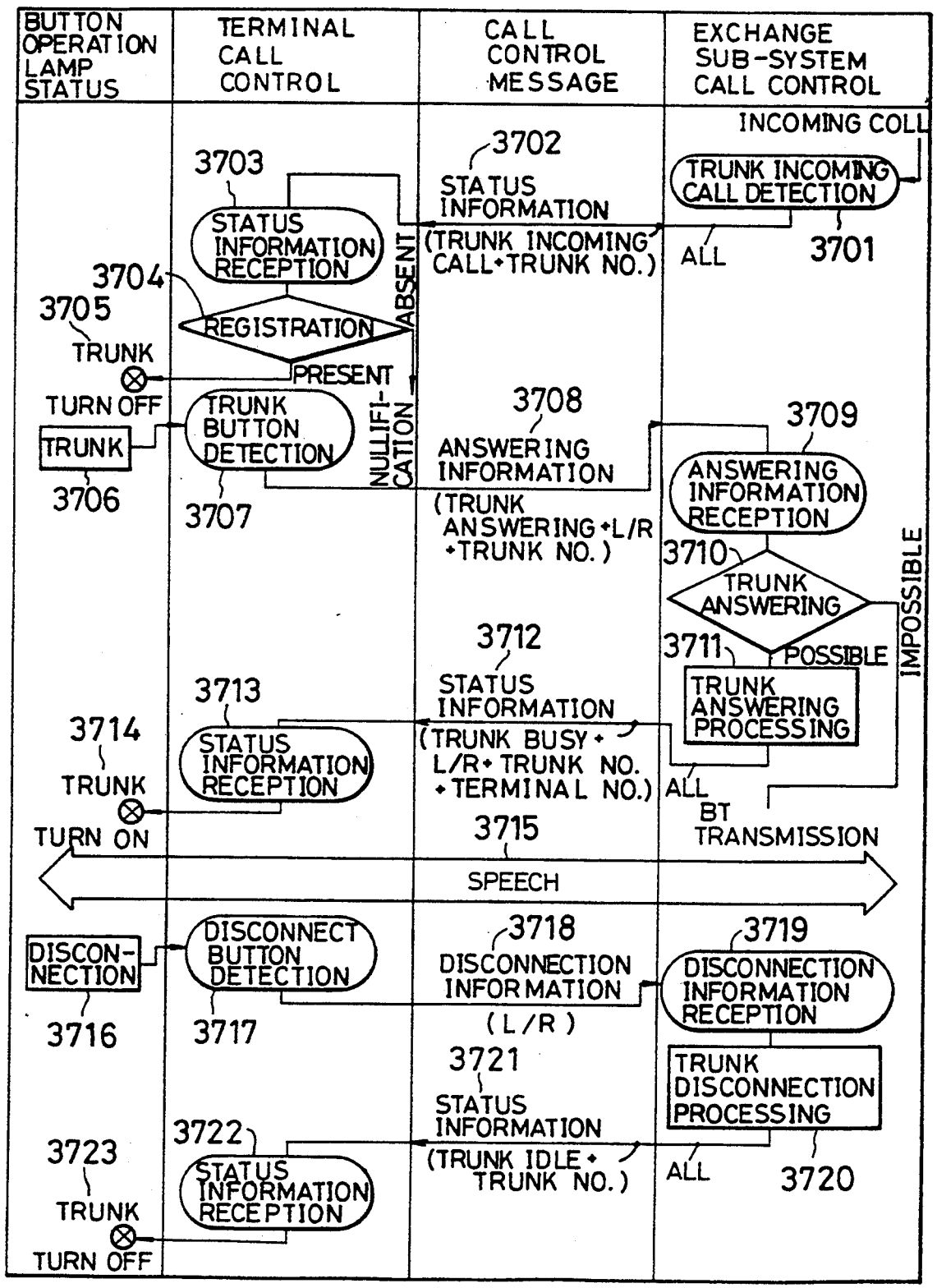
FIG. 37 is a view showing a call control sequence when an incoming call is placed on a trunk.
Figure 52:
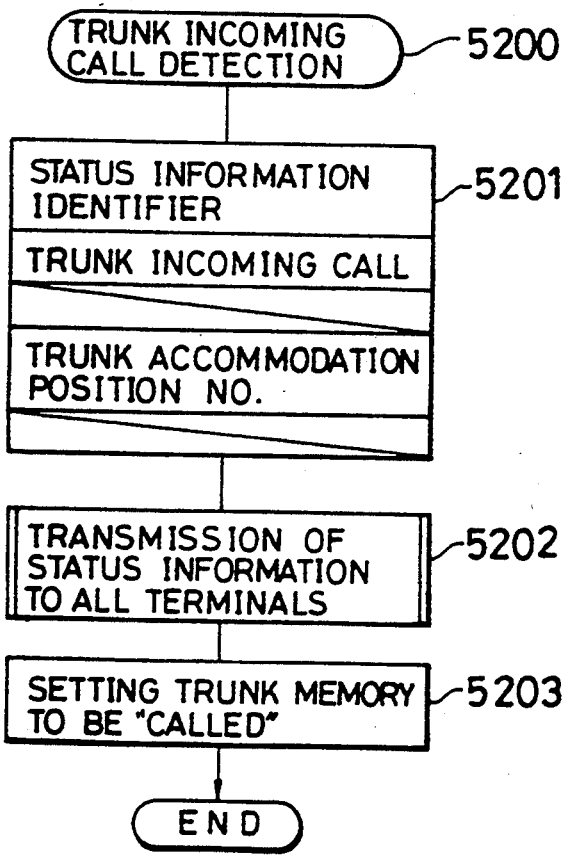

When an incoming call from line to exchange occurs in FIG. 37, the exchange detects the incoming call (3701, FIG. 37) and executes a trunk incoming call detection processing shown in FIG. 52.

First, the exchange edits status information (3702, FIG. 37) containing the position of accommodation of the pertinent trunk and indicating that the incoming call is a trunk incoming call (step 5201), then sends out status information (3702, FIG. 37) to all the terminals (step 5202) and sets the pertinent region of the trunk memory shown in FIG. 25 to be "called" (step 5203). When the terminal recognizes the reception of the status information (3702, FIG. 37) from the exchange according to FIG. 42 (3703, FIG. 37), it executes a status information reception processing shown in FIGS. 49 and 50.

The terminal first determines the status kind contained in the received status information (step 4901). In this instance, it selects a trunk incoming call route (49-3) and executes a trunk incoming call processing.

In this trunk incoming call processing, the terminal first checks whether the pertinent trunk is registered in the trunk button table shown in FIG. 7. If no such a trunk is registered, it ignores the status information. If the trunk is registered, it indicates this by causing red flickering of the pertinent one of the lamps 8-5-1 to 8-5-p corresponding to the buttons "Trunk 1" 8-4-1 to "Trunk p" 8-4-p shown in FIG. 4 (step 4914) and drives the ringer in accordance with the incoming call tone kind registered in the trunk button table shown in FIG. 7 (step 4915). Then, it sets incoming call information in the pertinent region in the trunk memory shown in FIG. 18 or 19 (step 4916) and waits for an operator's answer.

When the operator of either terminal depresses the button corresponding to the red flickered one of the lamps 8-5-1 to 8-5-p (i.e., either one of the buttons "Trunk 1" 8-4-1 to Trunk p" 8-4-p), the call control processor 8-14 detects that the incoming call has been answered according to FIG. 42 and executes a trunk button detection processing shown in FIG. 43.

In this trunk button detection processing, the processor first extracts the trunk accommodation position and pertaining exchange sub-system No. from the table corresponding to the depressed button (i.e., one of the buttons "Trunk 1" 8-4-1 to "Trunk p" 8-4-p) with reference to the trunk button table shown in FIG. 7 (step 4301) and determines the status of the pertinent trunk from the trunk memory shown in FIG. 18 and 19 according to the extracted information (step 4302). In this instance, the status is "called", and thus the processor selects a called route (43-3) and executes a trunk answering processing.

In this trunk answering processing, the processor edits answering information (3708, FIG. 37) containing information about the kind of the selected handset and indicating the answering to the trunk (step 4308) and sends out the answering information (3708, FIG. 37) to the exchange sub-system corresponding to the exchange sub-system No. extracted from the trunk button table shown in FIG. 7 (step 4309). Then, it sets that the busy status is brought about together with the No. of the busy exchange sub-system and No. of the depressed button (i.e., one of the buttons "Trunk 1" 8-4-1 and "Trunk p" 8-4-p) in the handset memory shown in FIG. 14 or 15 (step 4306). Further, it closes the speech channel by controlling the speech channel switch 8-30 according to the handset memory shown in FIG. 14 or 15 (step 4307). When the exchange detects the detection of the answering information (3708, FIG. 37) from the terminal according to FIG. 51 (3709, FIG. 37), it executes an answering information reception processing shown in FIG. 58. In this answering information reception processing, it determines the answering kind contained in the received answering information (step 5801). Since there is trunk answering here, it selects a trunk answering route (58-1) and executes a trunk answering processing.

In this trunk answering processing, the processor checks the status of the pertinent trunk from the trunk memory shown in FIG. 25 (step 5802). If the status is other than "called", answering an incoming call can not be executed. Therefore, the processor sends out a busy tone (or BT tone) to the terminal accommodation position corresponding to the handset (step 5809). If the trunk status is "called", the processor edits status information (3712, FIG. 37) containing the kind of handset, trunk accommodation position No. and answered terminal No. and indicating that the trunk status is "busy" (step 5803) and sends out the status information (3712, FIG. 37) to all the terminals (step 5804). Then, it sets the pertinent region of the trunk memory shown in FIG. 25 to be "busy" (step 5805) and sets the trunk connection and trunk accommodation position No. in the region of the terminal memory shown in FIG. 24 corresponding to the the pertinent handset (step 5806). Then, it closes the speech channel between the terminal accommodation position corresponding to the handset and trunk accommodation position through control of the speech channel switch 1A or 1B (step 5807) and sends out an answering order to the trunk (step 5808) to effect answering the line.

Further, the terminal which detects the reception of the status information (3712, FIG. 37) from the exchange according to FIG. 42 (3713, FIG. 37), executes a status information reception processing shown in FIGS. 49 and 50.

The terminal first checks the the status kind contained in the received status information (step 4901). In this instance, it selects a trunk busy route (49-1) and executes a trunk busy processing.

In this trunk busy processing, the terminal first checks whether the trunk is registered in the trunk button table shown in FIG. 7 (step 4902). If the trunk is not registered, the terminal ignores this status information. If the trunk is registered, it compares the terminal No. contained in the status information and its own terminal No. shown in FIG. 9 (step 4903). If the compared data are identical, it determines that the status information is provided as a result of answering by itself and thus checks the handset kind contained in the status information (step 4904). If the handset is the left handset, the terminal turns on green the pertinent one of the lamps 8-5-1 to 8-5-p corresponding to the buttons "Trunk 1" 8-4-1 to "Trunk p" 8-4-p shown in FIG. 4. If the handset is the right handset, it turns on orange the lamp (step 4906). The operator can thus confirm at a glance the busy handset which is either the left or right handset and busy button.

If the terminal No. contained in the status information is of a different terminal, the terminal turns on red the pertinent one of the lamps 8-5-1 to 8-5-p corresponding to the buttons "Trunk 1" 8-4-1 to Trunk " 8-4-p (step 4907) to indicate that a terminal other than its own is being used. Then, it executes a processing of stopping the incoming call ringer (step 4908).If there is a different incoming call button and the incoming call ringer is being driven, the driving is continued. Finally, busy" is set in the pertinent region of the trunk memory shown in FIG. 18 or 19 (step 4909) and ends the processing.

Through the above call control, the operator of the terminal having executed the answering operation becomes busy with the outgoing call side subscriber through the selected handset (3715, FIG. 37).

When the operator desires to disconnect the busy line, the operator executes a disconnecting operation by depressing the disconnect button corresponding to the pertinent handset, i.e., either button "Left Disconnect" 8-8-1 or button "Right Disconnect" 8-8-1. The subsequent processing is call control like the disconnection processing in case of a trunk outgoing call shown in FIG. 36, and hence is not described.

Figure 38:
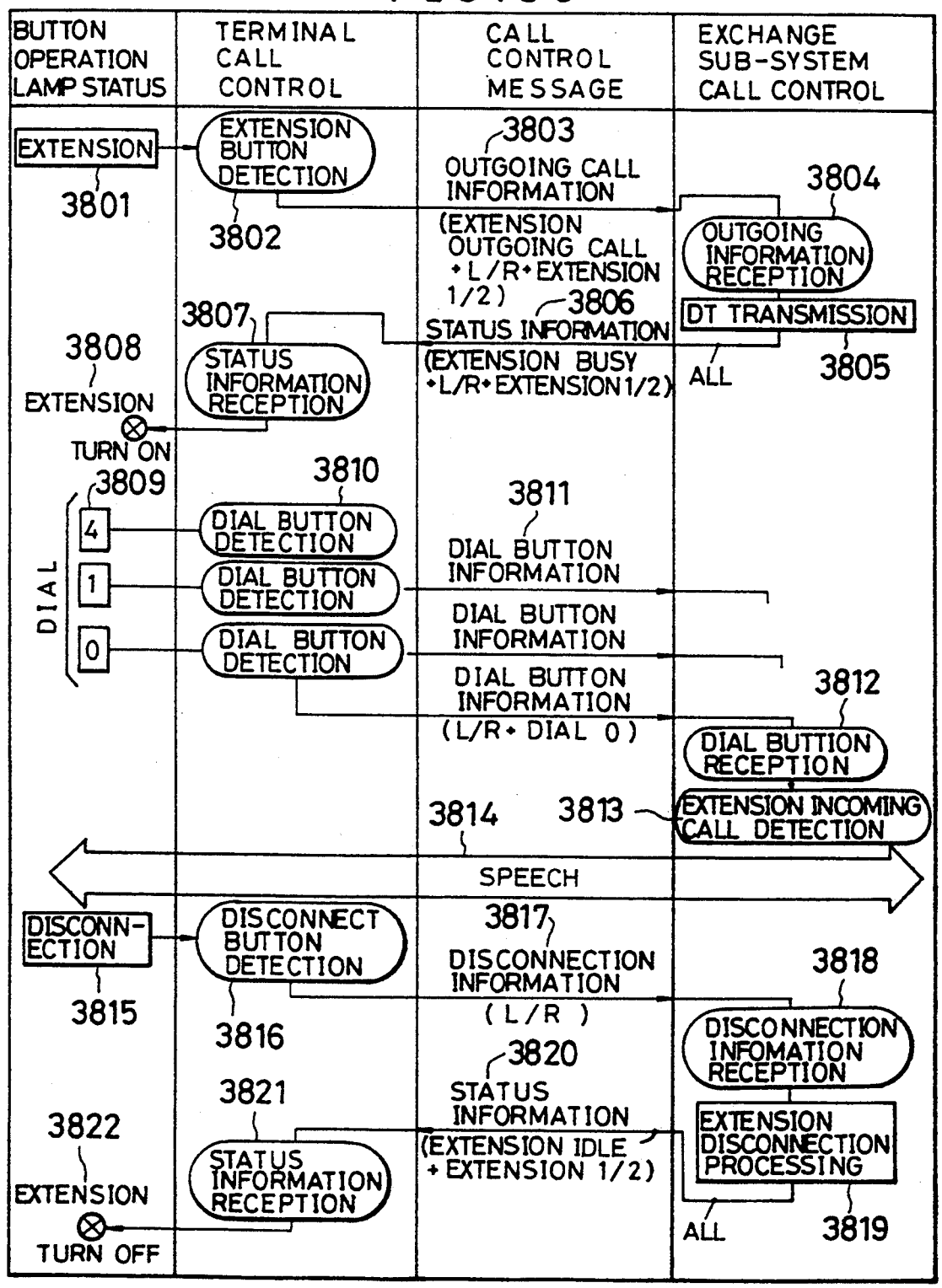
FIG. 38 is a view showing a call control sequence when an outgoing call is placed on an extension line.
Figure 44:
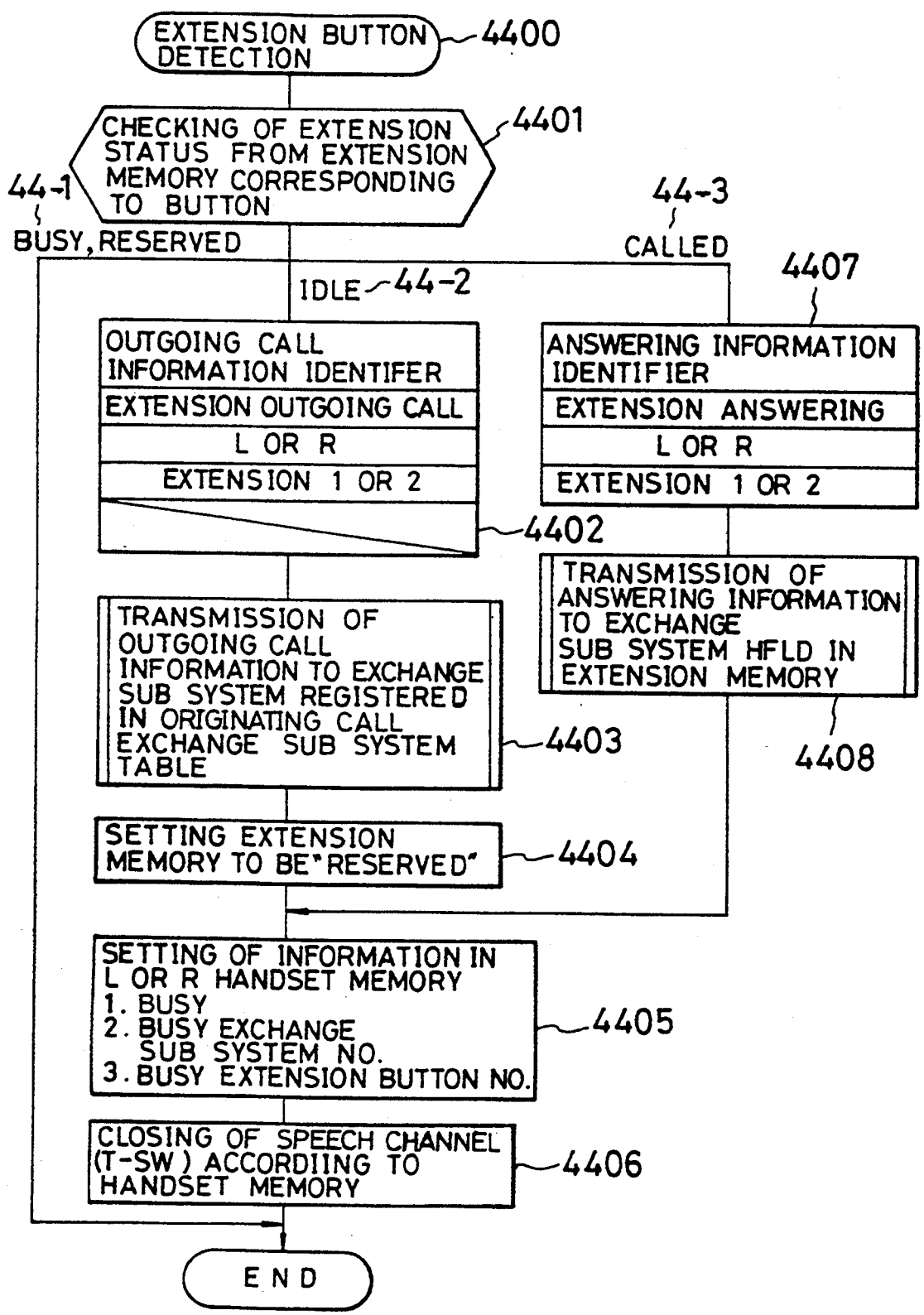

Referring to FIG. 38, when the operator of the terminal depresses the button "Extension 1" 8-2-1 or button "Extension 2" 8-2-2 (3801, FIG. 38), the call control processor of the terminal detects this according to FIG. 42 (3802, FIG. 38) and executes an extension button detection processing shown in FIG. 44.

First, the processor checks the status of the extension from the extension memory (i.e., either extension memory 1 shown in FIG. 16 or extension memory 2 shown in FIG. corresponding to the depressed button (i.e., either button "Extension 1" 8-2-1 or "Extension 2" 8-2-2)(step 4401). If the status is idle", the processor selects an idle route (44-2) and executes an extension outgoing call processing.

In this extension outgoing call processing, the processor edits outgoing call information (3803, FIG. 38) containing the selected handset information and extension memory No. and indicating that the outgoing call is an extension outgoing call (step 4402) and sends out the outgoing information (3803, FIG. 38) to the exchange sub-system registered in the originating call exchange subsystem No. table shown in FIG. 11 with reference to this originating call exchange sub-system No. table. Then it sets the extension memory corresponding to the depressed button i.e., button "Extension 1" 8-2-1 or "Extension 2" 8-2-2) shown in FIG. 16 or 17 to "reserved" (step 4404) and sets the busy status as well as the busy exchange subsystem No. and busy extension button No. in the handset memory shown in FIG. 14 or 15 (step 4405). Then, it closes the speech channel according to the handset memory shown in FIG. 14 or 15 through control of the speech channel switch 8-30 (step 4406).

When the exchange detects the reception of the outgoing call information (3803. FIG. 38) from the terminal according to FIG. 51 (3804, FIG. 38), it executes an outgoing call information reception processing shown in FIGS. 54 and 55.

First, it checks the outgoing call kind contained in the received outgoing call information (step 5401). Since the outgoing call is an extension outgoing call, the exchange selects an extension outgoing call route (54-2) and executes an extension outgoing call processing.

In this extension outgoing call processing, the exchange edits status information (3806, FIG. 38) containing the handset kind and extension memory No. (step 5410) and sends out the status information (3806, FIG. 38) to the terminal having executed the extension outgoing call (step 5411). Then it sets the busy status and handset kind in the pertinent region of the extension memory shown in FIG. 22 or 23 (step 5412) and sets that the connection is an extension connection together with the extension memory No. in the pertinent region of the terminal memory shown in FIG. 24 (step 5413). Then it sends out a dial tone (or DT tone) to the terminal accommodation position corresponding to the outgoing call handset (step 5414) and ends the processing.

When the terminal detects the reception of the status information (3806, FIG. 38) from the exchange according to FIG. 42 (3807, FIG. 38), it executes a status information reception processing shown in FIGS. 49 and 50.

First, it checks the status kind contained in the received status information (step 4901). Since in the instant case the extension is busy, it selects an extension busy route (49-4) and executes an extension busy processing.

In this extension busy processing, the terminal first checks the handset kind contained in the received status information (step 4917). If the handset is the left handset, it turns on green the pertinent one of the lamps "Extension 1" 8-3-1 and "Extension 2" 8-3-2 corresponding to the buttons "Extension 1" 8-2-1 and "Extension 2" 8-2-2 shown in FIG. 4 (step 4918). If the handset is the right handset, it turns on orange the lamp (step 4919). Thus, the operator can confirm at a glance the busy handset, which is either left or right handset, and busy extension button. Since this route is executed when answering an extension incoming call as will be described later, it executes a processing of stopping the incoming call ringer (step 4920). This processing, however, is meaningless in this instance. If there is a different incoming call button and the incoming call ringer is being driven, the terminal continues the driving of the ringer. Finally, it sets the pertinent region of the extension memory shown in FIG. 16 or 17 to busy" (step 4921).

Then, the operator dials necessary digits with the dial key set 8-10 shown in FIG. 4 while hearing the DT tone from the exchange (3809, FIG. 38). As a result, the call control processor 8-14 of the terminal recognizes this through a processing shown in FIG. 42 (3810, FIG. 38) and executes a dial key detection processing shown in FIG. 46. In this dial key detection processing, the processor edits dial key information (3811, FIG. 38) containing the handset kind and dial code (step 4601) and sends out this dial key information (3811, FIG. 38) to the exchange sub-system held in the handset memory (FIG. 14 or 15) which is determined after the handset selection procedure shown in FIGS. 34 and 35 (step 4602).

Further, the call control processor 8-14 transmits the dialed numeral to the numeral display controller 8-25 for progressive display on the numeral display 8-9 (step 4603).

When the exchange recognizes the reception of the dial key information (3811, FIG. 38) according to FIG. 51 (3812, FIG. 38), it executes a dial key information reception processing shown in FIG. 59.

First, the exchange checks the connection kind with reference to the terminal memory corresponding to the handset shown in FIG. 24 (step 5901). Since in this instance the connection is an extension connection, it executes an extension busy processing in an extension busy route (59-2) and stores dial in the terminal memory shown in FIG. 24 (step 5903). Subsequently, it checks whether the reception of dial key information has been completed (step 5904). If the reception has not yet been completed, the exchange receives again the dial key information. If the reception has been completed, it sets the outgoing call terminal memory shown in FIG. 24 to an waiting status (step 5905). Then it executes an extension incoming call detection processing (3813, FIG. 38) shown in FIG. 53. This extension incoming call detection processing will be described in greater detail in the next section.

When the pertinent terminal answers the incoming call, the busy status is set up (3814, FIG. 38).

When the operator desires to disconnect the busy line, like the case of the trunk outgoing call, the operator depresses the disconnect button corresponding to the busy handset to be disconnected, i.e., one of the buttons "Left Disconnect" 8-8-1 and "Right Disconnect" 8-8-2 shown in FIG. 4 (3815, FIG. 38). As a result, the call control processor 8-14 detects this according to FIG. 42 (3816, FIG. 38) and executes a disconnect button detection processing shown in FIG. 47.

First, the processor edits disconnect information (3817, FIG. 38) containing the handset kind (step 4701 and sends out the information to the exchange sub-system held in the handset memory shown in FIG. 14 or 15 (step 4702). Then it opens the speech channel with respect to the exchange having transmitted the disconnect information through control of the speech channel switch 8-30 (step 4704), then sets the pertinent region of the handset memory to "idle" and ends the processing.

When the exchange recognizes the reception of the disconnect information (3817, FIG. 38) according to FIG. 51 (3818, FIG. 38), it executes a disconnect information reception processing shown in FIG. 60.

First, it checks the corresponding handset connection kind with reference to the terminal memory shown in FIG. 24 (step 6001). Since in this instance the connection is an extension connection, it selects an extension busy route (60-2) and executes an extension busy processing. First, it extracts the extension memory No. held in the terminal memory shown in FIG. 24 (step 6009), then edits status information indicating that the extension has become idle (step 6010) and sends out the edited status information (3820, FIG. 38) to the disconnection terminal (step 6011). Then, it opens the speech channel between the terminal accommodation position corresponding to the handset and opposite party accommodation position held in the extension memory shown in FIG. 22 or 23 through control of the speech channel switch 1A or 1B (step 6012) and sends out the BT tone to the opposite party accommodation position (step 6013). Then it sets the pertinent region of the extension memory shown in FIG. 22 or 23 to "idle" (step 6014) and sets the pertinent region of the terminal memory shown in FIG. 24 to "idle" (step 6015) and ends the processing.

When the terminal detects the reception of the status information (3820, FIG. 38) from the exchange according to FIG. 42 (3821, FIG. 38), it executes a status information reception processing shown in FIGS. 49 and 50.

First, it checks the status kind contained in the received status information (step 4901). In this instance, it selects the extension idle route (49-5) and executes an extension idle processing.

In this extension idle processing, it first causes turning off the pertinent one of the lamps 8-3-1 and 8-3-2 corresponding to the buttons "Extension 1" 8-2-1 and "Extension 2" 8-2-2 shown in FIG. 4 (step 4922) on the basis of the received status information and stopping the incoming call ringer (step 4923), then sets the pertinent region of the extension memory shown in FIG. 16 or 17 to "idle" and ends the processing (step 4924).

As shown above, a sequence of control is executed for an extension ouitgoing call.

Figure 39:
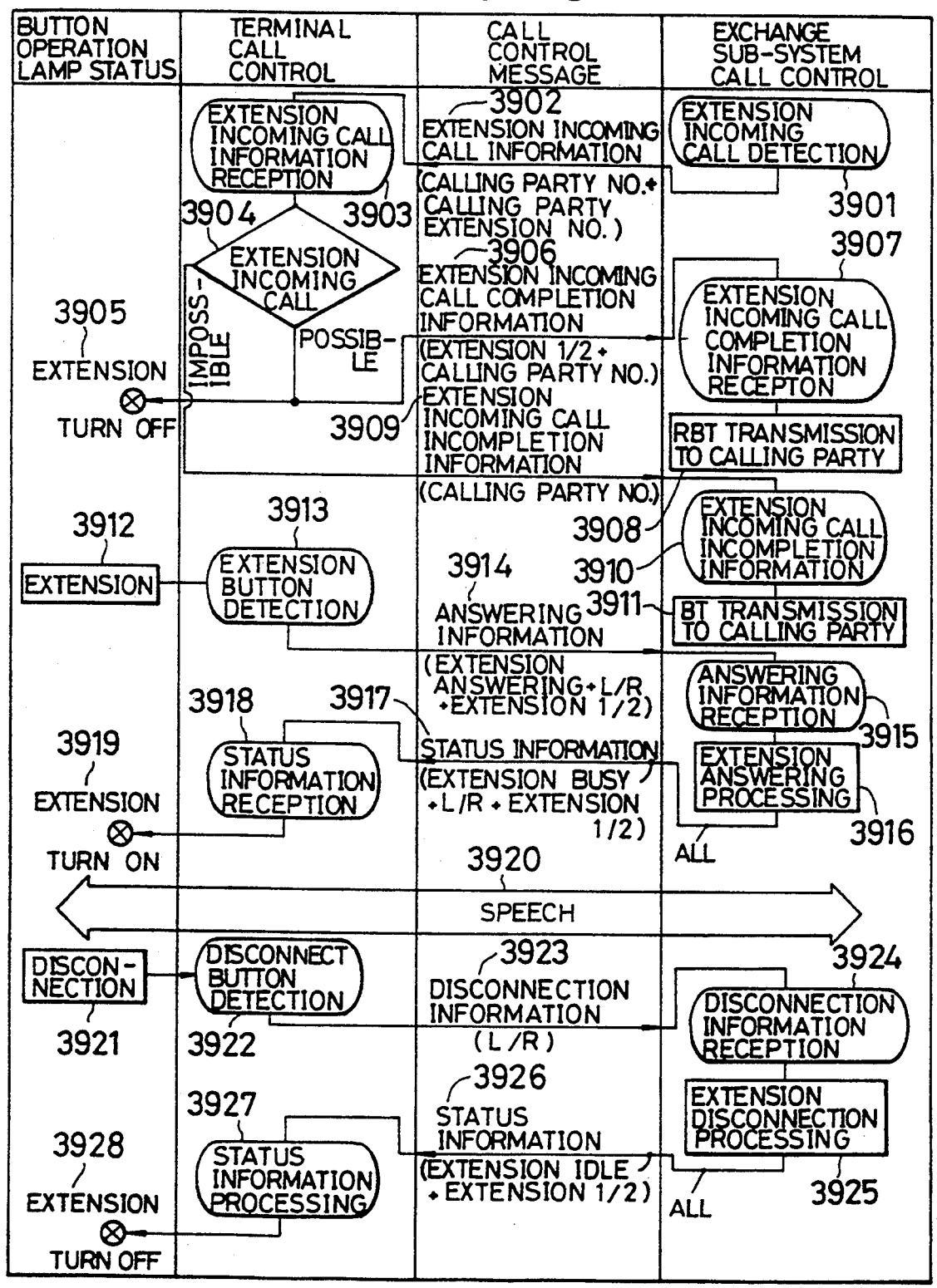
FIG. 39 is a view showing a call control sequence when an incoming call is placed on an extension line.
Figure 53:
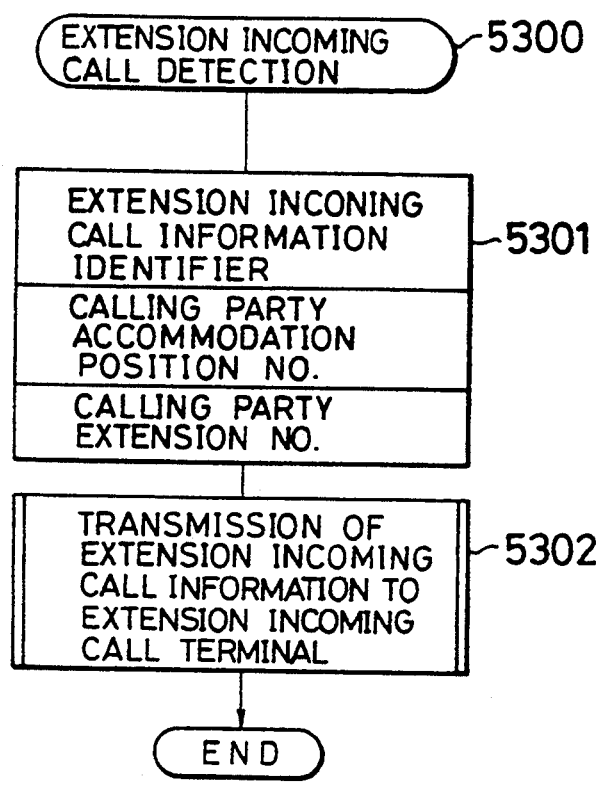

Referring to FIG. 39, when the exchange detects an extension incoming call according to FIG. 51 (3901, FIG. 39), it executes an extension incoming call detection processing shown in FIG. 53.

In this extension incoming call detection processing, it first edits extension incoming call information (3902, FIG. 39) containing the calling party accommodation position No. and calling party extension No. and indicating that the incoming call is an extension incoming call (step 5301) and sends out the extension incoming call information (3902, FIG. 39) to the terminal, to which the incoming call is terminated.

Figure 48:
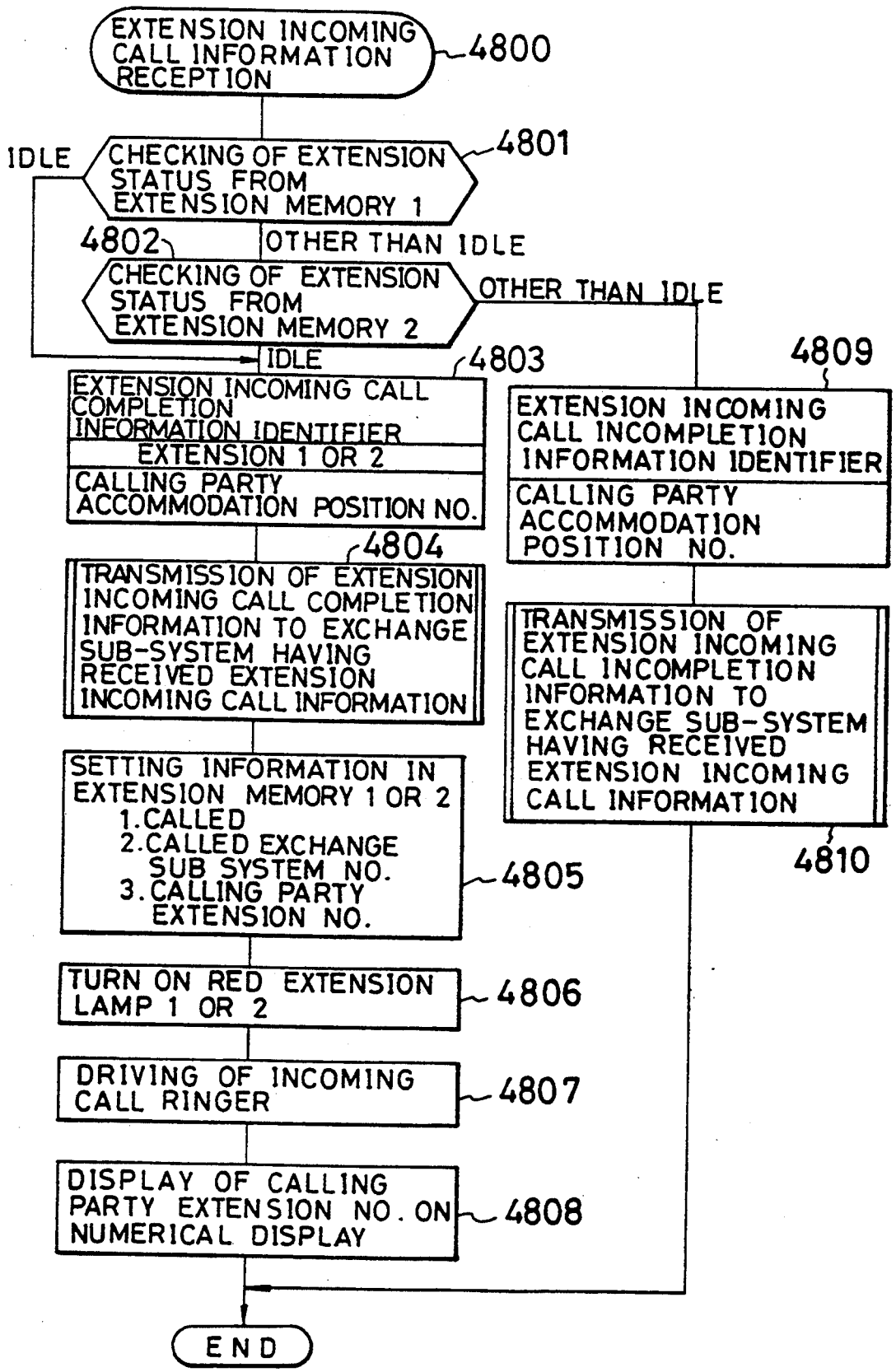

When the terminal detects the reception of the extension incoming call information from the exchange according to FIG. 42 (step 3903, FIG. 39), it executes an extension incoming call information reception processing shown in FIG. 48.

In this extension incoming call information reception processing, the terminal first checks whether the extension corresponding to the button "Extension 1" 8-2-1 is idle with reference to the extension memory 1 shown in FIG. 16 (step 4801). If the extension is idle, it executes a processing in the step 4803 and following steps. If the extension is not idle, checks whether the extension corresponding to the button "Extension 2" 8-2-2 is idle with reference to the extension memory 2 shown in FIG. 17 (step 4802). The steps 4801 and 4802 are executed for checking whether there is any idle extension and seizing an idle extension memory. If it is found as a result of the check that there is no idle extension memory, the terminal edits extension incoming call incompletion information (3909, FIG. 39) containing the calling party accommodation position No. and indicating that no extension incoming call can be placed (step 4809) and sends out the extension incoming call incompletion information (3909, FIG. 39) to the exchange having sent out the extension incoming call information (step 4810). If an extension memory can be seized, the terminal edits extension incoming call completion information (3906, FIG. 39) containing the seized extension memory No. and calling party accommodation position No. (step 4803) and sends out the extension incoming call completion information (3906, FIG. 39) to the exchange having sent out the extension incoming call information (step 4804). Then, it holds the status of being called, No. of the exchange sub-system having detected the incoming call and calling party extension No. in the seized one of the extension memories shown in FIG. 16 or 17 (step 4805). Then it causes red flickering of the corresponding lamp, i.e., either one of the lamps 8-3-1 and 8-3-2 corresponding to the buttons "Extension 1" 8-2-1 and "Extension 2" 8-2-2 (step 4806) for displaying the incoming call while driving the incoming call ringer 8-13 shown in FIG. 4 (step 4807) for audibly indicating the incoming call. Further, it displays the calling party extension No. on the numeral display 8-9 shown in FIG. 4 (step 4808) and ends the processing.

When the exchange detects the reception of the extension incoming call incompletion information from the exterminal according to FIG. 51 (3910, FIG. 39), it executes an extension incoming call incompletion information reception processing and sends out the busy tone (or BT tone) to the calling party accommodation position (step 5701).

Figure 56:
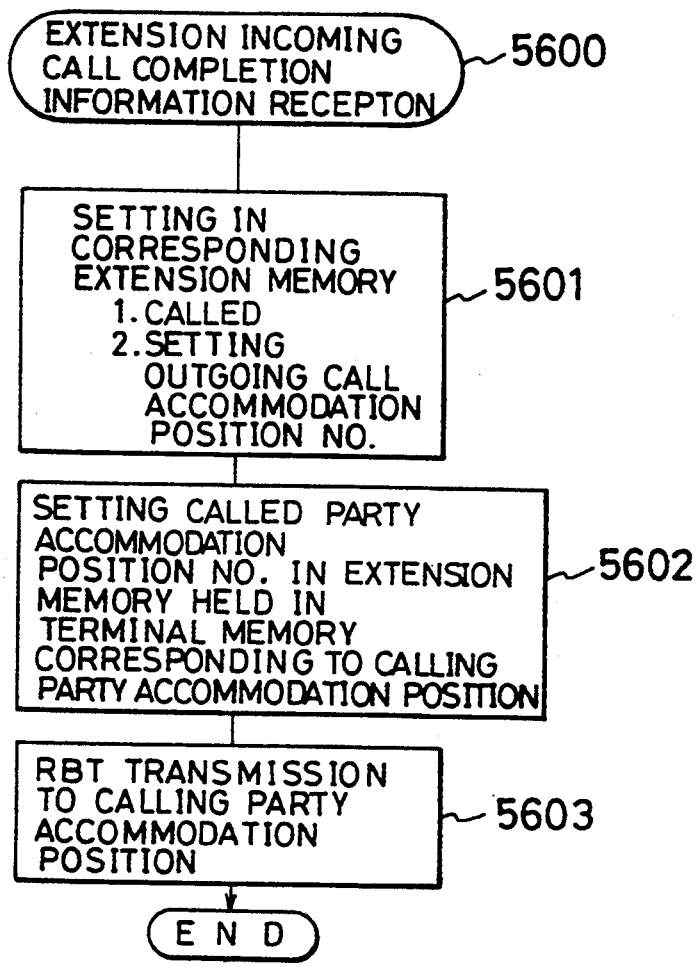
Figure 57:
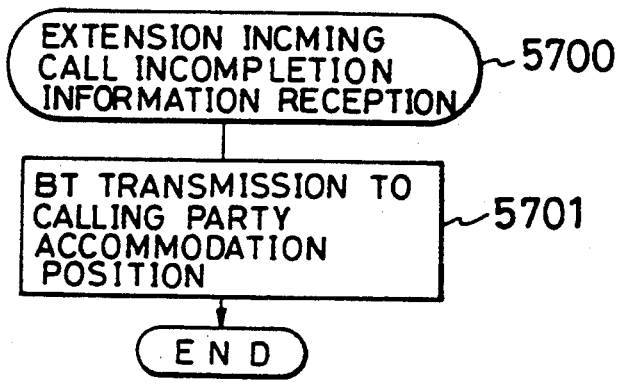

When the exchange detects the reception of the extension incoming call completion information from the terminal (3907, FIG. 39), it executes an extension incoming call completion information reception processing shown in FIG. 56.

In this extension incoming call completion information reception processing, the exchange first sets that the called status is brought about together with the calling party accommodation position No. in the pertinent regions of the extension memory shown in FIG. 22 or 23 (step 5601), then extracts the calling party side extension memory No. held in the region of the terminal memory shown in FIG. 24 corresponding to the calling party side accommodation position and sets the incoming call side accommodation position No. in the corresponding region of the calling party extension memory shown in FIG. 22 or 23 (step 5602). At the same time, it sends out the ring back tone (or RBT tone) to the calling party accommodation position (step 5603). In consequence, the accommodation positions of the calling and called parties are set in the extension memories used by the opposite sides, that is, information necessary for the execution of the subsequent call control is set.

When the operator of the terminal having the extension incoming call subsequently depresses the button "Extension 1" 8-2-1 or "Extension 2" 8-2-2 corresponding to the lamp 8-3-1 or 8-3-2 being red flickered (3912, FIG. 39), the call control processor 8-14 of the terminal detects this according to FIG. 42 (3913, FIG. 39) and executes an extension button detection processing shown in FIG. 44.

In this extension button detection processing, the processor checks the status of the extension with reference to the extension memory shown in FIG. 16 or 17 corresponding to the depressed button (step 4401). Since in this instance the called status is held, it selects an incoming call route (44-3) and executes a processing for answering the extension incoming call. First, it edits answering information (3914, FIG. 39) containing the handset kind selected in the procedure shown in FIGS. 34 and 35 and indicating answering the extension incoming call (step 4407) and sends out the answering information (3914, FIG. 39) to the exchange held in the extension memory shown in FIG. 16 or 17 (step 4408). Subsequently, it sets that the busy status is brought about together with the busy exchange sub-station No. and busy extension button No. in the handset memory shown in FIG. 14 and 18 (step 4405), and then closes the speech channel on the basis of the handset memory shown in FIG. 14 or 18 through control of the speech channel switch 8-30 (step 4406).

Figure 58:
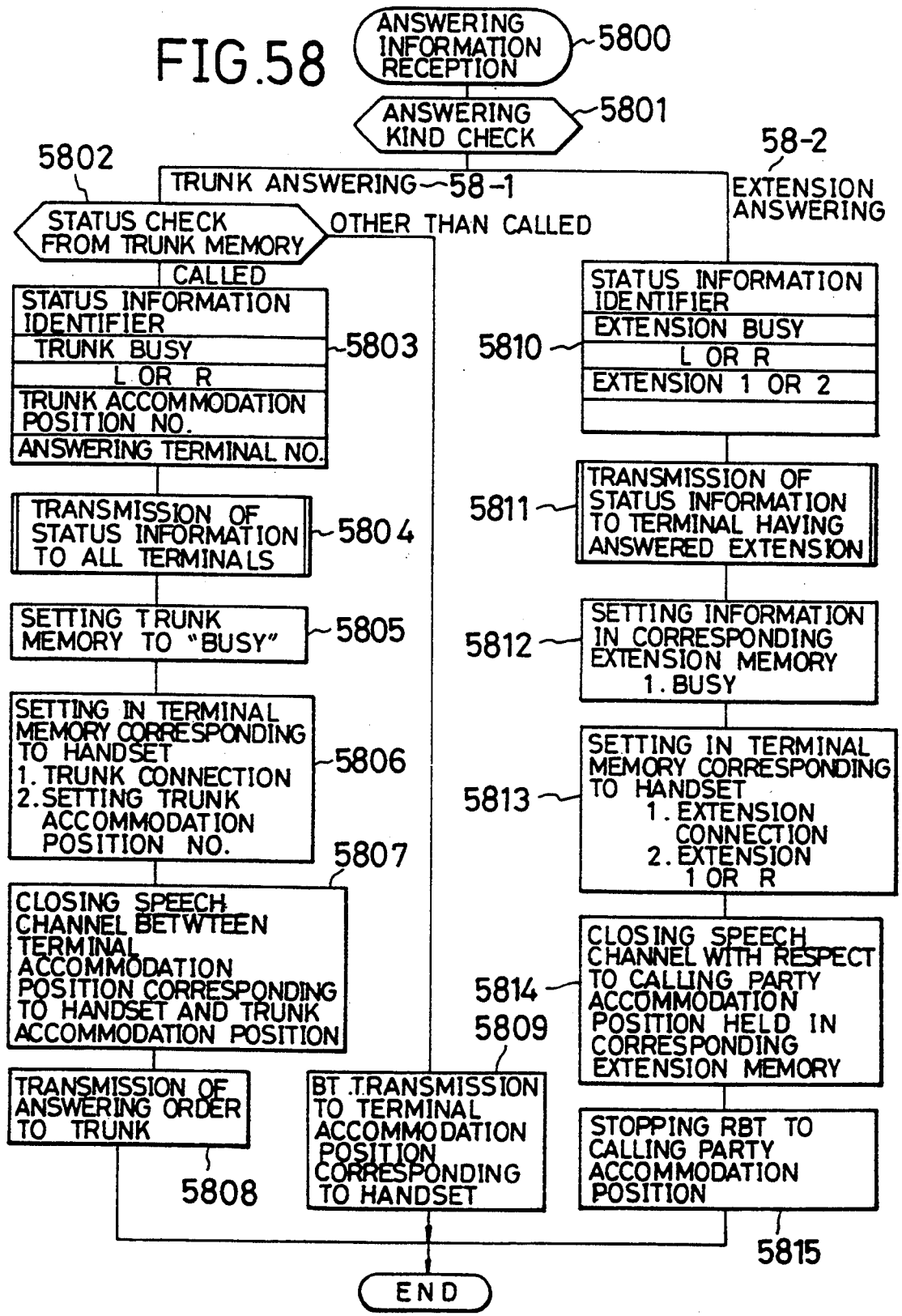

Subsequently, the exchange, detecting the reception of the answering information from the terminal according to FIG. 51 (3915, FIG. 39), it executes an answering information reception processing shown in FIG. 58.

In this answering information reception processing, it checks the answering kind contained in the received answering information (step 5801). Since in this instance the answering is an extension answering, it selects an extension answering route (58-2) and executes an extension answering processing.

First, the exchange edits status information (3817, FIG. 39) containing information that an extension is busy together with the extension memory No. (step 5810) and sends out the status information (3917, FIG. 39) to the terminal of the extension answering (step 5811). Then it sets the pertinent region of the extension memory shown in FIG. 22 or 23 to be "busy" (step 5812) and sets information that the extension is connected together with the extension memory No. in the pertinent handset region of the terminal memory shown in FIG. 24 (step 5813). Then, it closes the speech channel between the position of accommodation of the terminal having send out the answering information and the calling party accommodation position held in the corresponding extension memory through control of the speech channel switch 1A and 1B (step 5814). Then, it stops the RBT tone transmitted to the calling party accommodation position (step 5815) and ends the processing.

When the terminal detects the reception of the status information (3917, Figure) (3918, FIG. 39), it executes a status information reception processing shown in FIGS. 49 and 50.

In this status information reception processing, it checks the status kind contained in the status information (step 4901). Since in this instance an extension is busy, it selects an extension busy route (49-4) and executes an extension busy processing.

In this extension busy processing, it checks the handset kind contained in the received status information (step 4917). If the handset is the left one, it turns on green the corresponding lamp, i.e., either one of the lamps 8-3-1 and 8-3-2 corresponding to the buttons "Extension 1" 8-2-1 and "Extension 2" 8-3-2 shown in FIG. 4 (step 4918). If the handset is the right one, it turns on orange the lamp (step 4919). Thus, the operator can conform at a glance the busy handset, i.e., either left or right one, and busy extension button. The terminal then stops the incoming call ringer (step 4920). If there is a different incoming call button and the incoming call ringer is being driven, it continues the driving. Thereafter, it sets the pertinent region of the extension memory shown in FIG. 16 or 17 to "busy" (step 4921) and ends the processing. With the above call control, the handset of the terminal, for which the answering operation has been executed, becomes busy with the outgoing call side terminal (3920, FIG. 39).

When the operator desires to disconnect the busy line, the operator executes the disconnection operation by depressing the disconnect button corresponding to the handset to be disconnected, i.e., either one of the buttons "Left Disconnect" 8-8-1 or "Right Disconnect" 8-8-2 shown in FIG. 4. The following processing is call control as in the case of the disconnection processing with the extension outgoing call shown in FIG. 38 and is not described.

Figure 40:
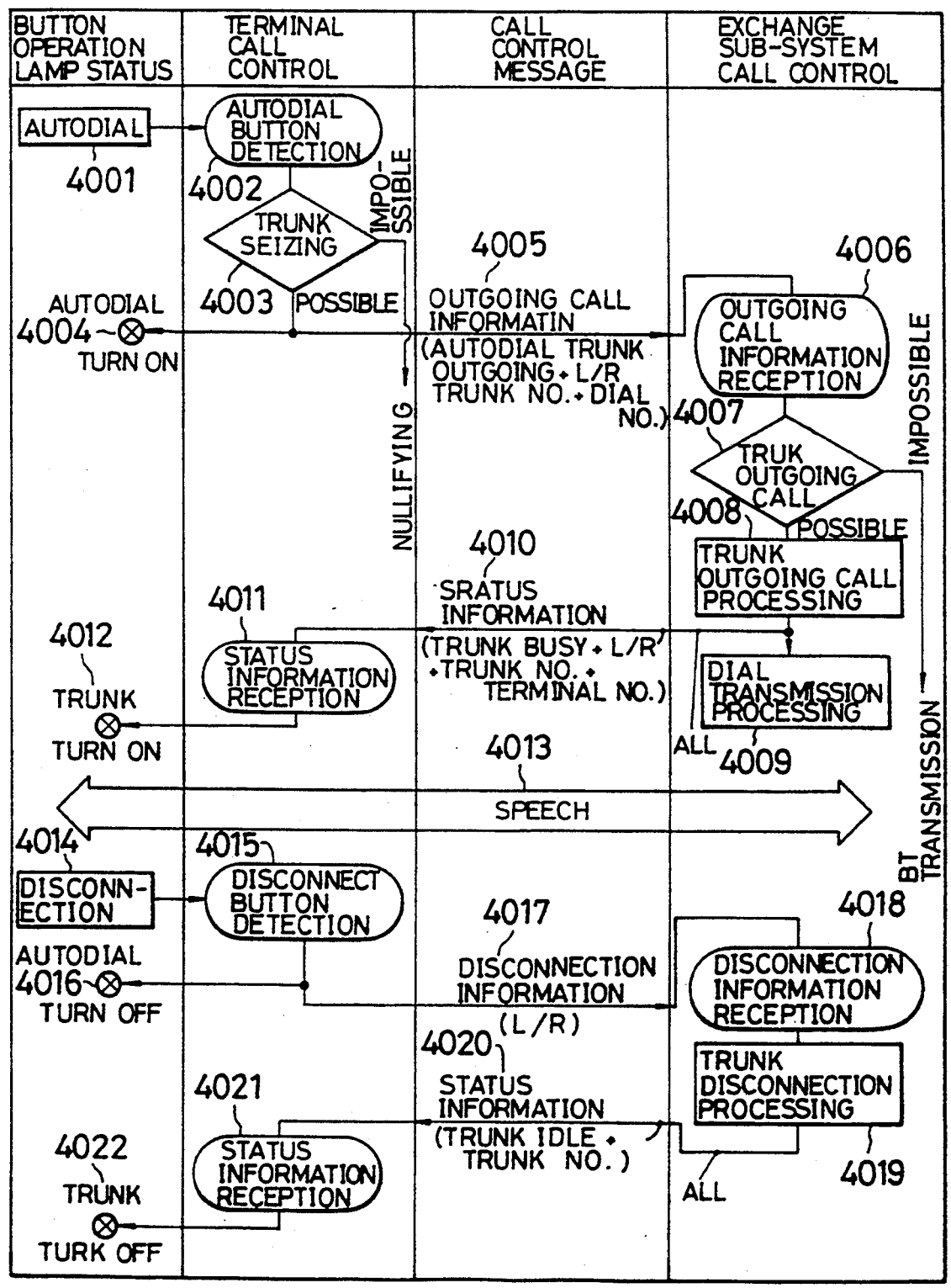
FIG. 40 is a view showing an autodial call control sequence when an outgoing call is placed on a trunk.
Figure 45:
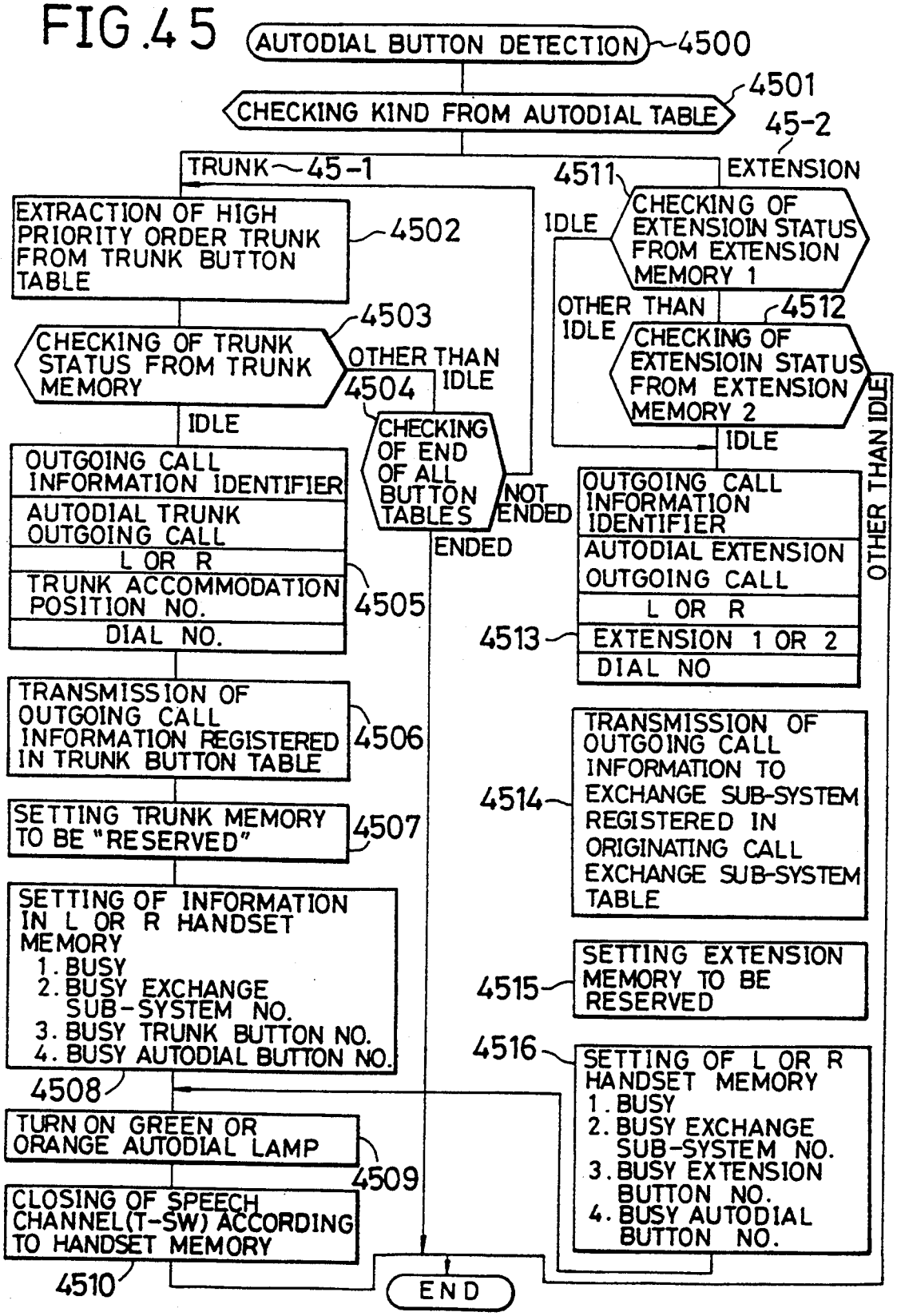

Referring to FIG. 40, when the operator of the terminal depresses either one of the buttons "Autodial 1" 8-6-1 to "Autodial q" 8-6-$q$ (4001, FIG. 40), the call control processor 8-14 of the terminal detects this according to FIG. 42 (4002, FIG. 40) and executes an autodial button detection processing shown in FIG. 45.

In this autodial button detection processing, the processor checks the autodial kind with reference to the region of the autodial table shown in FIG. 8 corresponding to the depressed one of the buttons "Autodial 1" 8-6-1 to "Autodial q" 8-6-$q$ (step 4501). Assuming here that trunk autodial is set, the processor executes an autodial trunk outgoing call processing in a trunk route (45-1).

In this autodial trunk outgoing call processing, it seizes the highest priority order trunk through retrieval of the seizing priority orders registered in the trunk button table shown in FIG. 7 (step 4502). Then it checks the trunk status with reference to the region of the trunk memory shown in FIG. 18 or 19 corresponding to the seized trunk (step 4503). If the status is other than "idle", the processor selects the next highest priority order trunk and executes similar trunk status check (steps 4504, 4502 and 4503). If there is no idle trunk, it nullifies the depressed button (i.e., either one of the buttons "Autodial 1" 8-6-1 to "Autodial q" 8-6-$q$). If it is decided to seize the highest priority order idle trunk, it edits outgoing call information (4005, FIG. 40) containing the dial No. extracted from information held in the region of the autodial table shown in FIG. 8 corresponding to the depressed button, handset kind and trunk accommodation position No. and indicating an autodial trunk outgoing call (step 4505) and sends out the outgoing call information (4005 FIG. 40) to the exchange sub-system registered in the trunk button table shown in FIG. 4 (step 4506). Then, it sets the pertinent region of the trunk memory shown in FIG. 18 or 19 to be "reserved" (step 4507) and sets that the status is "busy" together with the busy exchange sub-system No. busy trunk button No. and busy (i.e., depressed) autodial button No. in the pertinent region of the handset memory shown in FIG. 14 or 15 (step 4508). Then it turns on the corresponding one of the lamps 8-7-1 to 8-7-$q$ corresponding to the buttons "Autodial 1" 8-6-1 and "Autodial q" 8-6-$q$ in a color (.e., either green or orange) corresponding to the kind of handset (step 4509). Then it closes the speech channel through control of the speech channel switch 8-30 on the basis of the handset memory shown in FIG. 14 or 15.

Figure 54:
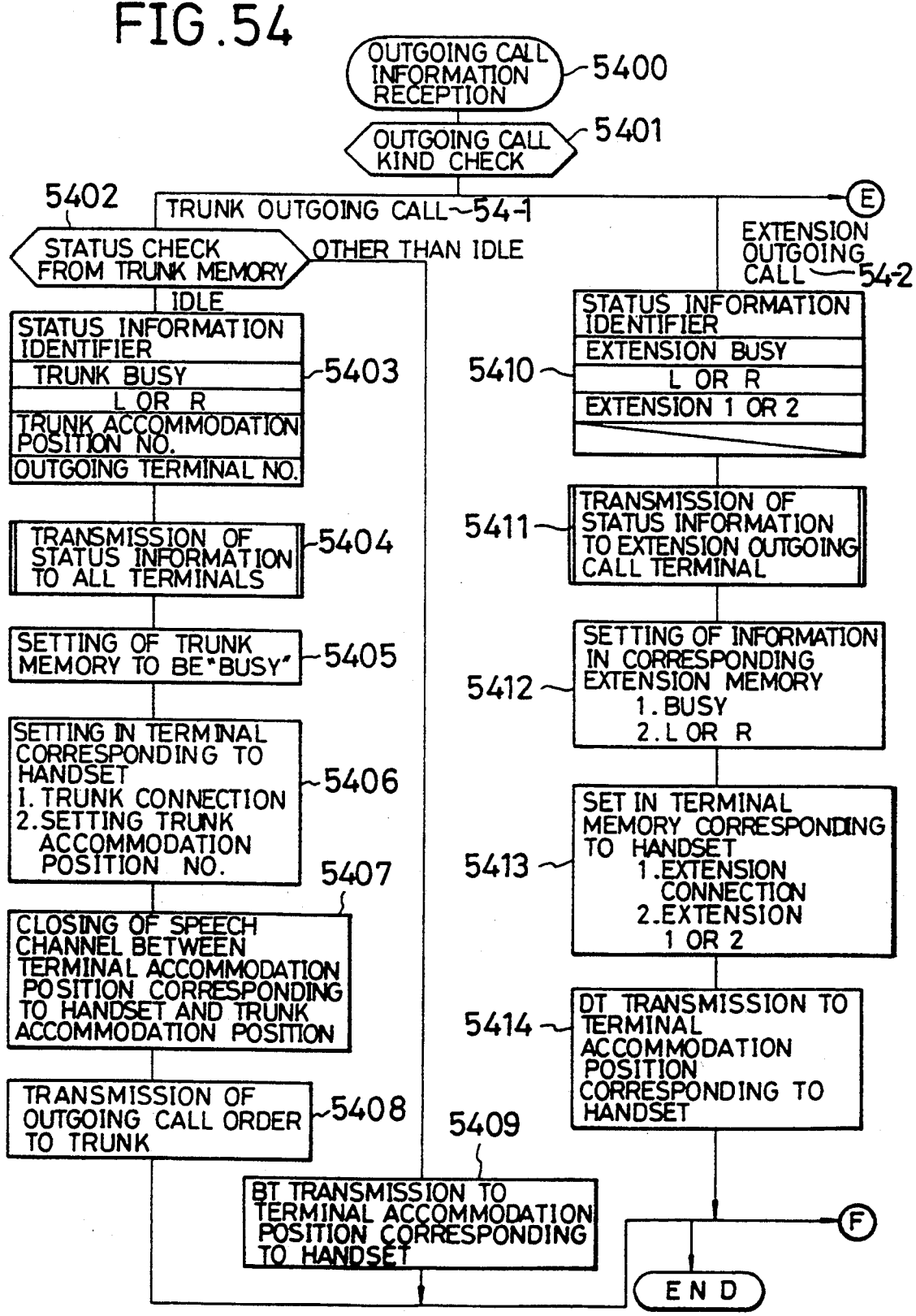
Figure 55:
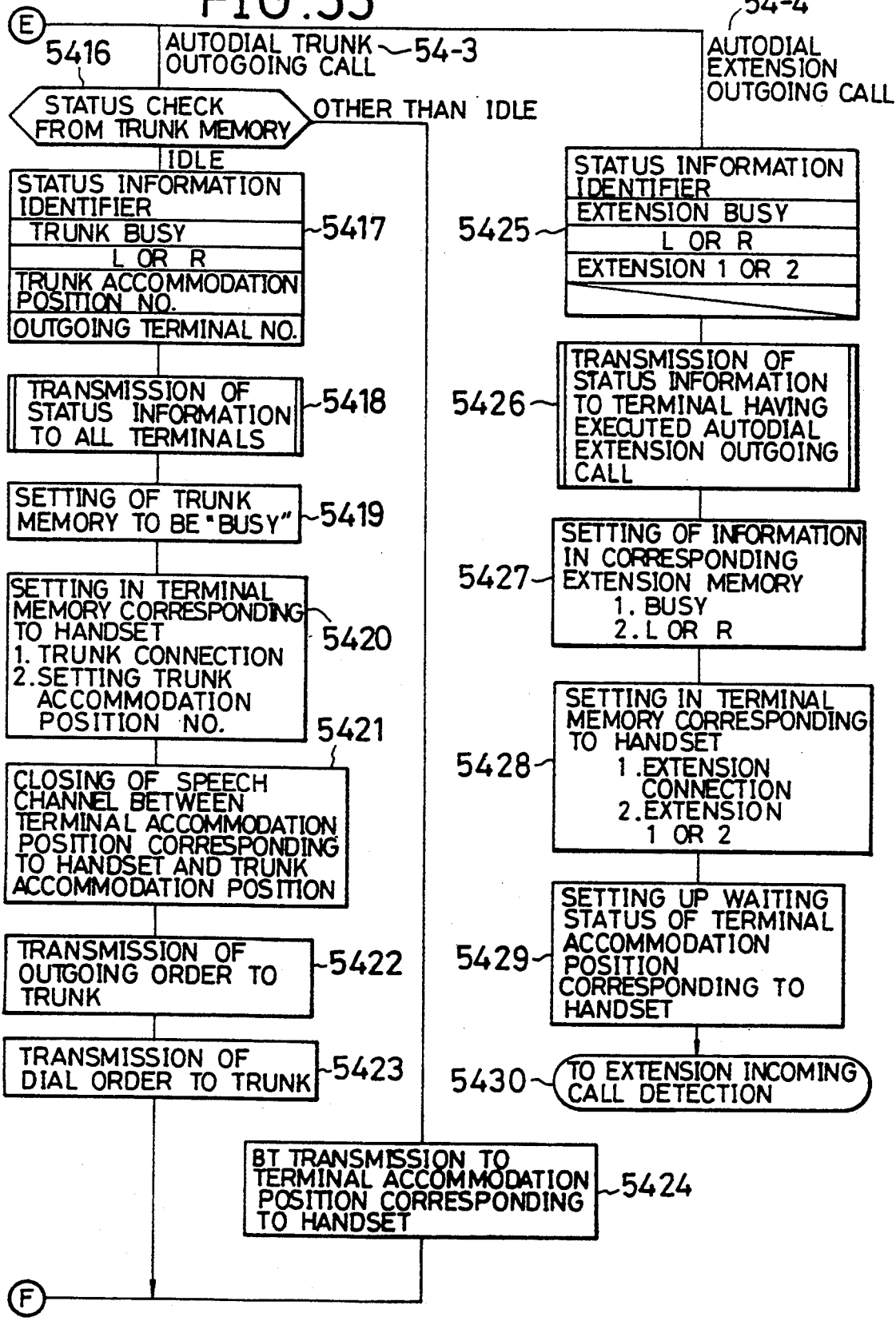

When the exchange detects the reception of the outgoing call information from the terminal according to FIG. 51 (4006, FIG. 40), it executes an outgoing call information reception processing shown in FIGS. 54 and 55.

In this outgoing call information reception processing, it checks the outgoing call kind contained in the received outgoing call information (step 5401). Since in this instance the outgoing call is an autodial outoing call, it selects an autodial outgoing call route (54-3) and executes an autodial outgoing call processing.

First, the exchange checks the status of the pertinent trunk from the trunk memory shown in FIG. 25 (step 5416). If the trunk is not idle, the outgoig call can not be effected. Therefore, it sends out the busy tone (or BT tone) to the terminal accommodation position corresponding to the handset of the terminal having sent out the outgoing call information (step 5424). If the trunk is idle, it edits status information containing the handset kind, trunk accommodation position No. and outgoing call terminal No. and indicating that the trunk is busy (step 5417) and sends out the status information to all the terminals (step 5418). Then it sets the pertinent region of the trunk memory shown in FIG. 25 to be "busy" (step 5409) and sets that the trunk is connected together with the trunk accommodation position No. in the pertinent handset region of the terminal memory shown in FIG. 24 (step 5420). Then, the exchange closes the speech channel between the terminal accommodation position corresponding to the handset and trunk accommodation position through control of the speech channel switch 1A or 1B (step 5421), then sends out an outgoing call order to the trunk to activate the line (step 5422) and sends out a dial order to the trunk (step 5423).

When the terminal recognizes the reception of the status information (4010, FIG. 40) through the processing shown in FIG. 42 (4011, FIG. 40), it executes a status information reception processing shown in FIGS. 49 and 50.

First, the terminal checks the status kind contained in the received status information (4010, FIG. 40) (step 4901) and executes a trunk busy processing in the trunk busy route (49-1). Then it checks whether the trunk is registerred in the trunk button table shown in FIG. 7 (step 4902). If the trunk is not registered, it ignores the status information. If the trunk is registered, it compares the terminal No. contained in the status information and own terminal No. shown in FIG. 9 (step 4903). If two data are identical, it determines that the status information is produced as a result of provision of its own outgoing call, and it checks the handset kind contained in the status information (step 4904). If the handset is the left one, it turns on green the pertinent lamp, i.e., either one of the lamps 8-5-1 to 8-5-*p* corresponding to the buttons "Trunk 1" 8-4-1 to "Trunk p" 8-5-*p* (step 4905). If the handset is the right one, it turns on orange the lamp (step 4906). Thus, the operator recognizes at a glance the busy handset, i.e. either left or right handset and busy button.

If the terminal No. contained in the status information is of a different terminal, the terminal turns on red the pertinent one of the lamps 8-5-1 to 8-5-*p* corresponding to the buttons "Trunk 1" 8-4-1 to "Trunk p" 8-4-*p* (step 4907) for indicating that the trunk is being used by a different terminal. Subsequently, it executes a processing of stopping the incoming call ringer (step 4908). (This has no meaning in this instance.) Finally, it sets the pertinent region of the trunk memory shown in FIG. 18 or 19 to be "busy" (step 4909) and ends the processing.

When the called party subsequently answers the call, the busy status (4013, FIG. 40) is set up.

The disconnection processing shown in FIG. 40 is different from the trunk outgoing call disconnection processing shown in FIG. 36 is in a processing (4016, FIG. 40) executed when the termial detects disconnection to turn off the pertinent one of the lamps 8-7-1 to 8-7-*q* corresponding to the buttons "Autodial 1" 8-6-1 to "Autodial q" 8-6-*q*, and therefore it is not described.

As shown above, a sequence of call control is executed for an autodial trunk outgoing call.

Figure 41:
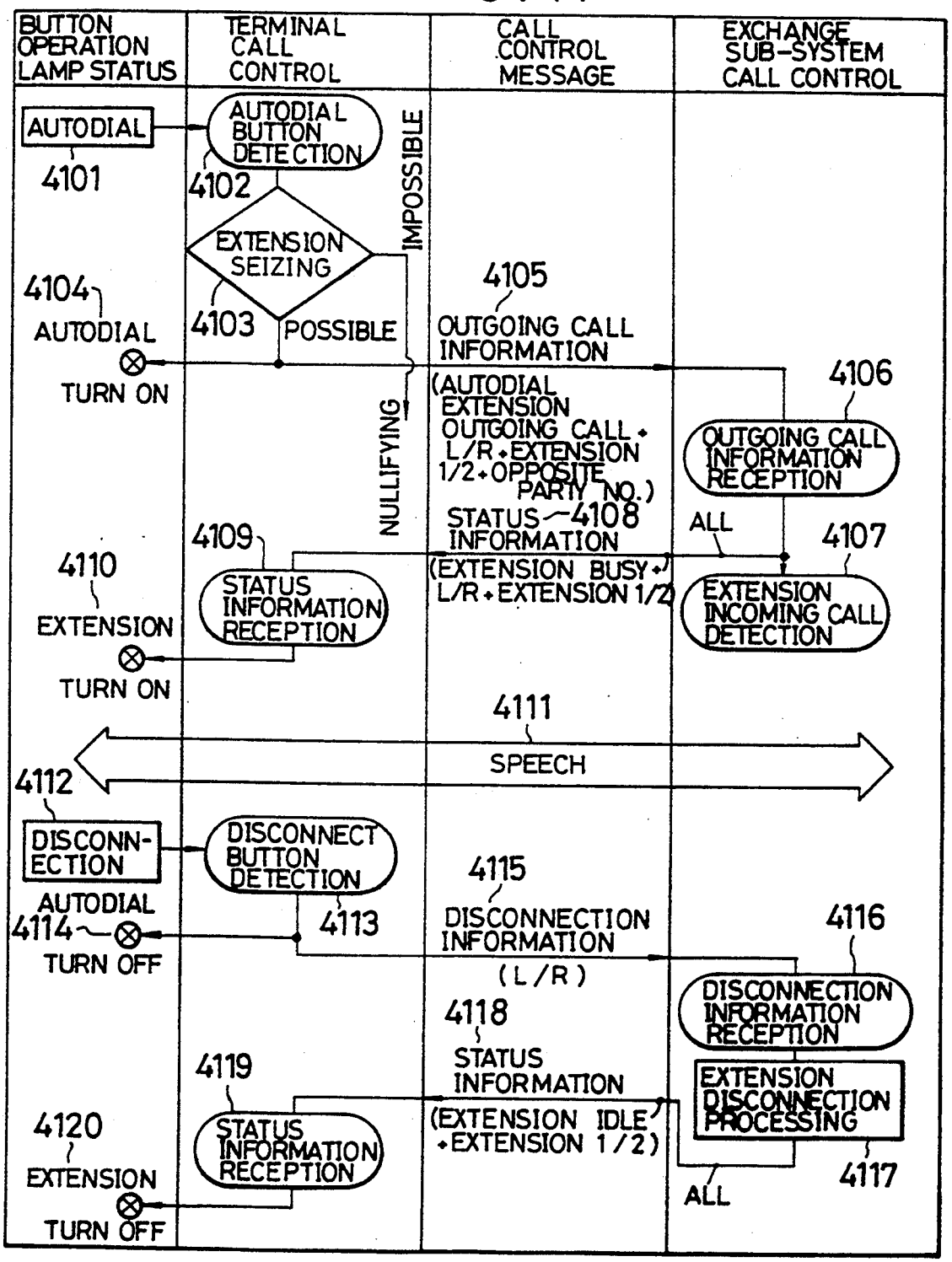
FIG. 41 is a view showing an autodial call control sequence when an outgoing call is placed on an extension line.

Referring to FIG. 41, when the operator of the terminal depresses either one of the buttons "Autodial 1" 8-6-1 to "Autodial q" 8-6-*q* (4101, FIG. 41), the call control processor 8-14 of the terminal detects this according to FIG. 42 (4102, FIG. 40) and executes an autodial button detection processing shown in FIG. 45.

In this autodial button detection processing, it checks the autodial kind with reference to the region of the autodial button table shown in FIG. 8 corresponding to the depressed one of the buttons "Autodial 1" 8-6-1 to "Autodial q" 8-6-*q* (step 4501). Assuming in this instance that an extention autodial is set, the processor executes an autodial extension outgoing call processing of an extension route (45-2).

In this autodial extension outgoing processing, it checks whether the extension is idle with reference to the extension memory 1 shown in FIG. 16. If the extension is idle, it executes a processing in the step 4513 and following steps. If the extension is in other than the idle status, it checks whether the extension is idle with reference to the extension memory 2 shown in FIG. 17 (step 4512). If the extension is idle, it executes a processing in the step 4513 and following steps. More specifically, if the extension memory status check results obtained in the steps 4511 and 4512 are both other than the idle status, it nulliies the depressed one of the buttons "Autodial 1" 8-6-1 to "Autodial q" 8-6-*q*. If it is found that there is an idle extension memory, it seizes that extension memory, then edits outgoing call information (4105, FIG. 41) containing the dial No. extracted from information held in the region of the autodial button table shown in FIG. 8 corresponding to the depressed button handset kind extension memory kind and indicating that the outgoing call is an autodial extension outgoing call (step 4513) and sends out the outgoing call information (4105, FIG. 41) to the exchange sub-system registered in the originating call exchange sub-system No. table shown in FIG. 11 (step 4514). Then, it sets the pertinent region of the extension memory shown in FIG. 16 or 17 to be "reserved" (step 4515) and sets that the status is "busy" together with the busy exchange sub-system No., busy extension button No. and busy (i.e., depressed) autodial No. in the pertinent region of the handset memory shown in FIG. 14 or 15 (step 4516). Then, it turns on the pertinent one of the lamps 8-7-1 to 8-7-*q* corresponding to the buttons "Autodial 1" 8-6-1 "Autodial q" 8-6-*q* in a color (i.e., either green or orange) corresponding to the handset kind (step 4509). Then, it closes the speech channel through control of the speech channel switch 8-30 on the basis of the handset memory shown in FIG. 14 or 15 (step 4510).

When the exchange detects the reception of the outgoing call information (4105, FIG. 41) from the terminal (4106, FIG. 41), it executes an outgoing call information reception processing shown in FIGS. 54 and 55.

First, the exchange checks the outgoing call kind contained in the outgoing call information (step 5401). Since this instance concerns an autodial extension outgoing call, it selects an autodial extension outgoing call route (54-4) and executes an autodial extension outgoing call processing.

In this autodial extension incoming call processing, the exchange first edits status information (4108, FIG. 41) containing the handset kind and extension memory No. and indicating that an extension is busy (step 5425) and sends out the status information (4108, FIG. 41) to the terminal having effected an autodial extension outgoing call (step 5426). Then, it sets that the status has become "busy" together with the handset kind in the pertinent region of the extension memory shown in FIG. 22 or 23 (step 5427) and also sets that the connection is an extension connection together with the extension memory No. in the pertinent region of the terminal memory shown in FIG. 24 (step 5428). Then, it brings about a waiting status of the terminal accommodation position corresponding to the outgoing call handset (step 5429) and executes the extension incoming call detection processing described before and shown in FIG. 53 (step 5430).

When the terminal detects the reception of the status information (4108, FIG. 41) from the terminal according to FIG. 42, it executes a status information reception processing shown in FIGS. 49 and 50.

First, it checks the status kind contained in the received status information (step 4901). Since in this instance an extension is busy, it selects an extension busy route (49-4) and executes an extension busy processing.

In this extension busy processing, the terminal checks the handset kind contained in the received status information (step 4917). If the handset is the left one, it turns on green the pertinent one of the lamps 8-3-1 and 8-3-2 corresponding to the buttons "Extension 1" 8-2-1 and "Extension 1" 8-2-1 (step 4918). If the handset is the right one, it turns on orange the lamp (step 4919). Thus, the operator can confirm at a glance the busy handset, i.e., either left or right handset, and busy extension button. Then, it executes a processing of stopping the incoming call ringer (step 4920). (this is meaningless in this instance.) Finally, it sets the pertinent region of the extension memory shown in FIG. 16 or 17 to be "busy" (step 4921).

When the called party answers the incoming call in this status, a busy status is set up (4111, FIG. 41).

The disconnection processing shown in FIG. 41 is different from the extension outgoing call disconnection processing shown in FIG. 37 only in a processing (4114, FIG. 41) executed when the disconnection is detected by the terminal to turn off the pertinent one of the lamps 8-7-1 to 8-7-*q* corresponding to the buttons "Autodial 1" 8-6-1 to "Autodial q" 8-6-*q*, and it is not described.

As shown above, a sequence of call control is executed for an autodial extension outgoing call.

While the telephone exchange system according to the invention has been described in conjunction with an embodiment thereof, the construction according to the invention is not limited to this embodiment. For example, the terminal may have three or more handsets and also may have three or more extension call control memories. Further, three or more exchange sub-systems may be provided. With either system structure, it is obvious from the above description that according to the invention a plurality of exchange sub-systems function just like a single large-scale exchange system.

Moreover, while the above embodiment has been described in connection for call control in connection with the trunk outgoing call, trunk incoming call, extension outgoing call, extension incoming call, autodial trunk outgoing call and autodial extension outgoing call, it is obvious that other typical call controls such as holding, transfer, interruption and conference can be readily realized by developing the concept of the tables, temporary memory structures, call control message configurations, call control sequences and individual call controls shown in connection with the above embodiment.

Thus, the invention can be utilized for a telephone exchange system, particularly a dealing speech system, which can accommodate a large number of trunks, and of which the improvement of the reliability and and call connection processing are desired.

We claim:

1. A telephone exchange system comprising:
   a plurality of exchange sub-systems;
   a plurality of terminals directly connected to at least two of said exchange sub-systems by two lines so as to execute communication operation in cooperation with call connection control of said exchange sub-systems connected thereto; and
   means for selecting one of said exchange sub-systems for one of said terminals connected thereto when a call is connected to said one of said terminals according to one of (1) information determined prior to said call and (2) a current condition of said telephone exchange system.

2. The telephone exchange system according to claim 1, wherein said exchange sub-systems each contain a plurality of trunks and inform said terminals of a use condition of said trunks.

3. The telephone exchange system according to claim 2, wherein each of said terminals stores trunk information related to said use condition of said trunks contained in said at least two exchange sub-systems connected thereto, refer to said trunk information, and identifies said use condition of a corresponding one of said trunks when an outgoing call is to be executed through said corresponding one of said trunks.

4. The telephone exchange system according to claim 3, wherein said trunk information includes containing position information identifying said corresponding exchange sub-system containing said corresponding one of said trunks,
   wherein said terminals connected to said corresponding exchange sub-system refer to said trunk information, select an exchange sub-system containing a particular one of said trunks to which said call is connected, and send out outgoing call information identifying said outgoing call to said selected exchange sub-system when said outgoing call is to be executed through said particular one of said trunks.

5. The telephone exchange system according to claim 1, wherein a calling terminal stores terminal management information managing a condition of said calling terminal, and when an outgoing call is executed to a called terminal connected to any one of said exchange sub-systems, said calling terminal refers to said terminal management information and identifies whether it is possible to connect said outgoing call to said called terminal.

6. The telephone exchange system according to claim 5, wherein said terminal management information contains exchange sub-system selection information selecting one of said exchange sub-systems which sent out an outgoing call information, and said terminals connected thereto refer to said terminal management information, select said exchange sub-system which sent out said outgoing call information, and send out said outgoing call information identifying said outgoing call to said selected exchange sub-system.

7. The telephone exchange system according to claim 1, wherein when said incoming call is detected, each of said exchange sub-systems sends out incoming call information indicating that said incoming call is incoming to all terminals connected to said each of said exchange sub-systems and said all terminals receiving said incoming call information execute a particular incoming call processing based on said incoming call information.

8. The telephone exchange system according to claim 1, wherein each of said terminals stores terminal management information for managing a condition of said each of said terminals, wherein when said incoming call information is received by said each of said terminals:
   determines whether said incoming call can be received based on said corresponding terminal management information,
   returns an incoming call receive completion information to an exchange sub-system that sent out said incoming call information showing that it can receive said incoming call when receiving is possible and an incoming call non-completion information showing that it cannot receive said incoming call when receiving is impossible, and wherein
   said exchange sub-system that sent out said incoming call receives; one of said completion information and said incompletion information and executes a telephone exchange process corresponding to said one of said completion information and said incompletion information.

9. The telephone exchange system according to claim 8, wherein said terminal management information is configured to handle a plurality of incoming calls and said each of said terminals executes an answering process for said plurality of incoming calls.

10. A telephone exchange system consisting of a plurality of exchange sub-systems and a plurality of terminals directly connected to at least two of said exchange sub-systems by communication lines, wherein
   A) each of said terminals comprising:
      1) at least one handset provided with a speaker and a receiver,
      2) selecting means for connecting said handset to any one of said communication lines, 3) control means for connecting said selecting means for selectively connecting said at least one handset to any one of said communication lines in order to establish a communication route, B) each of said exchange sub-systems comprising:
1) a plurality of trunks for executing a connection to lines of another telephone exchange system,
2) a switch means connecting one of said terminals to one of said trunks in order to set a call, wherein said one of said terminals is selectively connected to one of said exchange sub-systems when said call is carried out.

11. The telephone exchange system according to claim 10, wherein each of said terminals comprises a plurality of handsets, and said control means controls said selecting means to selectively connect said handsets on a one to one basis to said communication lines.

12. A telephone exchange system comprising a plurality of exchange sub-systems and a plurality of terminals directly connected to at least two of said exchange sub-systems through communication lines, wherein
A) each of said exchange sub-systems comprising:
1) an incoming call information sending out means for sending out, when an incoming call is detected, an incoming call information indicating said incoming call to one of said terminals to which said incoming call is directed, and
2) a switch means connecting said one terminal for executing a telephone connection, and
B) each of said terminals comprising:
1) a receiver means for receiving said incoming call information,
2) a plurality of answering means for answering said incoming call received,
3) indicating means correspondingly provided to said answering means to visually indicate that said incoming call is being received,
4) at least one handset having a speaker and a receiver,
5) a selection means for connecting said at least one handset to any one of said communication lines, and
6) a control means for indicating that an incoming call is being received on said indicating means based on incoming call information received by said receiving means, and for controlling said selection means when an answer from said answering means is detected, and for connecting to any one of said exchange sub-systems that sent said incoming call information with said at least one handset, and wherein one of said terminals is selectively connected to said any one of said exchange sub-systems when a call is carried out.

13. The telephone exchange system according to claim 12, wherein said each of said terminals has a plurality of handsets and said control means controls said selection means to allow selective and free connection of said corresponding handsets with said communication lines.

14. The telephone exchange system according to claim 12, wherein said each of said exchange sub-systems respectively has a plurality of terminals connected thereto and said incoming call information sending out means sends out at one time, when said incoming call is detected, incoming call information indicating said incoming call to said terminals connected to said each of said exchange sub-systems.

15. The telephone exchange system according to claim 13, wherein said each of said exchange sub-systems respectively has a plurality of terminals connected thereto and said incoming call information sending out means sends out at one time, when said incoming call is detected, incoming call information indicating said incoming call to said terminals connected to said each of said exchange sub-systems.

16. A telephone exchange system comprising a plurality of exchange sub-systems and terminals directly connected to at least two of said exchange sub-systems through communication lines, wherein
A) each of said terminals comprises:
1) a plurality of handsets provided with a speaker and a receiver,
2) a selection means for connecting said handsets to any one of said communication lines,
3) a plurality of outgoing call means for executing an outgoing call,
4) memory means for memorizing information and for selecting an appropriate one of said exchange sub-systems to execute said outgoing call when said outgoing call is executing,
5) sending out means for sending out an outgoing call information indicating said outgoing call to said corresponding exchange sub-system when said outgoing call is executing, and
6) control means for controlling, upon recognition of a demand for said outgoing call from one of said outgoing call means, said sending out means to select one of said plurality of handsets, and sending an outgoing call information including information of said selected one of said handsets to said corresponding exchange sub-system which is selected after referring to said memory means, and
B) each of said exchange sub-systems comprises:
1) receiving means for receiving said outgoing call information, and
2) switch means for freely setting a call according to said outgoing call information that said receiving means receives, and wherein one of said terminals selects one of said exchange subsystems during a telephoning and is connected thereto.

17. The telephone exchange system according to claim 16, wherein said each of said terminals is provided with a predetermined priority order of use of a corresponding plurality of handsets, and said control means selects one of said handsets according to said priority order.

* * * * *